US012793110B2

(12) United States Patent
Sahoo et al.

(10) Patent No.: US 12,793,110 B2
(45) Date of Patent: Nov. 10, 2026

(54) SYSTEMS AND METHODS FOR PERFORMING VENDOR- AGNOSTIC CTO/QTO (CONFIGURE TO ORDER/QUOTE TO ORDER)

(71) Applicant: Ingram Micro Inc., Irvine, CA (US)

(72) Inventors: Sanjib Sahoo, Naperville, IL (US); Jim Annes, Porter Ranch, CA (US)

(73) Assignee: Ingram Micro Inc., Irvine, CA (US)

( * ) Notice: Subject to any disclaimer, the term of this patent is extended or adjusted under 35 U.S.C. 154(b) by 0 days.

(21) Appl. No.: 18/829,219

(22) Filed: Sep. 9, 2024

(65) Prior Publication Data

US 2025/0029157 A1 Jan. 23, 2025

Related U.S. Application Data

(63) Continuation-in-part of application No. 18/793,346, filed on Aug. 2, 2024, and a continuation-in-part of (Continued)

(51) Int. Cl.
*G06Q 30/0601* (2023.01)
*G06Q 30/0201* (2023.01)

(52) U.S. Cl.
CPC ..... *G06Q 30/0611* (2013.01); *G06Q 30/0206* (2013.01); *G06Q 30/0641* (2013.01)

(58) Field of Classification Search
None
See application file for complete search history.

(56) References Cited

U.S. PATENT DOCUMENTS 5,237,495 A 8/1993 Morii
5,515,269 A 5/1996 Willis et al.
(Continued)

FOREIGN PATENT DOCUMENTS

AU 2019101249 A4 11/2019
AU 2022256517 A1 11/2023
(Continued)

OTHER PUBLICATIONS

BasuMallic, "What is a Software Engine? Types, Applications, and Importance." Oct. 7, 2022. URL Link: <https://www.spiceworks.com/tech/devops/articles/what-is-software-engine/>.
(Continued)

*Primary Examiner* — Fateh M Obaid
(74) *Attorney, Agent, or Firm* — Ice Miller LLP

(57) ABSTRACT

Computerized systems and methods are described for managing vendor-agnostic configure-to-order (CTO) and quote-to-order (QTO) processes. A Real-Time Data Mesh (RTDM) is provided for aggregating, standardizing, and normalizing real-time data from various sources. A Single Pane of Glass User Interface (SPoG UI) facilitates dynamic interaction and visibility into vendor performance. An Advanced Analytics and Machine-Learning (AAML) Module analyzes product compatibility, optimizes pricing strategies, and predicts market trends. A Vendor-Agnostic CTO/QTO Integration Module (VACIM) includes a Process Standardization Engine and a Vendor Data Transformation Gateway to ensure uniformity across vendors. Methodologies within the invention automate data processing, integrate transformation gateways for data consistency, and employ rule engines driven by machine learning for decision-making, thereby streamlining vendor processes, enhancing scalability, and optimizing pricing strategies in a scalable, adaptable framework.

7 Claims, 28 Drawing Sheets

Related U.S. Application Data application No. 18/789,602, filed on Jul. 30, 2024, and a continuation-in-part of application No. 18/768,998, filed on Jul. 10, 2024, now Pat. No. 12,373,786, and a continuation-in-part of application No. 18/768,971, filed on Jul. 10, 2024, and a continuation-in-part of application No. 18/732,227, filed on Jun. 3, 2024, and a continuation-in-part of application No. 18/614,517, filed on Mar. 22, 2024, and a continuation-in-part of application No. 18/599,388, filed on Mar. 8, 2024, now Pat. No. 12,614,147, and a continuation-in-part of application No. 18/583,337, filed on Feb. 21, 2024, now Pat. No. 12,493,904, and a continuation-in-part of application No. 18/583,256, filed on Feb. 21, 2024, now Pat. No. 12,488,365, and a continuation-in-part of application No. 18/424,193, filed on Jan. 26, 2024, and a continuation-in-part of application No. 18/349,836, filed on Jul. 10, 2023, and a continuation-in-part of application No. 18/341,714, filed on Jun. 26, 2023.

(56) References Cited

U.S. PATENT DOCUMENTS 5,870,717 A 2/1999 Wiecha
5,870,719 A 2/1999 Maritzen
6,093,559 A 7/2000 Bookbinder et al.
6,167,383 A 12/2000 Henson
6,272,472 B1 8/2001 Danneels et al.
6,385,543 B1 5/2002 Keiser
7,024,459 B2 4/2006 McNamara
7,039,604 B1 5/2006 Srinivasan et al.
7,065,499 B1 6/2006 Seth et al.
7,085,729 B1 8/2006 Kennedy et al.
7,130,853 B2 10/2006 Roller
7,151,438 B1 12/2006 Hall
7,188,075 B1 3/2007 Smirnov
7,302,405 B2 * 11/2007 Hoskin .............. G06Q 30/0641 705/26.4
7,471,990 B2 12/2008 Hotta et al.
7,548,612 B2 6/2009 Weissman et al.
7,584,155 B1 9/2009 Carter, III et al.
7,698,170 B1 4/2010 Darr et al.
7,720,720 B1 5/2010 Sharma et al.
7,809,601 B2 10/2010 Shaya et al.
7,912,899 B2 3/2011 Beauchamp et al.
8,015,021 B2 9/2011 Boyle
8,024,059 B2 9/2011 Kienzle
8,024,217 B2 9/2011 Sadre
8,069,435 B1 11/2011 Lai
8,091,065 B2 1/2012 Mir et al.
8,127,278 B2 2/2012 Bohle
8,237,792 B2 8/2012 Uehara
8,255,454 B2 8/2012 Broda
8,301,522 B2 10/2012 Sun et al.
8,311,863 B1 11/2012 Kemp
8,386,296 B2 2/2013 Hage et al.
8,386,299 B2 2/2013 Kumble
8,443,036 B2 5/2013 Li et al.
8,452,636 B1 5/2013 Verastigui
D685,812 S 7/2013 Bork et al.
8,589,444 B2 11/2013 Alcorn
8,738,421 B1 5/2014 Ali
8,781,882 B1 7/2014 Arboletti et al.
D718,324 S 11/2014 Lee et al.
8,914,544 B2 12/2014 Lalji et al.
D733,176 S 6/2015 Lin
9,063,943 B1 6/2015 Smith
D748,661 S 2/2016 Addaguduru
9,317,807 B1 4/2016 Staddon
9,390,089 B2 7/2016 Pitzo et al.
9,390,428 B2 7/2016 Rehman et al.
D766,285 S 9/2016 Yang
D779,514 S 2/2017 Baris et al.
9,652,530 B1 5/2017 Bendersky et al.
9,727,906 B1 8/2017 Sarmento
9,727,909 B2 8/2017 Mackay
9,781,212 B2 10/2017 Briere
9,792,597 B1 10/2017 Jen et al.
9,805,412 B1 10/2017 Joseph et al.
9,958,291 B1 5/2018 Shunturov et al.
9,959,551 B1 5/2018 Schermerhorn
9,965,526 B1 5/2018 Chanda
D820,296 S 6/2018 Aufmann et al.
D823,326 S 7/2018 Pinzon Garcia et al.
10,078,843 B2 9/2018 Dadia et al.
10,108,974 B1 10/2018 Shariff et al.
10,114,964 B2 10/2018 Ramesh
D833,459 S 11/2018 Blechschmidt et al.
D834,605 S 11/2018 Blechschmidt et al.
10,134,003 B1 11/2018 Loyens et al.
10,146,751 B1 12/2018 Zhang
10,277,672 B2 4/2019 Kung
D851,110 S 6/2019 Bang et al.
D854,030 S 7/2019 Dascola et al.
10,354,239 B1 7/2019 Nguyen et al.
10,373,105 B2 8/2019 Feng et al.
D858,545 S 9/2019 Hazam et al.
10,410,125 B1 9/2019 Finkelstein et al.
10,417,728 B1 9/2019 Yoggi et al.
10,489,845 B2 11/2019 Mullakkara
10,592,852 B1 3/2020 Karipides et al.
D880,498 S 4/2020 Shahidi et al.
D880,518 S 4/2020 Martell et al.
10,616,347 B1 4/2020 Van Oort et al.
10,650,449 B2 5/2020 Courbage
10,664,799 B2 5/2020 O+3 Brien
10,693,824 B2 6/2020 Silva et al.
10,699,329 B2 6/2020 Zakula
D890,199 S 7/2020 Kumar et al.
10,718,632 B1 7/2020 Platt et al.
10,757,154 B1 8/2020 Jacobs
D898,759 S 10/2020 Carrigan et al.
D902,227 S 11/2020 Burnell et al.
10,839,029 B2 11/2020 Lawrence
10,861,077 B1 12/2020 Liu et al.
10,891,105 B1 1/2021 Gates et al.
10,893,036 B2 1/2021 Chang et al.
D912,694 S 3/2021 Clarke et al.
D914,040 S 3/2021 Butka et al.
D916,767 S 4/2021 Vansickler et al.
D916,781 S 4/2021 Conaway
D920,351 S 5/2021 Zhang
11,036,713 B2 6/2021 Inturi et al.
11,062,319 B1 7/2021 Hecht et al.
11,074,643 B1 7/2021 Ellithorpe
11,080,239 B2 8/2021 Demoor et al.
11,113,770 B1 9/2021 Magoon et al.
11,120,038 B1 9/2021 Ossher et al.
11,151,608 B1 10/2021 Guo et al.
D937,299 S 11/2021 Varga et al.
11,163,846 B1 11/2021 Kadayam et al.
11,171,950 B1 11/2021 Zhuravlev et al.
11,176,693 B1 11/2021 Gonzalez-Nicolas
D937,851 S 12/2021 Patel et al.
11,205,147 B1 * 12/2021 Anderson ............. G06F 16/951
D940,178 S 1/2022 Ang
D941,334 S 1/2022 Roche, Jr. et al.
11,222,003 B1 1/2022 Jones et al.
11,282,145 B2 * 3/2022 Ehrhart ................... G06F 16/93
D947,862 S 4/2022 Alhimiri
11,334,554 B2 5/2022 Andreakis et al.
11,343,142 B1 5/2022 Wang et al.
11,379,219 B2 7/2022 Bhalla et al.
11,386,456 B1 7/2022 Lightbody et al.
11,393,127 B2 7/2022 Parkison et al.
11,487,797 B2 11/2022 Shukla et al.
11,556,864 B2 1/2023 Yuan et al.
11,568,305 B2 1/2023 Negi et al.
11,620,310 B1 4/2023 Akidau et al.
D987,668 S 5/2023 Mairs et al.
D989,119 S 6/2023 Vansickler et al.

(56) References Cited

U.S. PATENT DOCUMENTS 11,714,537 B2 8/2023 Lin et al.
11,714,698 B1 8/2023 Curtis et al.
11,729,058 B1 8/2023 Agarwal et al.
11,770,304 B1 9/2023 McNally
11,798,058 B2 10/2023 Silverstein
11,811,928 B2 11/2023 Shaaban et al.
11,816,721 B2 11/2023 Ksyta
D1,009,077 S 12/2023 Matlin et al.
D1,011,377 S 1/2024 Ye
11,860,613 B2 1/2024 Maury
11,886,965 B1 1/2024 Schwartz et al.
D1,013,709 S 2/2024 Callanta et al.
11,892,817 B2 2/2024 Jacobs et al.
11,899,678 B2 2/2024 Kadel et al.
11,906,415 B1 2/2024 Galburt
11,977,964 B1 5/2024 Winstead
11,983,806 B1 5/2024 Ramesh et al.
12,014,375 B2 6/2024 Brakob et al.
D1,038,142 S 8/2024 Roche, Jr. et al.
12,077,313 B1 9/2024 Whaley et al.
D1,044,839 S 10/2024 Bowen et al.
D1,044,841 S 10/2024 Shriniwar
12,106,621 B2 10/2024 Boerger et al.
12,107,934 B1 * 10/2024 Bailey .................... H04L 67/34
D1,051,145 S 11/2024 McIver et al.
12,142,091 B2 11/2024 Fang
12,204,323 B1 1/2025 Malviya et al.
D1,061,571 S 2/2025 Arora
D1,067,240 S 3/2025 Duffy et al.
12,242,491 B2 3/2025 Li et al.
12,248,962 B2 3/2025 Qu
12,271,491 B2 4/2025 Cameron et al.
D1,078,763 S 6/2025 Arora
D1,080,661 S 6/2025 Shope
12,333,412 B1 6/2025 Mazed
12,346,702 B1 7/2025 Burbine et al.
D1,091,608 S 9/2025 Li et al.
D1,093,421 S 9/2025 Pitkin et al.
D1,098,125 S 10/2025 Donnelly
12,444,126 B1 10/2025 Tremblay et al.
D1,101,762 S 11/2025 Gordonov et al.
D1,102,464 S 11/2025 Varga et al.
12,474,936 B2 11/2025 Dostie, Jr. et al.
D1,110,338 S 1/2026 Goodrich et al.
12,537,998 B1 1/2026 Perelli-Minetti et al.
D1,112,264 S 2/2026 Bharadwaj
D1,139,382 S 8/2026 Valle et al.
2001/0042036 A1 11/2001 Sanders
2002/0015480 A1 2/2002 Daswani et al.
2002/0023046 A1 * 2/2002 Callahan ............... G06Q 40/04 705/37
2002/0042755 A1 4/2002 Kumar et al.
2002/0059201 A1 5/2002 Work
2002/0062262 A1 5/2002 Vasconi et al.
2002/0087438 A1 7/2002 Kunieda et al.
2002/0091991 A1 7/2002 Castro
2002/0120521 A1 * 8/2002 Forth ................ G06Q 30/0631 705/26.5
2002/0138358 A1 9/2002 Scheer
2002/0161664 A1 10/2002 Shaya et al.
2002/0165747 A1 11/2002 Shriver et al.
2002/0188514 A1 12/2002 Kritt et al.
2002/0198743 A1 12/2002 Ariathurai
2003/0009397 A1 1/2003 Whitenack et al.
2003/0018546 A1 1/2003 Ayala
2003/0028451 A1 2/2003 Ananian
2003/0050819 A1 3/2003 Koenigbauer
2003/0055700 A1 3/2003 Hoffman et al.
2003/0070061 A1 4/2003 Wong
2003/0074248 A1 4/2003 Braud
2003/0078846 A1 4/2003 Burk
2003/0084053 A1 5/2003 Govrin
2003/0130863 A1 7/2003 Grey
2003/0144858 A1 7/2003 Jain et al.
2003/0149608 A1 8/2003 Kall et al.
2003/0163513 A1 8/2003 Schaeck
2003/0171962 A1 9/2003 Hirth
2003/0173403 A1 9/2003 Vogler
2003/0216950 A1 11/2003 Chen
2003/0229550 A1 12/2003 DiPrima et al.
2003/0233264 A1 12/2003 Jones
2004/0006516 A1 1/2004 Anagol-Subbarao et al.
2004/0019494 A1 1/2004 Ridgeway et al.
2004/0044565 A1 3/2004 Kumar et al.
2004/0044582 A1 3/2004 Chowdhary et al.
2004/0054800 A1 3/2004 Shah et al.
2004/0102981 A1 * 5/2004 Schuh ............... G06Q 30/0601 705/26.1
2004/0111304 A1 6/2004 Meka et al.
2004/0111327 A1 6/2004 Kidd et al.
2004/0267674 A1 12/2004 Feng et al.
2005/0049938 A1 3/2005 Venkiteswaran
2005/0138642 A1 6/2005 Breh
2005/0144082 A1 * 6/2005 Coolman ........... G06Q 30/0635 705/26.81
2005/0163951 A1 7/2005 Oles et al.
2005/0262196 A1 11/2005 Mueller
2005/0283410 A1 12/2005 Gosko
2006/0100889 A1 5/2006 Gosko
2006/0178918 A1 8/2006 Mikurak
2006/0277086 A1 12/2006 Ball et al.
2006/0287932 A1 12/2006 Wulteputte et al.
2007/0033569 A1 2/2007 Davidson
2007/0050229 A1 3/2007 Tatro et al.
2007/0192216 A1 * 8/2007 Arnold ................ G06Q 20/102 705/28
2007/0203798 A1 8/2007 Caballero et al.
2007/0233574 A1 10/2007 Koegler et al.
2007/0250545 A1 10/2007 Surlaker
2008/0052205 A1 2/2008 Dolley et al.
2008/0082426 A1 4/2008 Gokturk et al.
2008/0133569 A1 6/2008 Vu et al.
2008/0228657 A1 9/2008 Nabors et al.
2008/0270256 A1 10/2008 Caballero et al.
2008/0319849 A1 * 12/2008 Rapoport ........... G06Q 30/0211 705/14.13
2009/0063305 A1 3/2009 Kreifels et al.
2009/0063309 A1 3/2009 Stephens
2009/0112727 A1 * 4/2009 Chi ....................... G06Q 30/02 705/1.1
2009/0150663 A1 6/2009 Perry
2009/0171816 A1 7/2009 del Rosario et al.
2009/0177714 A1 7/2009 Obermeyer et al.
2010/0005085 A1 1/2010 Millmore et al.
2010/0145831 A1 6/2010 Esfandiari et al.
2010/0161364 A1 6/2010 Lokowandt et al.
2010/0211550 A1 8/2010 Daniello et al.
2010/0250598 A1 9/2010 Brauer et al.
2011/0029345 A1 2/2011 Kienzle
2011/0156651 A1 6/2011 Christensen
2011/0238484 A1 9/2011 Toumayan et al.
2011/0313882 A1 12/2011 Barthes
2012/0036089 A1 2/2012 Washington et al.
2012/0054642 A1 3/2012 Balsiger et al.
2012/0071999 A1 3/2012 Trammell et al.
2012/0084215 A1 * 4/2012 Trier ................... G06Q 10/103 705/301
2012/0163225 A1 6/2012 Mishkin et al.
2012/0209824 A1 8/2012 Morimoto
2012/0226612 A1 9/2012 Kurtis et al.
2012/0232952 A1 9/2012 Leonard
2012/0259675 A1 10/2012 Roehrs et al.
2012/0316935 A1 * 12/2012 Feuerstin .............. G06Q 30/02 705/14.39
2012/0323933 A1 12/2012 He
2012/0330918 A1 12/2012 Carey
2012/0330973 A1 12/2012 Ghuneim
2013/0013346 A1 1/2013 O'Connor et al.
2013/0018651 A1 1/2013 Djordjevic et al.
2013/0041781 A1 * 2/2013 Freydberg ............. G06Q 30/06 705/27.1
2013/0066745 A1 3/2013 De Heer et al.
2013/0091033 A1 4/2013 Goodman et al.

(56) References Cited

U.S. PATENT DOCUMENTS

2013/0110860 A1 5/2013 Taranov et al.
2013/0117080 A1 5/2013 Madsen
2013/0138485 A1 5/2013 Zou et al.
2013/0159145 A1 6/2013 Stevens
2013/0166403 A1 6/2013 Jin et al.
2013/0191185 A1 7/2013 Galvin
2013/0191481 A1 7/2013 Prevost et al.
2013/0246215 A1 9/2013 Faith et al.
2013/0290234 A1 10/2013 Harris et al.
2013/0311271 A1 11/2013 Agrawal et al.
2014/0025529 A1 1/2014 Honeycutt
2014/0052491 A1* 2/2014 Narayanan ........... G06Q 10/087 705/7.25
2014/0052840 A1 2/2014 Shukla
2014/0059144 A1 2/2014 Lehmann et al.
2014/0095265 A1 4/2014 Steinman
2014/0095343 A1 4/2014 Daniel et al.
2014/0095488 A1 4/2014 Malone et al.
2014/0122377 A1 5/2014 Goodman et al.
2014/0156329 A1 6/2014 Hwang et al.
2014/0200965 A1 7/2014 McConnell et al.
2014/0222453 A1* 8/2014 Wills ................. G06Q 10/0637 705/2
2014/0222641 A1 8/2014 Kober
2014/0278804 A1 9/2014 Lanxner et al.
2014/0279254 A1 9/2014 Hastman
2014/0322678 A1 10/2014 Briancon et al.
2014/0324530 A1 10/2014 Thompson et al.
2014/0324549 A1 10/2014 Chelap et al.
2014/0358723 A1 12/2014 Ballaro et al.
2014/0379422 A1 12/2014 Chapman et al.
2015/0032526 A1 1/2015 Calman et al.
2015/0066570 A1 3/2015 Hellen et al.
2015/0189014 A1 7/2015 Grunenberger
2015/0203673 A1 7/2015 Alric et al.
2015/0281148 A1 10/2015 Masterson et al.
2015/0286645 A1 10/2015 Sinha
2015/0295766 A1 10/2015 Dickey
2015/0302303 A1 10/2015 Hakim
2016/0092474 A1 3/2016 Stojanovic et al.
2016/0196564 A1 7/2016 Dadia et al.
2016/0203319 A1 7/2016 Coen et al.
2016/0232624 A1 8/2016 Goldberg et al.
2016/0239855 A1 8/2016 Feng et al.
2016/0267102 A1 9/2016 Klein et al.
2016/0300144 A1 10/2016 Santhanam et al.
2016/0321344 A1 11/2016 Aragone et al.
2016/0335345 A1 11/2016 Wang
2017/0006135 A1 1/2017 Siebel
2017/0017677 A1 1/2017 Jolfaei
2017/0017969 A1 1/2017 Noursalehi et al.
2017/0053558 A1 2/2017 Zhou et al.
2017/0060641 A1 3/2017 Ramaswamy
2017/0063750 A1 3/2017 Vardhan
2017/0091327 A1 3/2017 Bostic
2017/0109675 A1 4/2017 Hosny et al.
2017/0134516 A1 5/2017 Gutman
2017/0147941 A1 5/2017 Bauer et al.
2017/0193412 A1 7/2017 Easton et al.
2017/0193433 A1 7/2017 Qin et al.
2017/0193527 A1 7/2017 Becker et al.
2017/0243465 A1 8/2017 Bourne, Jr.
2017/0255903 A1 9/2017 Chowdhry
2017/0255987 A1 9/2017 Bacharach et al.
2017/0278173 A1 9/2017 Ettl et al.
2017/0286909 A1 10/2017 Baynes
2017/0287038 A1 10/2017 Krasadakis
2017/0364046 A1 12/2017 Westrick, Jr. et al.
2017/0364534 A1 12/2017 Zhang et al.
2017/0364796 A1 12/2017 Wiebe
2018/0005296 A1 1/2018 Eades et al.
2018/0024986 A1 1/2018 Singh et al.
2018/0136992 A1 5/2018 Solinger
2018/0143975 A1 5/2018 Casal
2018/0165604 A1 6/2018 Minkin et al.
2018/0210937 A1 7/2018 Shi
2018/0218322 A1 8/2018 Bhargava et al.
2018/0240158 A1 8/2018 Peng
2018/0285790 A1 10/2018 Huynh et al.
2018/0288363 A1 10/2018 Amengual Galdon et al.
2018/0293640 A1 10/2018 Krappe
2018/0308151 A1 10/2018 Ainsworth, III
2018/0314925 A1 11/2018 Gauci
2018/0315141 A1 11/2018 Hunn et al.
2018/0332102 A1 11/2018 Sheidaei
2018/0336514 A1 11/2018 Ranjanghatmuralidhar et al.
2018/0337798 A1 11/2018 Ilic
2018/0343491 A1 11/2018 Loheide et al.
2018/0349793 A1 12/2018 Triolo et al.
2019/0034838 A1 1/2019 Canis
2019/0050688 A1 2/2019 Iyer et al.
2019/0050771 A1 2/2019 Meharwade et al.
2019/0095992 A1 3/2019 Soh
2019/0102162 A1 4/2019 Pitre et al.
2019/0102418 A1 4/2019 Vasudevan et al.
2019/0102753 A1 4/2019 Harrison
2019/0114689 A1 4/2019 Wang et al.
2019/0147400 A1 5/2019 Knight
2019/0149725 A1 5/2019 Adato et al.
2019/0163985 A1 5/2019 Wang
2019/0192074 A1 6/2019 Smets et al.
2019/0215424 A1 7/2019 Adato et al.
2019/0220914 A1 7/2019 Flannery et al.
2019/0243836 A1 8/2019 Nanda et al.
2019/0251457 A1 8/2019 Byrnes et al.
2019/0265971 A1 8/2019 Behzadi et al.
2019/0286620 A1 9/2019 Al-Haimi et al.
2019/0286759 A1 9/2019 Wilkins et al.
2019/0303487 A1 10/2019 Mehta
2019/0303579 A1 10/2019 Reddy
2019/0377807 A1 12/2019 Dean et al.
2020/0026552 A1 1/2020 Zhang
2020/0045519 A1 2/2020 Raleigh et al.
2020/0073642 A1 3/2020 Koryakin
2020/0117757 A1 4/2020 Yanamandra
2020/0126013 A1 4/2020 Hochheiser et al.
2020/0134683 A1 4/2020 Boren et al.
2020/0143313 A1 5/2020 Ohlsson et al.
2020/0184416 A1 6/2020 Javaheri
2020/0210947 A1 7/2020 Devarakonda et al.
2020/0219159 A1 7/2020 Choudhary et al.
2020/0235941 A1 7/2020 Nguyen
2020/0265512 A1 8/2020 James et al.
2020/0272981 A1 8/2020 Kirkegaard
2020/0279200 A1 9/2020 Makhija et al.
2020/0320095 A1 10/2020 Haase
2020/0327252 A1 10/2020 Mcfall
2020/0334608 A1 10/2020 Ramanathan et al.
2020/0349624 A1 11/2020 Ramanathan et al.
2020/0394398 A1 12/2020 Pamarthi
2020/0394455 A1 12/2020 Lee
2021/0012329 A1 1/2021 Gandhi et al.
2021/0012358 A1 1/2021 Wical
2021/0036889 A1 2/2021 Jain et al.
2021/0042767 A1 2/2021 Guan et al.
2021/0065134 A1 3/2021 Chhabra
2021/0065294 A1 3/2021 Trevathan
2021/0117384 A1 4/2021 Leite Pinheiro De Paiva et al.
2021/0125144 A1 4/2021 Liu et al.
2021/0133788 A1 5/2021 Jacobs et al.
2021/0133850 A1 5/2021 Ayush et al.
2021/0142385 A1 5/2021 Alahmady
2021/0144250 A1 5/2021 Mahar
2021/0158259 A1 5/2021 Evans et al.
2021/0166179 A1 6/2021 Pande
2021/0166251 A1 6/2021 Mehmanpazir et al.
2021/0182730 A1 6/2021 Clarke
2021/0182746 A1 6/2021 Muthukrishnan
2021/0201346 A1 7/2021 Dejardins
2021/0211825 A1 7/2021 Joyner et al.
2021/0226573 A1 7/2021 George et al.
2021/0233129 A1 7/2021 Bikumala et al.
2021/0241299 A1 8/2021 Ramini et al.
2021/0241301 A1 8/2021 Christensen

(56) References Cited

U.S. PATENT DOCUMENTS

| | | | | |
|---|---|---|---|---|
| 2021/0241337 | A1 | 8/2021 | Bikumala et al. | |
| 2021/0248151 | A1 | 8/2021 | Kadel | |
| 2021/0269244 | A1 | 9/2021 | Ahmann | |
| 2021/0287275 | A1 | 9/2021 | Karlan-Mason | |
| 2021/0303420 | A1 | 9/2021 | Willoughby et al. | |
| 2021/0334871 | A1 | 10/2021 | Quinn et al. | |
| 2021/0350429 | A1 | 11/2021 | Gangadarappa | |
| 2021/0350432 | A1 | 11/2021 | Kushner | |
| 2021/0357959 | A1 | 11/2021 | Cella et al. | |
| 2021/0377203 | A1 | 12/2021 | Hou | |
| 2021/0378779 | A1 | 12/2021 | Lenzenhuber | |
| 2021/0383316 | A1 | 12/2021 | Mimassi | |
| 2021/0397989 | A1 | 12/2021 | Mayers et al. | |
| 2022/0019204 | A1 | 1/2022 | Maury | |
| 2022/0051183 | A1 | 2/2022 | Franzo | |
| 2022/0058723 | A1 | 2/2022 | Swett et al. | |
| 2022/0067085 | A1 | 3/2022 | Nihas | |
| 2022/0114509 | A1 | 4/2022 | Pinheiro | |
| 2022/0116470 | A1 | 4/2022 | Sethi et al. | |
| 2022/0122134 | A1 | 4/2022 | Hoffman et al. | |
| 2022/0122142 | A1 | 4/2022 | Cao | |
| 2022/0129477 | A1 | 4/2022 | Son | |
| 2022/0129803 | A1 | 4/2022 | Bikumala et al. | |
| 2022/0156275 | A1 | 5/2022 | Burke | |
| 2022/0197246 | A1 | 6/2022 | Cella | |
| 2022/0198431 | A1 | 6/2022 | Foster, Jr. | |
| 2022/0210141 | A1 | 6/2022 | Parekh et al. | |
| 2022/0245008 | A1 | 8/2022 | Deljavan Farshi et al. | |
| 2022/0245115 | A1 | 8/2022 | Kulkarni et al. | |
| 2022/0245574 | A1 | 8/2022 | Cella et al. | |
| 2022/0245727 | A1* | 8/2022 | Roll | G06Q 40/08 |
| 2022/0253775 | A1 | 8/2022 | Burkhead et al. | |
| 2022/0270160 | A1 | 8/2022 | Sadhankar | |
| 2022/0284459 | A1 | 9/2022 | Kwok et al. | |
| 2022/0292160 | A1 | 9/2022 | Mehta et al. | |
| 2022/0309436 | A1 | 9/2022 | Evans | |
| 2022/0319504 | A1 | 10/2022 | Owhadi et al. | |
| 2022/0327119 | A1 | 10/2022 | Gasper | |
| 2022/0327597 | A1 | 10/2022 | Griesmer | |
| 2022/0329595 | A1 | 10/2022 | Wynter | |
| 2022/0357971 | A1 | 11/2022 | Feliciano | |
| 2022/0373346 | A1 | 11/2022 | Abhishek | |
| 2022/0374737 | A1 | 11/2022 | Dhara et al. | |
| 2022/0383400 | A1 | 12/2022 | Wade | |
| 2022/0405775 | A1 | 12/2022 | Siebel | |
| 2023/0005330 | A1 | 1/2023 | Hartwig et al. | |
| 2023/0012041 | A1 | 1/2023 | Holloran et al. | |
| 2023/0012650 | A1 | 1/2023 | Aggarwal et al. | |
| 2023/0030234 | A1 | 2/2023 | Fichuk et al. | |
| 2023/0030262 | A1 | 2/2023 | Springer | |
| 2023/0032447 | A1 | 2/2023 | Mackie | |
| 2023/0051934 | A1 | 2/2023 | Devan et al. | |
| 2023/0055677 | A1 | 2/2023 | Dhelaria et al. | |
| 2023/0058148 | A1 | 2/2023 | Chen et al. | |
| 2023/0059565 | A1 | 2/2023 | Ravindran et al. | |
| 2023/0064747 | A1 | 3/2023 | Inoue Sardenberg | |
| 2023/0067777 | A1 | 3/2023 | Hadar et al. | |
| 2023/0074782 | A1 | 3/2023 | Tendulkar et al. | |
| 2023/0075794 | A1 | 3/2023 | Muttreja | |
| 2023/0091441 | A1 | 3/2023 | Go | |
| 2023/0094635 | A1 | 3/2023 | Meng et al. | |
| 2023/0099557 | A1 | 3/2023 | Thapliyal et al. | |
| 2023/0102048 | A1 | 3/2023 | Cella et al. | |
| 2023/0113006 | A1 | 4/2023 | Liu | |
| 2023/0125533 | A1 | 4/2023 | Estes | |
| 2023/0162258 | A1 | 5/2023 | Das Gupta et al. | |
| 2023/0185878 | A1 | 6/2023 | Makhija et al. | |
| 2023/0206251 | A1 | 6/2023 | Acharya et al. | |
| 2023/0206265 | A1 | 6/2023 | Girija et al. | |
| 2023/0214773 | A1 | 7/2023 | Ha | |
| 2023/0214854 | A1 | 7/2023 | Colombier et al. | |
| 2023/0214864 | A1 | 7/2023 | Colombier et al. | |
| 2023/0222536 | A1 | 7/2023 | Hoang | |
| 2023/0259521 | A1 | 8/2023 | Haelen et al. | |
| 2023/0273915 | A1 | 8/2023 | Dev | |
| 2023/0275973 | A1 | 8/2023 | Sakamoto et al. | |
| 2023/0282350 | A1 | 9/2023 | Devore et al. | |
| 2023/0316377 | A1 | 10/2023 | Bacharach et al. | |
| 2023/0325900 | A1 | 10/2023 | Edwards | |
| 2023/0342344 | A1 | 10/2023 | Brown | |
| 2023/0350963 | A1 | 11/2023 | Saad et al. | |
| 2023/0359161 | A1 | 11/2023 | O'Rourke et al. | |
| 2023/0367696 | A1 | 11/2023 | Liu | |
| 2023/0385288 | A1 | 11/2023 | Kulkarni et al. | |
| 2023/0394426 | A1 | 12/2023 | Bauders et al. | |
| 2023/0410095 | A1 | 12/2023 | Cella et al. | |
| 2023/0418980 | A1 | 12/2023 | Abrougui | |
| 2023/0419387 | A1 | 12/2023 | Ballaro | |
| 2024/0004860 | A1 | 1/2024 | Soundararajan et al. | |
| 2024/0022492 | A1 | 1/2024 | Nanda | |
| 2024/0037115 | A1 | 2/2024 | Simanjuntak et al. | |
| 2024/0062099 | A1 | 2/2024 | Crockett et al. | |
| 2024/0070750 | A1 | 2/2024 | Smith, Jr. et al. | |
| 2024/0095788 | A1 | 3/2024 | Vaishnav et al. | |
| 2024/0095789 | A1 | 3/2024 | Vaishnav et al. | |
| 2024/0106828 | A1 | 3/2024 | Jain et al. | |
| 2024/0107122 | A1 | 3/2024 | Akhoury et al. | |
| 2024/0118702 | A1 | 4/2024 | Cella et al. | |
| 2024/0144170 | A1 | 5/2024 | Kim | |
| 2024/0169410 | A1 | 5/2024 | Zhao | |
| 2024/0184650 | A1 | 6/2024 | O'Kelley | |
| 2024/0211828 | A1 | 6/2024 | Iwamoto et al. | |
| 2024/0232941 | A1 | 7/2024 | Vajge | |
| 2024/0248919 | A1 | 7/2024 | Kumar | |
| 2024/0266010 | A1* | 8/2024 | Adhikari | H04L 63/105 |
| 2024/0281419 | A1 | 8/2024 | Alfaras et al. | |
| 2024/0281423 | A1 | 8/2024 | Perrin | |
| 2024/0311853 | A1 | 9/2024 | Rendahl et al. | |
| 2024/0330983 | A1 | 10/2024 | Isaacs et al. | |
| 2024/0354423 | A1 | 10/2024 | Mardikar et al. | |
| 2024/0354686 | A1 | 10/2024 | Hegde | |
| 2024/0354867 | A1* | 10/2024 | Young | G06Q 40/06 |
| 2024/0362576 | A1 | 10/2024 | Rajagopal | |
| 2024/0370902 | A1 | 11/2024 | Miglani | |
| 2024/0372856 | A1 | 11/2024 | Black et al. | |
| 2024/0386015 | A1 | 11/2024 | Crabtree et al. | |
| 2024/0419678 | A1 | 12/2024 | Sharma et al. | |
| 2024/0420012 | A1 | 12/2024 | Austin et al. | |
| 2024/0427789 | A1 | 12/2024 | Sahoo | |
| 2024/0428166 | A1 | 12/2024 | Sahoo et al. | |
| 2024/0428181 | A1 | 12/2024 | Sahoo | |
| 2024/0428318 | A1 | 12/2024 | Sahoo | |
| 2025/0005479 | A1 | 1/2025 | Sahoo | |
| 2025/0036648 | A1* | 1/2025 | Hunter | G06F 16/258 |
| 2025/0047663 | A1 | 2/2025 | Brennan et al. | |
| 2025/0062949 | A1* | 2/2025 | Nimmagadda | H04L 41/046 |
| 2025/0077601 | A1 | 3/2025 | Liu et al. | |
| 2025/0139656 | A1 | 5/2025 | Durvasula | |
| 2025/0217114 | A1 | 7/2025 | Roper, Jr. et al. | |
| 2025/0259032 | A1 | 8/2025 | Crabtree et al. | |
| 2025/0301489 | A1 | 9/2025 | Gabizon et al. | |
| 2025/0328341 | A1 | 10/2025 | Gutierrez | |
| 2025/0355656 | A1 | 11/2025 | Khalil et al. | |

FOREIGN PATENT DOCUMENTS

| | | | |
|---|---|---|---|
| AU | 2024204660 | A1 | 1/2025 |
| CN | 101025799 | A | 8/2007 |
| CN | 104731791 | A | 6/2015 |
| CN | 107908778 | A | 4/2018 |
| CN | 108122157 | A | 6/2018 |
| CN | 110570245 | A | 12/2019 |
| CN | 112990988 | A | 6/2021 |
| CN | 308638129 | S | 5/2024 |
| CN | 118297564 | A | 7/2024 |
| CN | 118536118 | A | 8/2024 |
| CN | 308771199 | S | 8/2024 |
| CN | 118734829 | A | 10/2024 |
| EM | 15013860 | | 3/2023 |
| JP | H05143614 | A | 6/1993 |
| JP | 2001005863 | A | 1/2001 |
| JP | 2002024334 | A | 1/2002 |
| JP | 2002108668 | A | 4/2002 |
| JP | 2002279236 | A | 9/2002 |

(56) References Cited

FOREIGN PATENT DOCUMENTS

| | | | |
|---|---|---|---|
| JP | 2004538542 | A | 12/2004 |
| JP | 2005078422 | A | 3/2005 |
| JP | 2019101725 | A | 6/2019 |
| JP | 2019523927 | A | 8/2019 |
| JP | 2020514860 | A | 5/2020 |
| JP | 2020514860 | A5 | 2/2021 |
| JP | 2021532444 | A | 11/2021 |
| JP | 2022175317 | A | 11/2022 |
| JP | 2023500378 | A | 1/2023 |
| JP | 2023508188 | A | 3/2023 |
| JP | 2023539284 | A | 9/2023 |
| KR | 20070057806 | A | 6/2007 |
| SK | 28733 | | 6/2020 |
| WO | 1994025161 | A1 | 11/1994 |
| WO | 1999062261 | A1 | 12/1999 |
| WO | 2002033581 | A2 | 4/2002 |
| WO | 02063530 | A2 | 8/2002 |
| WO | 2004104739 | A2 | 12/2004 |
| WO | 2006026673 | A2 | 3/2006 |
| WO | 2010107730 | A1 | 9/2010 |
| WO | 2010151368 | A2 | 12/2010 |
| WO | 2012019097 | A2 | 2/2012 |
| WO | 2013181736 | A1 | 12/2013 |
| WO | 2014060050 | A1 | 4/2014 |
| WO | 2016013972 | A1 | 1/2016 |
| WO | 2016118979 | A2 | 7/2016 |
| WO | 2018116252 | A1 | 6/2018 |
| WO | 2018231850 | A1 | 12/2018 |
| WO | 2019157399 | A1 | 8/2019 |
| WO | 2021171250 | A1 | 9/2021 |
| WO | 2021262530 | A1 | 12/2021 |
| WO | 2022008567 | A1 | 1/2022 |
| WO | 2022132040 | A1 | 6/2022 |
| WO | 2022221719 | A3 | 12/2022 |
| WO | 2023026313 | A1 | 3/2023 |
| WO | 2023174562 | A1 | 9/2023 |
| WO | 2024073505 | A1 | 4/2024 |
| WO | 2024226421 | A1 | 10/2024 |
| WO | 2024233674 | A2 | 11/2024 |
| WO | 2025038523 | A1 | 2/2025 |

OTHER PUBLICATIONS

Holzer et al., “Developing a Framework for Linking Design Intelligence from Multiple Professions in the AEC Industry,” 2007. URL Link: <https://link.springer.com/content/pdf/10.1007/978-1-4020-6528-6_23.pdf>.

PCMag. “engine” definition. Dec. 1, 2020 snapshot via Archive.org URL Link: <https://www.pcemag.com/encyclopedia/term/engine>.

Techopedia. “Engine” definition. Oct. 19, 2012. URL Link: <https://www.techopedia.com/definition/24155/engine>.

Biswas S., et al., “A Proposed Architecture for Big Data Driven Supply Chain Analytics, ” ICFAI University Press (IUP) Journal of Supply Chain Management, 2016, vol. 13, No. 3, pp. 7-34 (24 Pages), Retrieved from URL: https://arxiv.org/abs/1705.04958.

European Search Report for European Application No. 24186933, dated Nov. 25, 2024, 09 Pages.

Extended European Search Report for European Application No. 24184819.1, dated Nov. 27, 2024, 10 Pages.

Extended European Search Report for European Application No. 24187943.6, dated Nov. 19, 2024, 8 Pages.

Extended European Search Report for European Application No. 24187967.5, dated Nov. 25, 2024, 8 Pages.

Machado I.A., et al., “Data Mesh: Concepts and Principles of a Paradigm Shift in Data Architectures,” Procedia Computer Science, Amsterdam, NL, Jan. 10, 2022, vol. 196, pp. 263-271, DOI: 10.1016/j.procs.2021.12.013, ISSN: 1877-0509, XP093050267, Retrieved from URL: https://www.sciencedirect.com/science/article/pii/S1877050921022365.

Office Action for Japanese Application No. 2024-101794, dated Sep. 13, 2024, 21 Pages.

Office Action for Japanese Application No. 2024-108629, dated Oct. 29, 2024, 10 Pages.

Office Action for Japanese Application No. 2024-112073, dated Oct. 15, 2024, 9 Pages.

Suzumura K., “Latest IT Trends by Field: Inter-System Integration: The Key Lies in the Use of Open Technology, Performance and Reliability,” Nikkei Computer, Japan, Nikkei BP, Sep. 23, 2002, No. 557, pp. 28-29 (6 Pages), ISSN 0285-4619.

Wikipedia: “Data Mesh,” May 25, 2023, 3 Pages, XP093199672, Retrieved from URL: https://en.Wikipedia.org/w/index. php?title=Data_mesholdid=1157039904.

Search Report from European Patent Application No. 25154230.4, dated Jul. 10, 2025, 10 pgs.

Agarwal S., et al., “Improving Bundles Recommendation Coverage in Sparse Product Graphs,” WWW 22 Companion, Virtual Event, Lyon, France, Apr. 25-29, 2022, pp. 1037-1045 (09 Pages).

Carlos R., et al., “Framework for Continuous Agile Technology Roadmap Updating,” Innovation & Management Review, Emerald Publishing Limitex, 2018, vol. 15, No. 3, pp. 321-336.

Channelpro Network: “Ingram Micro’s New Xvantage Mobile Application is Simplifying How the IT Channel Works,” Ingram Macro Inc, Dec 20, 2023, 2 Page, [Retrieved on Sep. 18, 2025] Retrieved from URL: https://www.channelpronetwork.com/2023/12/20/ingram-micros-new-xvantage-mobile-application-is-simplifying-how-the-it-channel- works/.

Costa C., “Data Mesh: Concepts and Principles of a Paradigm Shift in Data Architectures,” published by ScienceDirect in 2022 (Year: 2022), 9 pages.

Decision of Refusal for Japanese Application No. 2024-108629, dated Apr. 11, 2025, 11 Pages.

Dehghani Z., “Data Mesh Principles and Logical Architecture”, published by martinfowler.com on May 20, 2019 (Year: 2019), 9 pages.

Dehghani Z., “How to Move Beyond a Monolithic Data Lake to a Distributed Data Mesh,” Martinfowler.com, May 20, 2019, 11 Pages.

Dey D., et al., “Appraise: A Governance Framework for Innovation with Artificial Intelligence Systems,” ACM, 2024, 13 Pages.

Examination Report for Australian Application No. 2024204660, dated Apr. 16, 2025, 04 Pages.

Examination Report for Australian Application No. 20244204340, dated Feb. 28, 2025, 5 Pages.

Examination Report for Australian Application No. 2025200528, dated Mar. 6, 2025, 5 Pages.

Examination Report for Australian Application No. 2025200535, dated Apr. 7, 2025, 7 Pages.

Examination Report for Australian Application No. 2025200793, dated Apr. 1, 2025, 09 Pages.

Examination Report for Australian Application No. 2025201639, dated Apr. 30, 2025, 06 Pages.

Examination Report for Australian Application No. 2025201740, dated Mar. 18, 2025, 05 Pages.

Extended European Search Report for European Application No. 25154210.6, dated Jun. 11, 2025, 09 Pages.

Extended European Search Report for European Application No. 25156175.9, dated Mar. 24, 2025, 9 Pages.

Extended European Search Report for European Application No. 25161920.1, dated Jul. 24, 2025, 15 Pages.

Extended European Search Report for European Application No. 25163362.4, dated May 16, 2025, 10 Pages.

Gately E., “Ingram Micro Debuts Xvantage Mobile App,” Channel Futures, Dec 20, 2023, 1 Page, [Retrieved on Sep. 2, 2025] Retrieved from URL: https:// www.channelfutures.com/channel-sales-marketing/ingram-micro-debuts-xvantage-mobile-app.

He Z., et al., “Enhancing Web Accessibility: Automated Detection of Issues with Generative AI,” Proceedings of the ACM on Software Engineering, Jul. 2025, vol. 2, No. FSE, Article FSE101, pp. 1-24.

Ingram Industries Inc: “Ingram Micro,” Registered Trademark U.S. Appl. No. 86/365,487, filed May 30, 2017, 3 Pages, [Retrieved on Aug. 13, 2025] Retrieved from URL: https://tsdr.USPTO.gov/#caseNumber=86365487&caseSearchType=US_APPLICATION&caseType=DEFAULT&searchType=statusSearch.

(56) References Cited

OTHER PUBLICATIONS

International Search Report and Written Opinion for International Application No. PCT/US2024/037624, dated Oct. 28, 2024, 9 Pages.
Johnson R., "Everything you Need to Know About Global Distribution System," itilite.com, Mar. 2, 2022, 6 Pages.
Kohut Y., et al., "Recommendation System for Purchasing Goods Based on the Decision Tree Algorithm," Advances in Cyber-physical Systems, 2021, vol. 6, No. 2, pp. 1-7.
Kundu S., et al., "Detecting Functional Safety Violations in Online Al Accelerators," IEEE, 2022, pp. 1-4.
Mailparser, "Enter Mailparser: Your Solution for Data Entry," 2024, 7 Pages, [Retrieved on Dec. 2, 2025] Retrieved from URL: https://mailparser.io/email-to-erp.
Notice of Refusal for Japanese Patent Application No. 2024-101794, dated May 16, 2025, 8 Pages.
Palo J., "Product Roadmapping Tool and Process Unification as a Part of Global End-to-end Repeatability Operating Model Development," Haaga-Helia University of Applied Sciences Leading Business Transformation Digital Business Opportunities Master's Thesis, 2023, 76 Pages.
Robert J.E., "Applying Generative Al to Detect Document Incompleteness, Inconsistencies, and Discrepancies," ACM, FSE Companion'25, Jun. 23-28, 2025, pp. 1381-1385.
Sryheni S., "Introduction to Depth First Search Algorithm (DFS)," Baeldung.com, Mar. 24, 2023, 6 Pages.
Sun Z., et al., "Revisiting Bundle Recommendation: Datasets, Tasks, Challenges and Opportunities for Intent-aware Product Bundling," Published by Association for Computing Machinery, SIGIR'22, Jul. 11-15, 2022, pp. 2900-2911.
Sutton R., et al., "A Reinforcement Learning and Synthetic Data Approach Mobile Notification Management," ACM, MoMM'19 , Dec. 2-4, 2019, 10 Pages.
Wolfart D., et al., "Modernizing Legacy Systems with Microservices: A Roadmap," Association for Computing Machinery, Jun. 21-23, 2021, 11 Pages.
Youtube.com: "Welcome to Xvantage Mobile-Your Anywhere, Anytime App," Ingram Micro USA, Oct. 24, 2023, 3 Pages, [Retrieved on Aug. 13, 2025] Retrieved from URL: https://www.youtube.com/watchv=QyZOeBLJODM.
European Search Report for European Application No. 25201138.2, dated Jan. 7, 2026, 12 Pages.
Pfefferle J., "Moving from Data Lakes to Data Mesh: Why Companies will continue to Decentralize their Data," Medium, Oct. 18, 2022, 22 pages.
Rahm E., et al., "A survey of approaches to automatic schema matching," the VLDB Journal, vol. 10, No. 4, 2001, pp. 334-350.
Sahay T., et al., "Schema Matching using Machine Learning," 2019, 07 Pages, arXiv:1911.1154 [5].
Examination Report issued in Australian Patent Application No. 2026200987, mailed Mar. 31, 2026, 7 pages.
Examination Report No. 1 for Australian Patent Application No. 2025223770, dated Sep. 10, 2025, 5 pages.
Extended European Search Report for European Application No. 25227599.5, dated Apr. 14, 2026, 09 Pages.
Office Action for Canadian Patent Application No. 3244397, mailed on Apr. 28, 2026, 09 pages.
Office Action for Canadian Patent Application No. 3285874, mailed Apr. 1, 2026, 5 pages.
Office Action issued in Japanese Patent Application No. 2025-151910, mailed Apr. 21, 2026, 9 pgs.
Aksu E., et al., "Is Personalization the Future of User Interfaces A Systematic Mapping and Review," Proceedings of the 2025 11th International HCI and UX Conference, 2025, pp. 67-72.
Ingram Micro Inc., "Pending Trademark U.S. Appl. No. 97/331,192," U.S. Patent and Trademark Office, Published Mar. 21, 2023 [Retrieved on Jun. 11, 2026], 1 page, Retrieved from the Internet: URL: https://tsdr.uspto.gov/#caseNumber=97331192&caseSearchType=US_APPLICATION&caseType=DEFAULT&searchType=statusSearch.
Nallamothu T.K., "Enhance Cross-Device Experiences Using Smart Connect Ecosystem," International Journal of Technology , Management and Humanities, Aug. 30, 2023, vol. 9 No. 03, 5 pages.
Sivagnanasothy L., "How Change Data Capture is used for Real-Time Data Integration and Analytics," medium. com, May 22, 2019, 7 pages.
Tunali O., et al., "Targeted Personalized Product Bundle Generation," IEEE, 2021, 5 pages.
Van De Wiel., M., "Change Data Capture (CDC): Tools, Benefits, and Best Practices," fivetran.com, Aug. 4, 2022, 10 pages.
Dobbelaere P., et al., "Kafka Versus RabbitMQ: A Comparative Study of Two Industry Reference Publish/Subscribe Implementations: Industry Paper," Proceedings of the 11th ACM International Conference on Distributed and Event-Based Systems (DEBS '17), Jun. 2017, 25 pages, Retrieved from https://arxiv.org/abs/1709.00333.
Examination Report No. 1 for Australian Patent Application No. 2026202865, dated Jul. 22, 2026, 4 pages.
Examination Report No. 1 for Australian Patent Application No. 2026202443 dated Aug. 4, 2026, 06 pages.
Examination Report No. 1 for Australian Patent Application No. 2026202572 dated Aug. 11, 2026, 13 pages.
Examination Report No. 1 for Australian Patent Application No. 2026204701 dated Aug. 11, 2026, 07 pages.
Examination Report No. 2 for Australian Patent Application No. 2025208500, mailed Aug. 13, 2026, 06 pages.
Examination Report No. 2 for Australian Patent Application No. 2025283550, mailed Aug. 5, 2026, 09 pages.
Gavish L., et al., "What Is A Data Mesh And How Not To Mesh It Up," Monte Carlo, Jun. 2024, 15 pages, Retrieved from Internet URL: https://www.montecarlodata.com/blog-what-is-a-data-mesh-and-how-not-to-mesh-it-up/.
Institute of Product Leadership, "A Comprehensive Guide to Successful Product Development," Institute of Product Leadership, Dec 16, 2025, 16 pages, Retrieved from URL: https://www.productleadership.com/blog/product-development/.
Joint Task Force., "Security and Privacy Controls for Information Systems and Organizations," NIST Special Publication 800-53 Rev. 5, Sep. 2020, 492 pages, Retrieved from https://nvlpubs.nist.gov/nistpubs/SpecialPublications/NIST.SP.800-53r5.pdf.
Kreps J., et al., "Kafka: A Distributed Messaging System for Log Processing," Proceedings of the 6th International Workshop on Networking Meets Databases (NetDB '11), Jun. 2011, ACM, pp. 1-7, Retrieved from https://pages.cs.wiscedu/~akella/CS744/F17/838-CloudPapers/Kafka.pdf.
McHale C, "Single Pane of Glass Dashboards: What are they," SPK and Associates, Apr. 27, 2022, 8 pages, Retrieved from URL: https://www.spkaa.com/blog/what-are-single-pane-of-glass-dashboards.
Office Action for Canadian Patent Application No. 3281593, mailed on Jun. 19, 2026, 04 pages.
Office Action for Chinese Patent Application No. 202510198008.1, mailed Jul. 24, 2026, 08 pages.
Office Action for Japanese Patent Application No. 2025011018, mailed Aug. 21, 2026, 16 pages.
Swanson M., et al., "Contingency Planning Guide for Federal Information Systems," NIST Special Publication 800-34 Rev. 1, May 2010, 149 pages, Retrieved from https://nvlpubs.nist.gov/nistpubs/legacy/sp/nistspecialpublication800-34r1.pdf.
Confluent, "Data Products, Data Contracts, and Change Data Capture," Confluent.com, Feb. 21, 2024, pp. 1-12.
Curran H., "SaaS Design—Employee Onboarding Wizard," Dribbble, Feb. 27, 2024, pp. 1-2. Retrieved from URL:https://dribbble.com/shots/23726660-SaaS-Design-Employee-Onboarding-Wizard.
Impekable, "Sign Up Wizard—Employee Onboarding," Dribbble, Jan. 22, 2024, pp. 1-2. Retrieved from URL: https://dribbble.com/shots/23470406-Sign-Up-Wizard-Employee-Onboarding.
Ojetunji D., "Employee Onboarding Modal," Dribbble, Sep. 29, 2023, pp. 1-2. Retrieved from URL: https://dribbble.com/shots/22690528-Employee-Onboarding-modal.
Ranniaia A., "Onboarding Modals," Dribbble, Aug. 30, 2024, pp. 1-3. Retrieved from URL: https://dribbble.com/shots/24778275-Onboarding-modals.

(56) References Cited

OTHER PUBLICATIONS

Zilliant, “Zilliant Introduces Real-Time Pricing Engine to Deliver Dynamic Pricing Capabilities Needed in the Digital Age”, Zilliant Press Release, 2022, p. 14.
Blohm I., et al., “Data Products, Data Mesh, and Data Fabric: New Paradigm(s) for Data and Analytics,” Business & Information Systems Engineering, Jun. 5, 2024, vol. 66, No. 5, pp. 643-652.
Examination Report No. 2 for Australian Patent Application No. 2025208498, mailed Aug. 20, 2026, 05 pages.
Hooshmand Y., et al., “From a Monolithic PLM Landscape to a Federated Domain and Data Mesh,” Proceedings of the Design Society, May 2022, vol. 2, pp. 713-722.
Office Action for Japanese Patent Application No. 2025020384, mailed Aug. 28, 2026, 10 pages.

* cited by examiner

900

SYSTEMS AND METHODS FOR PERFORMING VENDOR- AGNOSTIC CTO/QTO (CONFIGURE TO ORDER/QUOTE TO ORDER)

CROSS REFERENCE TO RELATED APPLICATIONS

This application is a Continuation-In-Part (CIP) of U.S. patent application Ser. No. 18/341,714, filed on Jun. 26, 2023; U.S. patent application Ser. No. 18/349,836, filed on Jul. 10, 2023; U.S. patent application Ser. No. 18/424,193, filed Jan. 26, 2024; U.S. patent application Ser. No. 18/583,256, filed Feb. 21, 2024; U.S. patent application Ser. No. 18/583,337, filed Feb. 21, 2024; U.S. patent application Ser. No. 18/599,388, filed Mar. 8, 2024; U.S. patent application Ser. No. 18/614,517, filed Mar. 22, 2024; U.S. patent application Ser. No. 18/732,227, filed Jun. 3, 2024; U.S. patent application Ser. No. 18/768,998, filed Jul. 10, 2024; U.S. patent application Ser. No. 18/768,971, filed Jul. 10, 2024; U.S. patent application Ser. No. 18/789,602, filed Jul. 30, 2024; and U.S. patent application Ser. No. 18/793,346, filed Aug. 2, 2024. Each of these applications is incorporated herein by reference in its entirety.

BACKGROUND

Traditional ordering processes in distribution and supply-chain platforms are marred with inefficiencies, delays, and inaccuracies. In the conventional landscape, multiple systems and vendors usually perform each activity independently, from creating a bill of materials to registering deals, applying pricing, generating quotes, and submitting orders. This approach leads to operational inefficiencies and a heightened likelihood of errors.

Enterprise Resource Planning (ERP) systems have served as the mainstay in managing business processes, including distribution and supply chain. These systems act as central repositories where different departments such as finance, human resources, and inventory management can access and share real-time data. While ERPs are comprehensive, they present several challenges in today's complex distribution and supply chain environment. One of the primary challenges is data fragmentation. Data silos across different departments or even separate ERP systems make real-time visibility difficult to achieve. Users lack a comprehensive view of key distribution and supply chain metrics, which adversely affects decision-making processes.

Moreover, ERP systems often do not offer effective data integration capabilities. Traditional ERP systems are not designed to integrate efficiently with external systems or even between different modules within the same ERP suite. This design results in a cumbersome and error-prone manual process to transfer data between systems and affects the flow of information throughout the supply chain. Data inconsistencies occur when information exists in different formats across systems, hindering accurate data analysis and leading to uninformed decision-making.

Data inconsistency presents another challenge. When data exists in different formats or units across departments or ERPs, standardizing this data for meaningful analysis becomes a painstaking process. Businesses often resort to time-consuming manual processes for data transformation and validation, which further delays decision-making. Additionally, traditional ERP systems often lack the capabilities to handle large volumes of data effectively. These systems struggle to provide timely insights for operational improvements, particularly problematic for businesses dealing with complex and expansive distribution and supply chain networks.

Data security is another concern, especially considering the sensitive nature of supply chain data, which includes customer details, pricing, and contracts. Ensuring compliance with global regulations on data security and governance adds an additional layer of complexity. Traditional ERP systems often lack robust security features agile enough to adapt to the continually evolving landscape of cybersecurity threats and compliance requirements.

BRIEF SUMMARY OF THE INVENTION

Vendor-Agnostic CTO/QTO Management systems and methodologies provide a comprehensive platform to simplify and automate aspects of vendor relationships, standardize processes, optimize pricing strategies, and enhance customer experiences across diverse markets and geographies. Systems and methodologies integrates various modules including the Real-Time Data Mesh (RTDM), Single Pane of Glass User Interface (SPoG UI), Advanced Analytics and Machine-Learning (AAML) Module, and Vendor-Agnostic CTO/QTO modules.

In the global distribution industry, challenges such as inefficient distribution management, SKU management, and the transition to direct-to-consumer models necessitate innovative solutions. Traditional distribution methods are increasingly insufficient, particularly with shifts in consumer expectations and regulations. By integrating functionalities for distribution management, supply chain management, and customer visibility, the platform supports simplifying and automating specific vendor-agnostic CTO/QTO tasks.

According to some embodiments, a conversion module can be configured to incorporate algorithms to optimize product and service selections based on real-time market data and customer preferences. The system includes a conversion module that, integrated with Real-Time Data Mesh (RTDM) and Single Pane of Glass User Interface (SPoG UI), optimizes the offering of subscription-based services. Using advanced algorithms, it adapts offerings based on real-time market data and customer usage patterns, enhancing the flexibility and scalability of service options.

In a non-limiting example, The RTDM serves as a centralized data hub, aggregating and standardizing real-time data from multiple sources such as ERPs, CRM systems, and market intelligence. It employs techniques like ETL processes and data normalization to ensure uniformity and accessibility of data. This standardized data is vital for the functioning of the Vendor-Agnostic CTO/QTO Integration Module, which is responsible for standardizing processes across vendors, geographies, and markets.

In some embodiments, a Vendor-Agnostic CTO/QTO Integration Module standardizes processes across vendors by implementing a Process Standardization Engine for uniformity and a Vendor Data Transformation Gateway for real-time data synchronization. Additionally, modules like the Dynamic Pricing and Configuration Optimization Module optimize pricing strategies, while the Vendor Compatibility Analyzer assesses product compatibility for service conversion. In some embodiments, these components can ensure consistency and uniformity across diverse vendor offerings and transform raw vendor data into a standardized format compatible with the RTDM. The Vendor-Agnostic CTO/QTO Integration Module standardizes processes, pricing structures, and configuration options across vendors, ensuring consistency and scalability.

In some embodiments, a Market Intelligence Integration Module gathers and analyzes market trends, competitor strategies, and customer preferences, providing actionable insights for informed decision-making. In some embodiments, an Adaptive Rebate Management System automates rebate calculations based on real-time sales data, while a Geographical Market Mapper provides insights into regional dynamics.

Furthermore, embodiments can include a Cross-Vendor Configuration Analyzer configured to evaluate product configurations across vendors, enhancing configurability and scalability. A Global Pricing Harmonizer can ensure pricing parity across diverse markets, considering currency fluctuations and regional purchasing power.

Integration with SPoG UI provides a Vendor Relationship Management Dashboard, offering real-time visibility into vendor performance and partnerships. It consolidates vendor-related data for informed decision-making, fostering transparency and trust.

The system also includes features like the Vendor Relationship Management Dashboard integrated with the SPoG UI to provide stakeholders with real-time visibility into vendor performance and strategic partnerships. This dashboard consolidates vendor-related data into actionable insights, enhancing transparency and trust in vendor relationships.

Some embodiments can include methodologies for performing process standardization and scalability to ensure efficiency and scalability across vendors, and machine learning and data processing operations to address missing data, automate decision-making, and ensure continuous improvement.

The systems and methods enable efficient processes for managing vendor relationships, standardizing processes, optimizing pricing strategies, and enhancing customer experiences across diverse markets and geographies. It integrates data from multiple sources, automates various tasks in the vendor relationship management process, and maintains a real-time, standardized data repository, ensuring scalability and adaptability in today's dynamic business environment.

Single Pane of Glass

The Single Pane of Glass (SPoG) can provide a comprehensive solution that is configured to address these multifaceted challenges. It can be configured to provide a holistic, user-friendly, and efficient platform that facilitates the distribution process.

According to some embodiments, SPoG can be configured to address supply chain and distribution management by enhancing visibility and control over the supply chain process. Through real-time tracking and analytics, SPoG can deliver valuable insights into inventory levels and the status of goods, ensuring that the process of supply chain and distribution management is handled efficiently.

According to some embodiments, SPoG can integrate multiple touchpoints into a single platform to emulate a direct consumer channel into a distribution platform. This integration provides a unified direct channel for consumers to interact with distributors, significantly reducing the complexity of the supply chain and enhancing the overall customer experience.

SPoG offers an innovative solution for improved inventory management through advanced forecasting capabilities. These predictive analytics can highlight demand trends, guiding companies in managing their inventory more effectively and mitigating the risks of stockouts or overstocks.

According to some embodiments, SPoG can include a global compliance database. Updated in real-time, this database enables distributors to stay abreast with the latest international laws and regulations. This feature significantly reduces the burden of manual tracking, ensuring smooth and compliant cross-border transactions.

According to some embodiments, to facilitate vendor relationship management, SPoG integrates data from various OEMs into a single platform. This not only ensures data consistency but also significantly reduces the potential for errors. Furthermore, it provides capabilities to manage vendor relationships efficiently, thereby aligning with specific market needs and requirements.

According to some embodiments, SPoG is its highly configurable and user-friendly platform. Its intuitive interface allows users to easily access and purchase technology, thereby aligning with the expectations of the new generation of tech buyers.

Moreover, SPoG's advanced analytics capabilities offer invaluable insights that can drive strategy and decision-making. It can track and analyze trends in real-time, allowing companies to stay ahead of the curve and adapt to changing market conditions.

SPoG's flexibility and scalability make it a future-proof solution. It can adapt to changing business needs, allowing companies to expand or contract their operations as needed without significant infrastructural changes.

SPoG's innovative approach to resolving the challenges in the distribution industry makes it an invaluable tool. By enhancing supply chain visibility, facilitating inventory management, ensuring compliance, simplifying vendor relationship management, and delivering a superior customer experience, it offers a comprehensive solution to the complex problems that have long plagued the distribution sector. Through its implementation, distributors can look forward to increased efficiency, reduced errors, and improved customer satisfaction, leading to sustained growth in the ever-evolving global market.

Real-Time Data Mesh (RTDM)

The platform can be include implementation(s) of a Real-Time Data Mesh (RTDM), according to some embodiments. RTDS offers an innovative solution to address these challenges. RTDM, a distributed data architecture, enables real-time data availability across multiple sources and touchpoints. This feature enhances supply chain visibility, allowing for efficient management and enabling distributors to handle disruptions more effectively.

RTDM's predictive analytics capability offers a solution for efficient inventory control. By providing insights into demand trends, it aids companies in managing inventory, reducing risks of overstocking or stockouts.

RTDM's global compliance database, updated in real-time, ensures distributors are current with international regulations. It significantly reduces the manual tracking burden, enabling cross-border transactions.

The RTDM also simplifies vendor relationship management by integrating data from various OEMs, ensuring data consistency and reducing error potential. Its capabilities for managing products and market data align with specific market needs efficiently.

The RTDM enhances customer experience with its intuitive interface, allowing easy access and purchase of technology, meeting the expectations of the new generation of tech buyers.

Advantages of SPoG and RTDM Integration

Integrating SPoG platform with the RTDM provides a myriad of advantages. Firstly, it offers a holistic solution to the longstanding problems in the distribution industry. With the RTDM's capabilities, SPoG can enhance supply chain visibility, facilitate for managing vendor-agnostic configure-to-order (CTO) and quote-to-order (QTO) processes, and deliver a superior customer experience.

The real-time tracking and analytics offered by RTDM improve SPoG's ability to manage the supply chain and inventory effectively. It provides accurate and current information, enabling distributors to make informed decisions quickly.

Integrating SPoG with RTDM also ensures data consistency and reduces errors in managing vendor-agnostic processes. By providing a centralized platform for managing data from various OEMs, it simplifies product localization and helps to align with market needs.

The global compliance database of RTDM, integrated with SPoG, facilitates and compliant cross-border transactions. It also reduces the burden of manual tracking, saving significant time and resources.

In some embodiments, a distribution platform incorporates SPoG and RTDM to provide an improved and comprehensive distribution system. The platform can leverage the advantages of a distribution model, addresses its existing challenges, and positions it for sustained growth in the ever-evolving global market.

BRIEF DESCRIPTION OF THE DRAWINGS/FIGURES

DETAILED DESCRIPTION OF THE INVENTION

Embodiments may be implemented in hardware, firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It should be understood that the operations shown in the exemplary methods are not exhaustive and that other operations can be performed as well before, after, or between any of the illustrated operations. In some embodiments of the present disclosure, the operations can be performed in a different order and/or vary.

Figure 1:
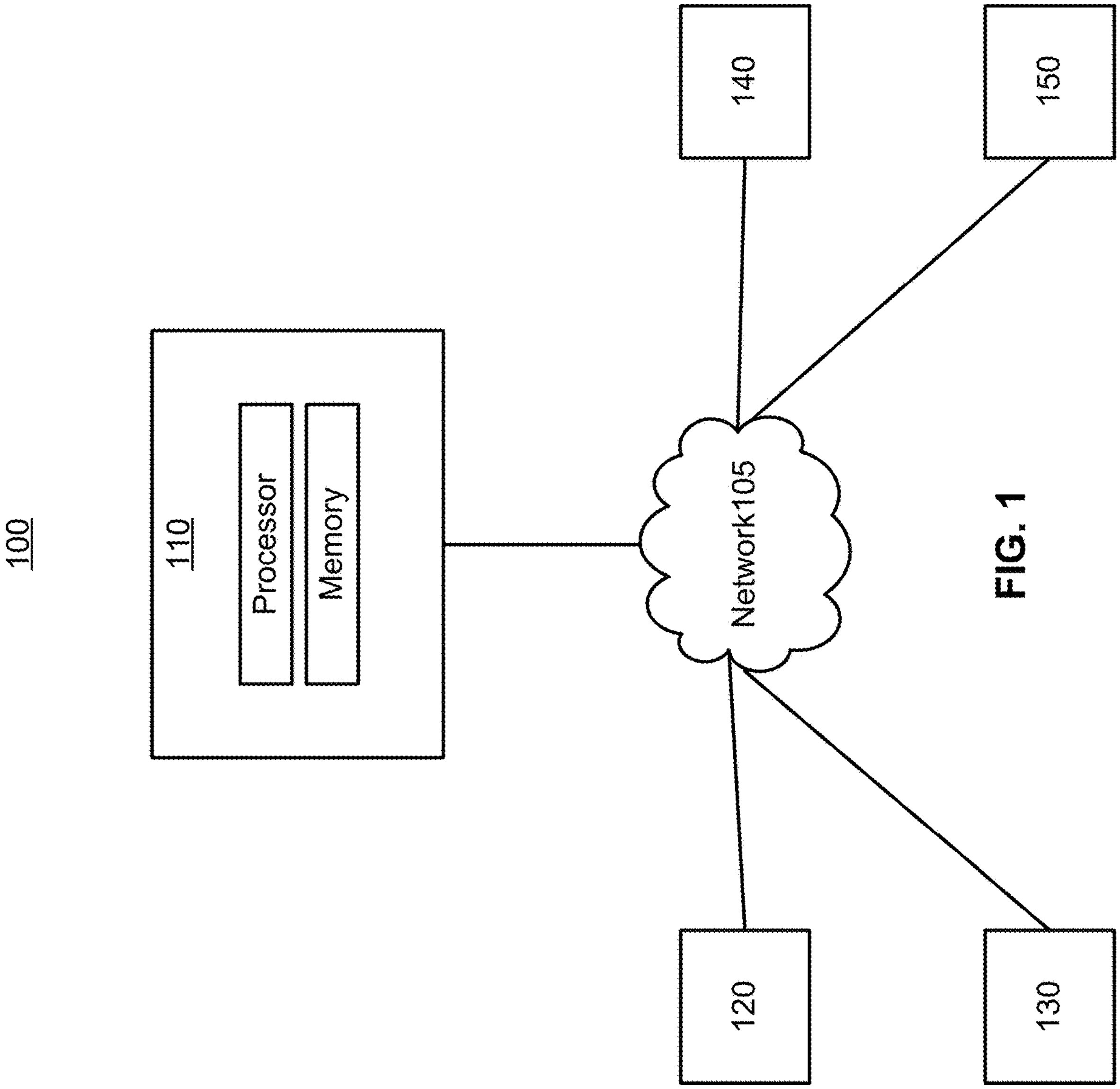
FIG. 1 illustrates one embodiment of an operating environment of a distribution platform, referred to as System in this embodiment.

FIG. 1 illustrates an operating environment 100 of a distribution platform, referred to as System 110 in this embodiment. System 110 operates within the context of an information technology (IT) distribution model, catering to various users such as customers 120, end customers 130, vendors 140, resellers 150, and other entities involved in the distribution process. This operating environment encompasses a broad range of characteristics and dynamics that contribute to the success and efficiency of the distribution platform.

Customers 120 within the operating environment of System 110 represent businesses or individuals seeking IT solutions to meet their specific needs. These customers may require a diverse range of IT products such as hardware components, software applications, networking equipment, or cloud-based services. System 110 provides customers with a user-friendly interface, allowing them to browse, search, and select the most suitable IT solutions based on their requirements. Customers can also access real-time data and analytics through System 110, empowering them to make informed decisions and optimize their IT infrastructure.

End customers 130 can be the ultimate beneficiaries of the IT solutions provided by System 110. They may include businesses or individuals who utilize IT products and services to enhance their operations, productivity, or daily activities. End customers rely on System 110 to access a wide array of IT solutions, ensuring they have access to the latest technologies and innovations in the market. System 110 enables end customers to track their orders, receive updates on delivery status, and access customer support services, thereby enhancing their overall experience.

Vendors 140 play a crucial role within the operating environment of System 110. These vendors encompass manufacturers, distributors, and suppliers who offer a diverse range of IT products and services. System 110 acts as a centralized platform for vendors to showcase their offerings, manage inventory, and facilitate transactions with customers and resellers. Vendors can leverage System 110 to facilitate their supply chain operations, manage pricing and promotions, and gain insights into customer preferences and market trends. By integrating with System 110, vendors can expand their reach, access new markets, and enhance their overall visibility and competitiveness.

Resellers 150 can be intermediaries within the distribution model who bridge the gap between vendors and customers. They play a vital role in the IT distribution ecosystem by connecting customers with the right IT solutions from various vendors. Resellers may include retailers, value-added resellers (VARs), system integrators, or managed service providers. System 110 enables resellers to access a comprehensive catalog of IT solutions, manage their sales pipeline, and provide value-added services to customers. By leveraging System 110, resellers can enhance their customer relationships, optimize their product offerings, and increase their revenue streams.

Within the operating environment of System 110, there can be various dynamics and characteristics that contribute to its effectiveness. These dynamics include real-time data exchange, integration with existing enterprise systems, scalability, and flexibility. System 110 ensures that relevant data can be exchanged in real-time between users, enabling accurate decision-making and timely actions. Integration with existing enterprise systems such as enterprise resource planning (ERP) systems, customer relationship management (CRM) systems, and warehouse management systems allows for communication and interoperability, eliminating data silos and enabling end-to-end visibility.

System 110 can achieve scalability and flexibility. It can accommodate the growing demands of the IT distribution model, whether it involves an expanding customer base, an increasing number of vendors, or a wider range of IT products and services. System 110 can be configured to handle large-scale data processing, storage, and analysis, ensuring that it can support the evolving needs of the distribution platform. Additionally, System 110 leverages a technology stack that includes .NET, Java, and other suitable technologies, providing a robust foundation for its operations.

In summary, the operating environment of System 110 within the IT distribution model encompasses customers 120, end customers 130, vendors 140, resellers 150, and other entities involved in the distribution process. System 110 serves as a centralized platform that facilitates efficient collaboration, communication, and transactional processes between these users. By leveraging real-time data exchange, integration, scalability, and flexibility, System 110 empowers users to optimize their operations, enhance customer experiences, and drive business success within the IT distribution ecosystem.

Figure 2:
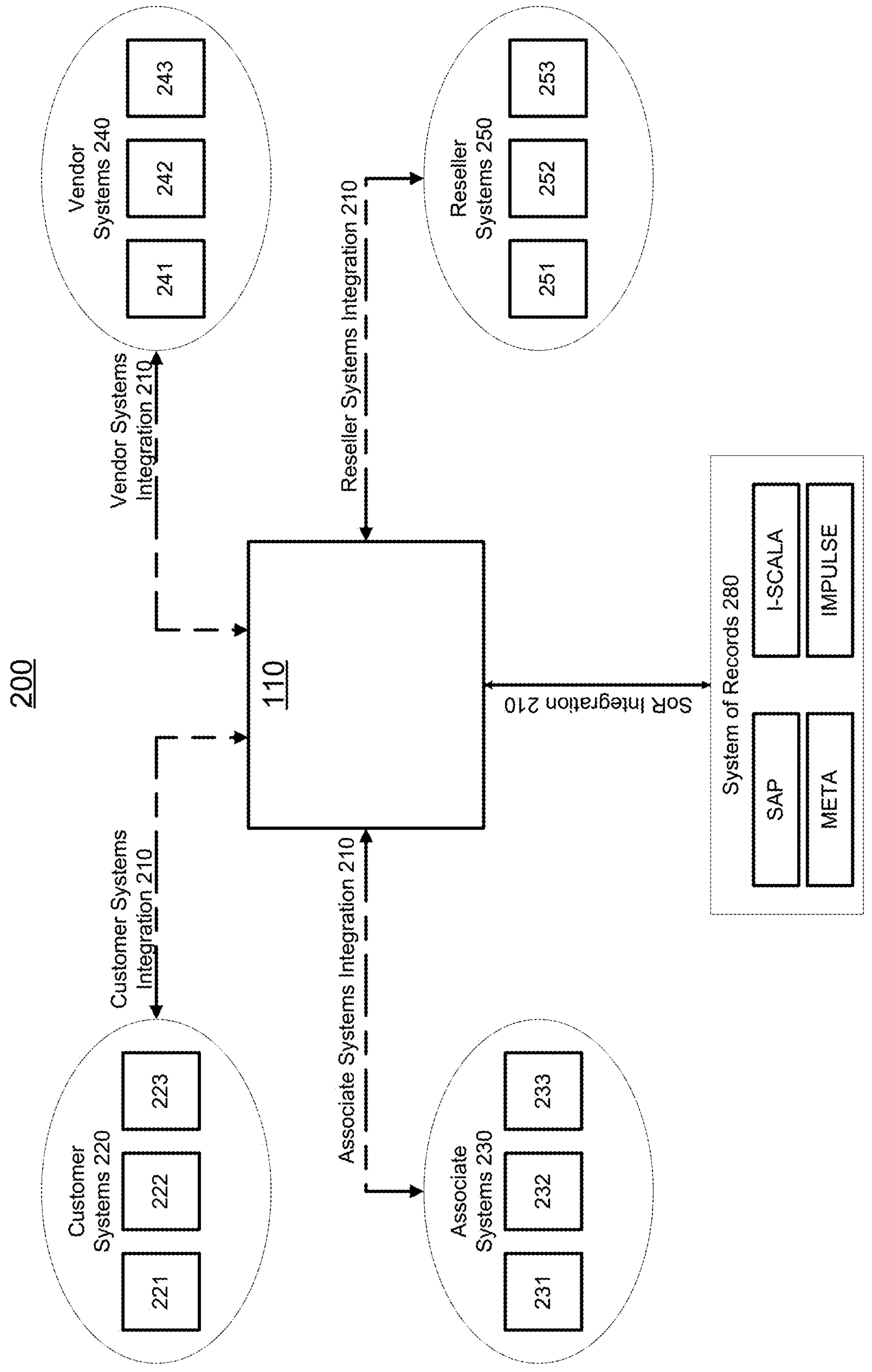
FIG. 2 illustrates one embodiment of an operating environment of the distribution platform, which builds upon the elements introduced in FIG. 1.

FIG. 2 depicts the operating environment 200 of the distribution platform, expanding upon elements introduced in FIG. 1. This environment features integration points 210, which enable data flow and connectivity among various systems like customer systems 220, vendor systems 240, reseller systems 260, and other entities within the Vendor-Agnostic CTO/QTO integration process. FIG. 2 illustrates the network's interconnectedness and mechanisms that facilitate collaborative and data-driven decision-making for Vendor-Agnostic CTO/QTO integration. Operating environment 200 configures to automate Vendor-Agnostic CTO/QTO integration processes using AI and ML technologies, processing and analyzing data for integration.

Some embodiments of the Vendor-Agnostic CTO/QTO integration process involve a systematic approach to integrate diverse vendor systems and processes with minimal manual intervention. This process encompasses several technological components: Collection of diverse data including vendor specifications, transactional interactions, and market trends. This data, aggregated from sources like vendor inventory systems and pricing databases, feeds into the Real-Time Data Mesh (RTDM). RTDM processes and standardizes this data, serving as a centralized repository for real-time data updating and retrieval. The AAML Module analyzes this aggregated data to identify optimal strategies for integration. It segments vendor processes based on data-driven insights and predicted market preferences. The Vendor-Agnostic CTO/QTO Integration Module, informed by AAML Module insights, standardizes processes for each vendor or market segment. It applies predictive models and heuristic algorithms to determine integration strategies that align with specific vendor requirements. Users interact with these integrated processes through the SPoG UI, customizing and confirming their integration choices. The system includes a feedback loop where responses to integration processes are collected and analyzed, continually refining the integration offerings.

AI algorithms in the Vendor-Agnostic CTO/QTO integration process address inventory management, process standardization, and optimization of vendor choices. Machine learning models, such as neural networks and decision trees, refine integration strategies. The integration process uses ML-based algorithms for real-time configuration. Advanced analytics, like ensemble learning or reinforcement learning, continuously optimize the integration process. AI and ML technologies in operating environment 200 employ supervised and unsupervised learning algorithms, including convolutional neural networks for pattern recognition and logistic regression for decision-making. These components adapt dynamically to changing data inputs like vendor preferences and market conditions, optimizing decision pathways through reinforcement learning. ML components leverage predictive analytics, continuously refining outputs by assimilating new data to enhance integration accuracy and relevance.

Operating environment 200 includes System 110 as the central hub for managing the Vendor-Agnostic CTO/QTO integration process. System 110 functions as a bridge among customer systems 220, vendor systems 240, reseller systems 260, and other entities. It integrates communication, data exchange, and transactional processes, offering a cohesive experience. Moreover, environment 200 features integration points 210, using a hybrid architecture that combines RESTful APIs and WebSockets for real-time data exchange and synchronization. This architecture secures with SSL/TLS protocols, safeguarding data during transit.

Customer System Integration: Integration point 210 enables System 110 to connect with customer systems 220, facilitating efficient data exchange and synchronization. Customer systems 220 may include entities like customer system 221, customer system 222, and customer system 223. These systems represent internal systems used by customers, such as ERP or CRM systems. Integration with customer systems 220 allows customers to access real-time information on Vendor-Agnostic CTO/QTO integration, including personalized bundles, pricing details, order tracking, and other relevant data, enhancing their decision-making capabilities. This integration offers an automated, real-time solution for creating and managing Vendor-Agnostic CTO/QTO integration processes, improving operational efficiency for customers.

Data exchange among customer systems 220, vendor systems 240, and reseller systems 260 is enabled by a robust ETL (Extract, Transform, Load) described below in reference to the real-time data mesh architecture, in ensuring data consistency and reliability. This interaction can be governed by predefined business rules and logic, which dictate the data flow and processing methodologies. Advanced mapping and transformation tools are employed to harmonize disparate data formats, allowing for integration and utilization of data across these systems. Orchestrated data exchange supports synchronized operations, enabling efficient and informed decision-making across the distribution network.

Associate System Integration: Integration point 210 enables System 110 to connect with associate systems 230, facilitating efficient data exchange and synchronization. These systems contribute to the overall efficiency of Vendor-Agnostic CTO/QTO integration processing by providing relevant market and product data.

Vendor System Integration: Integration point 210 facilitates the connection between System 110 and vendor systems 240. Vendor systems 240 may include entities like vendor system 241, vendor system 242, and vendor system 243, representing inventory management, pricing systems, and product catalogs. Integration with vendor systems 240 ensures vendors can efficiently update their offerings and receive real-time notifications, to facilitate the Vendor-Agnostic CTO/QTO integration process.

Reseller System Integration: Integration point 210 allows reseller systems 260 to connect with System 110. Reseller systems 260 encompass entities such as reseller system 261, reseller system 262, and reseller system 263, handling sales, customer management, and service delivery. Integration empowers resellers to access up-to-date product information and manage customer relationships effectively.

Other Entity System Integration: Integration point 210 also connects other entities involved in the distribution process, facilitating collaboration and efficient distribution. This integration ensures real-time data exchange for Vendor-Agnostic CTO/QTO integration processing and decision-making in the distribution ecosystem.

System 110's configuration includes sophisticated AI and ML capabilities to automate Vendor-Agnostic CTO/QTO integration processing according to individual preferences, ensuring relevance and optimization in the distribution process.

Integration points 210 also enable connectivity with System of Records 280, for additional data management and integration. Representing System of Records 280 can represent enterprise resource planning (ERP) systems or customer relationship management (CRM) systems, including both future systems as well as legacy ERP systems such as SAP, Impulse, META, I-SCALA, and others. System of Records can include one or more storage repositories of critical and legacy business data. It facilitates integration of data exchange and synchronization between the distribution platform, System 110, and the ERPs, enabling real-time updates and ensuring the availability of accurate and up-to-date information. Integration points 210 establish connectivity between the System of Records 280 and the distribution platform, allowing stakeholders to leverage rich data stored in the ERPs for efficient collaboration, data-driven decision-making, and streamlined distribution processes. These systems represent the internal systems utilized by customers, vendors, and others.

Integration points 210 within the operating environment 200 can be facilitated through standardized protocols, APIs, and data connectors. These mechanisms ensure compatibility, interoperability, and secure data transfer between the distribution platform and the connected systems. System 110 employs industry-standard protocols, such as RESTful APIs, SOAP, or GraphQL, to establish communication channels and enable data exchange.

In some embodiments, System 110 can incorporate authentication and authorization mechanisms to ensure secure access and data protection. Technologies such as OAuth or JSON Web Tokens (JWT) can be employed to authenticate users, authorize data access, and maintain the integrity and confidentiality of the exchanged information.

In some embodiments, integration points 210 and data flow within the operating environment 200 enable users to operate within a connected ecosystem. Data generated at various stages of the distribution process, including customer orders, inventory updates, shipment details, and sales analytics, flows between customer systems 220, vendor systems 240, reseller systems 260, and other entities. This data exchange facilitates real-time visibility, enables data-driven decision-making, and enhances operational efficiency throughout the distribution platform.

In some embodiments, System 110 leverages advanced technologies such as Typescript, NodeJS, ReactJS, .NET Core, C#, and other suitable technologies to support the integration points 210 and enable communication within the operating environment 200. These technologies provide a robust foundation for System 110, ensuring scalability, flexibility, and efficient data processing capabilities. Moreover, the integration points 210 may also employ algorithms, data analytics, and machine learning techniques to derive valuable insights, optimize distribution processes, and personalize customer experiences. Integration points 210 and data flow within the operating environment 200 enable users to operate within a connected ecosystem. Data generated at various touchpoints, including customer orders, inventory updates, pricing changes, or delivery status, flows between the different entities, systems, and components. The integrated data can be processed, harmonized, and made available in real-time to relevant users through System 110. This real-time access to accurate and current information empowers users to make informed decisions, optimize supply chain operations, and enhance customer experiences.

Several elements in the operating environment depicted in FIG. 2 can include conventional, well-known elements that are explained only briefly here. For example, each of the customer systems, such as customer systems 220, could include a desktop personal computer, workstation, laptop, PDA, cell phone, or any wireless access protocol (WAP) enabled device, or any other computing device capable of interfacing directly or indirectly with the Internet or other network connection. Each of the customer systems typically can run an HTTP client, such as Microsoft's Edge browser, Google's Chrome browser, Opera's browser, or a WAP-enabled browser for mobile devices, allowing customer systems to access, process, and view information, pages, and applications available from the distribution platform over the network.

Moreover, each of the customer systems can typically be equipped with user interface devices such as keyboards, mice, trackballs, touchpads, touch screens, pens, or similar devices for interacting with a graphical user interface (GUI) provided by the browser. These user interface devices enable users of customer systems to navigate the GUI, interact with pages, forms, and applications, and access data and applications hosted by the distribution platform.

The customer systems and their components can be operator-configurable using applications, including web browsers, which run on central processing units such as Intel Pentium processors or similar processors. Similarly, the distribution platform (System 110) and its components can be operator-configurable using applications that run on central processing units, such as the processor system, which may include Intel Pentium processors or similar processors, and/or multiple processor units.

Computer program product embodiments include machine-readable storage media containing instructions to program computers to perform the processes described herein. The computer code for operating and configuring the distribution platform and the customer systems, vendor systems, reseller systems, and other entities' systems to intercommunicate, process webpages, applications, and other data, can be downloaded and stored on hard disks or any other volatile or non-volatile memory medium or device, such as ROM, RAM, floppy disks, optical discs, DVDs, CDs, micro-drives, magneto-optical disks, magnetic or optical cards, nano-systems, or any suitable media for storing instructions and data.

Furthermore, the computer code for implementing the embodiments can be transmitted and downloaded from a software source over the Internet or any other conventional network connection using communication mediums and protocols such as TCP/IP, HTTP, HTTPS, Ethernet, etc. The code can also be transmitted over extranets, VPNs, LANs, or other networks, and executed on client systems, servers, or server systems using programming languages such as C, C++, HTML, Java, JavaScript, ActiveX, VBScript, and others.

It will be appreciated that the embodiments can be implemented in various programming languages executed on client systems, servers, or server systems, and the choice of language may depend on the specific requirements and environment of the distribution platform.

Thereby, operating environment 200 can couple a distribution platform with one or more integration points 210 and data flow to enable efficient collaboration and streamlined distribution processes.

Figure 3:
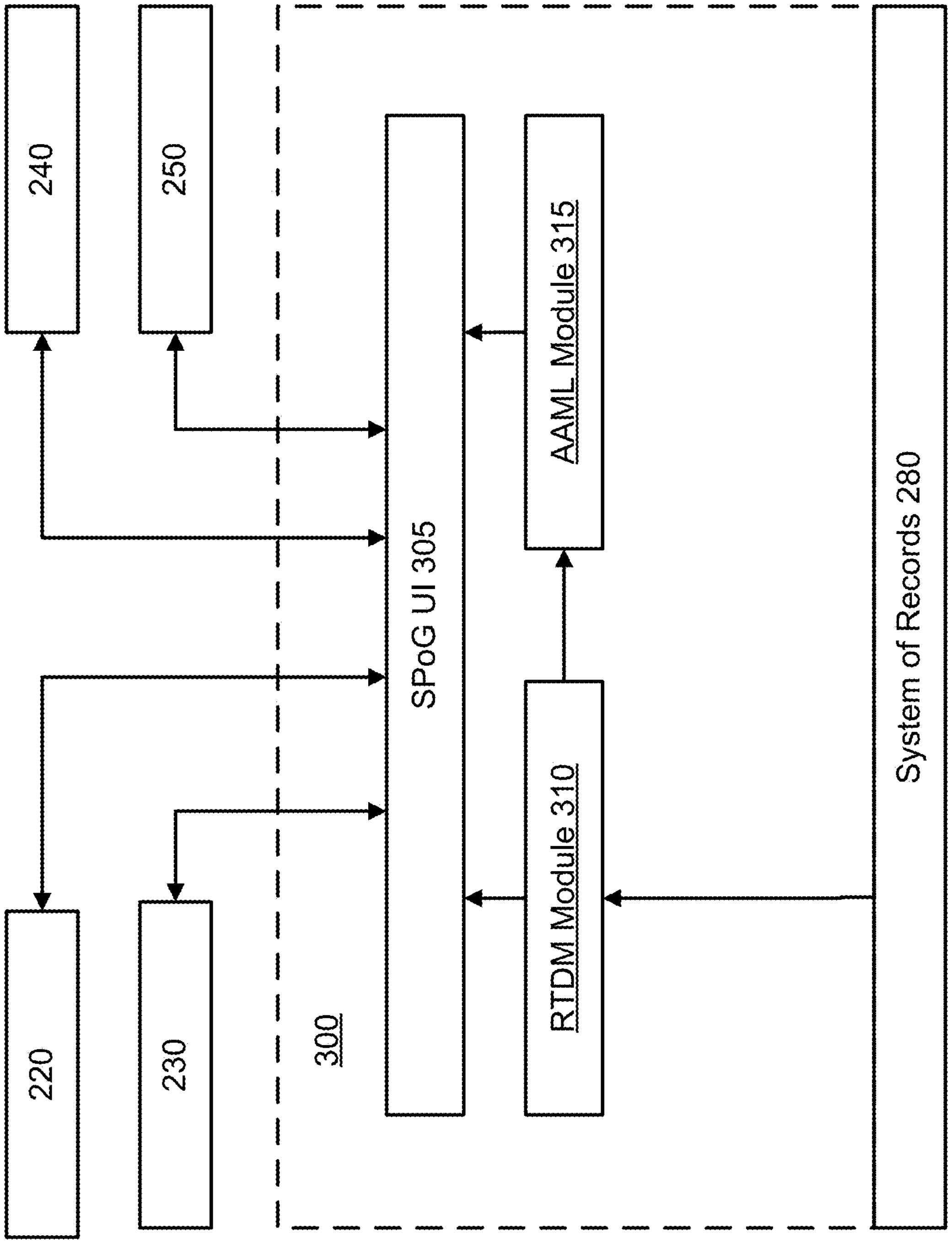
FIG. 3 illustrates an embodiment of a system for distribution management.

FIG. 3 illustrates a system 300 for supply chain and distribution management. System 300 (FIG. 3) is a supply chain and distribution management solution configured to address the challenges faced by fragmented distribution ecosystems in the global distribution industry. System 300 can include several interconnected components and modules that work in harmony to optimize supply chain and distribution operations, enhance collaboration, and drive business efficiency.

The Single Pane of Glass (SPoG) UI 305 serves as a centralized user interface, providing users with a unified view of the entire supply chain. It consolidates information from various sources and presents real-time data, analytics, and functionalities tailored to the specific roles and responsibilities of users. By offering a customizable and intuitive dashboard-style layout, the SPoG UI enables users to access relevant information and tools, empowering them to make data-driven decisions and efficiently manage their supply chain and distribution activities.

For example, a logistics manager can use the SPoG UI to monitor the status of shipments, track delivery routes, and view real-time inventory levels across multiple warehouses. They can visualize data through interactive charts and graphs, such as a map displaying the current location of each shipment or a bar chart showing inventory levels by product category. By having a unified view of the supply chain, the logistics manager can identify bottlenecks, optimize routes, and ensure timely delivery of goods.

The SPoG UI 305 integrates with other modules of System 300, facilitating real-time data exchange, synchronized operations, and workflows. Through API integrations, data synchronization mechanisms, and event-driven architectures, SPoG UI 305 ensures smooth information flow and enables collaborative decision-making across the distribution ecosystem. SPoG UI 305 is designed with a user-centric approach, featuring an intuitive and responsive layout. It utilizes front-end technologies to render dynamic and interactive data visualizations. Customizable dashboards allow users to tailor their views based on specific roles and requirements. The UI supports drag-and-drop functionality for ease of use, and its adaptive design ensures compatibility across various devices and platforms. Advanced filtering and search capabilities enable users to efficiently navigate and access relevant supply chain data and insights.

For instance, when a purchase order is generated in the SPoG UI, the system automatically updates the inventory levels, triggers a notification to the warehouse management system, and initiates the shipping process. This integration enables efficient order fulfillment, reduces manual errors, and enhances overall supply chain visibility.

The Real-Time Data Mesh (RTDM) module 310 is another component of System 300, responsible for ensuring the flow of data within the distribution ecosystem. It aggregates data from multiple sources, harmonizes it, and ensures its availability in real-time.

In a distribution network, the RTDM module collects data from various systems, including inventory management systems, point-of-sale terminals, and customer relationship management systems. It harmonizes this data by aligning formats, standardizing units of measurement, and reconciling any discrepancies. The harmonized data can be then made available in real-time, allowing users to access accurate and current information across the supply chain.

The RTDM module 310 can be configured to capture changes in data across multiple transactional systems in real-time. It employs a sophisticated Change Data Capture (CDC) mechanism that constantly monitors the transactional systems, detecting any updates or modifications. The CDC component can be specifically configured to work with various transactional systems, including legacy ERP systems, Customer Relationship Management (CRM) systems, and other enterprise-wide systems, ensuring compatibility and flexibility for businesses operating in diverse environments.

By having access to real-time data, users can make timely decisions and respond quickly to changing market conditions. For example, if the RTDM module detects a sudden spike in demand for a particular product, it can trigger alerts to the production team, enabling them to adjust manufacturing schedules and prevent stockouts.

The RTDM module 310 facilitates data management within supply chain operations. It enables real-time harmonization of data from multiple sources, freeing vendors, resellers, customers, and end customers from constraints imposed by legacy ERP systems. This enhanced flexibility supports improved efficiency, customer service, and innovation.

Another component of System 300 is the Advanced Analytics and Machine Learning (AAML) module 315. Leveraging powerful analytics tools and algorithms such as Apache Spark, TensorFlow, or scikit-learn, the AAML module extracts valuable insights from the collected data. It enables advanced analytics, predictive modeling, anomaly detection, and other machine learning capabilities.

For instance, the AAML module can analyze historical sales data to identify seasonal patterns and predict future demand. It can generate forecasts that help optimize inventory levels, ensure stock availability during peak seasons, and minimize excess inventory costs. By leveraging machine learning algorithms, the AAML module automates repetitive tasks, predicts customer preferences, and optimizes supply chain processes.

In addition to demand forecasting, the AAML module can provide insights into customer behavior, enabling targeted marketing campaigns and personalized customer experiences. For example, by analyzing customer data, the module can identify cross-selling or upselling opportunities and recommend relevant products to individual customers.

Furthermore, the AAML module can analyze data from various sources, such as social media feeds, customer reviews, and market trends, to gain a deeper understanding of consumer sentiment and preferences. This information can be used to inform product development decisions, identify emerging market trends, and adapt business strategies to meet evolving consumer expectations.

System 300 emphasizes integration and interoperability to connect with existing enterprise systems such as ERP systems, warehouse management systems, and customer relationship management systems. By establishing connections and data flows between these systems, System 300 enables smooth data exchange, process automation, and end-to-end visibility across the supply chain. Integration protocols, APIs, and data connectors facilitate communication and interoperability among different modules and components, creating a holistic and connected distribution ecosystem.

The implementation and deployment of System 300 can be tailored to meet specific business needs. It can be deployed as a cloud-native solution using containerization technologies like Docker and orchestration frameworks like Kubernetes. This approach ensures scalability, easy management, and efficient updates across different environments. The implementation process involves configuring the system to align with specific supply chain requirements, integrating with existing systems, and customizing the modules and components based on the business's needs and preferences.

System 300 for supply chain and distribution management is a comprehensive and innovative solution that addresses the challenges faced by fragmented distribution ecosystems. It combines the power of the SPoG UI 305, the RTDM module 310, and the AAML module 315, along with integration with existing systems. By leveraging a diverse technology stack, scalable architecture, and robust integration capabilities, System 300 provides end-to-end visibility, data-driven decision-making, and optimized supply chain operations. The examples and options provided in this description are non-limiting and can be customized to meet specific industry requirements, driving efficiency and success in supply chain and distribution management.

Figure 4:
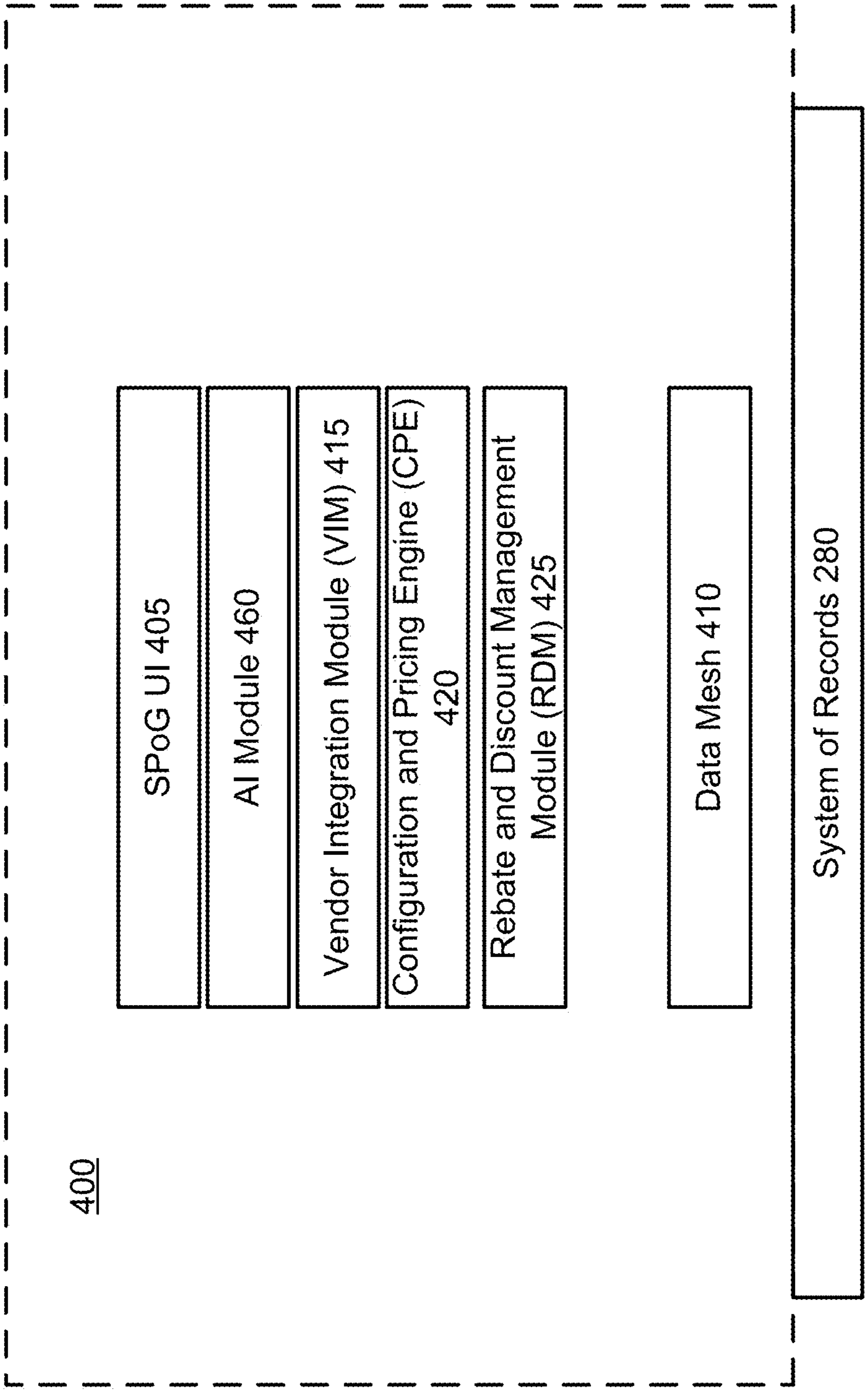
FIG. 4 depicts a system for vendor relationship management processes, according to an embodiment.

FIG. 4 depicts an embodiment of System 400 for automated performing vendor-agnostic CTO/QTO, incorporating the SPoG UI, RTDM, and AI/ML technologies, with interactions to achieve a comprehensive service conversion system. System 400 is configured for integration with existing reseller systems, ensuring efficient data exchange and system synchronization.

The SPoG UI 405 serves as the primary user interface. Users interact with this interface to perform various tasks provides straightforward interaction and customization. It displays information and options that are relevant to the distinct business models and customer demographics of the resellers. It displays real-time data from the Data Mesh 410 and provides controls for initiating actions in System 400. For example, a user can interact with a dynamic display for service options, interactive elements for subscription customization, and tools for real-time feedback on user selections, directly from the SPoG UI 405. It integrates with other system components to reflect accurate service information and user customization options. The SPoG UI is developed using web-based technologies, allowing it to be accessed from various types of devices such as desktop computers, laptops, tablets, and smartphones. SPoG UI 405 provides a comprehensive view of the entire distribution ecosystem, consolidating data and functionalities from various modules into a centralized, easy-to-navigate platform. SPoG UI 405 simplifies the management of complex distribution tasks, offering a streamlined experience for resellers. In some embodiments, SPoG 405 comprises dynamic pricing tools, displaying variable costs based on individual user consumption patterns. Dynamic pricing tools enables the system to manage unique pricing of each vendor without requiring customization for each one, promoting transparency and adaptability in pricing.

Data Mesh 410 is a sophisticated data management layer. It aggregates and harmonizes data from various sources, including ERPs, Vendor platforms, third-party databases, etc., This component ensures that all operational modules in System 400 access consistent and up-to-date information. System 400 can synchronize with existing reseller systems, ensuring efficient data exchange and system functionality Data mesh 410 aggregates, harmonizes, and ensures the real-time availability of data from various systems like inventory management, point-of-sale, and CRM. It employs Change Data Capture (CDC) to track real-time changes in transactional systems. This module standardizes data formats and units, ensuring data consistency and accuracy for decision-making processes related to service offerings.

AI Module 460 uses machine learning algorithms and predictive modeling to automate the conversion of products and services into subscription models. AI Module 460 analyzes market trends, user preferences, and consumption data to dynamically adjust service offerings. AI Module 460 is configured to dynamically adjust pricing and service options based on real-time usage data. This allows for a flexible subscription model that adapts to changing user needs and consumption habits.

AI Module 460 includes decision support systems for tailoring subscriptions based on sophisticated data analysis. In some embodiments, AI Module 460 employs deep learning neural networks, specifically convolutional neural networks (CNNs) and recurrent neural networks (RNNs), for pattern recognition and time-series analysis. For example, CNNs can be used to identify trends and patterns in market data, while RNNs, particularly LSTM (Long Short-Term Memory) networks, can analyze sequential data, such as time-based user interaction patterns. In some embodiments, AI module 460 can use decision trees for classification and regression tasks. These trees analyze user data and market conditions to segment users into different categories based on their service preferences. Random forest and gradient boosting algorithms, ensemble methods of decision trees, provide improved accuracy and stability in predictions. In some embodiments, clustering, particularly K-means and hierarchical clustering, is employed to segment the market and user base into distinct groups. Market/user segmentation assists AI Module 460 in understanding varied user preferences and customizing vendor-agnostic CTO/QTO for different market segments.

In some embodiments, AI Module 460 can use reinforcement learning (RL) to adapt service offerings based on user feedback. RL algorithms, particularly Q-learning and policy gradient methods, can adjust models to maximize user satisfaction, learning from each interaction to improve recommendation accuracy. I The module integrates reinforcement learning algorithms to continually adapt service offerings based on user feedback, enhancing the accuracy and relevance of customized subscriptions over time. Further, NLP techniques can be employed to analyze user feedback and queries. Utilizing tokenization, sentiment analysis, and named entity recognition, AI Module 460 interprets user feedback, enhancing the service customization process.

Real-time processing based on Data Mesh 410 enables AI module 460 to dynamically adjust service offerings based on current usage patterns and immediate market feedback. Data Mesh 410 also enables precise tracking of real-time usage data for implementing a usage-based pricing strategy. Data Mesh 410 can include collaborative filtering and content-based recommendation systems to analyze user behavior and preferences, comparing them with similar user profiles or content characteristics to suggest appropriate service adjustments.

In some embodiments, AI Module 460 can integrate predictive analytics tools, employing time series forecasting methods (e.g., AutoRegressive Integrated Moving Average, exponential smoothing, etc.) for predicting future service demand. Optimization algorithms, such as linear programming and genetic algorithms, can facilitate optimal subscription configurations, considering various factors like cost, user preferences, and resource availability to recommend the most effective service bundles. AI Module 460 can employ Monte Carlo simulations and scenario analysis for risk assessment and strategic planning, simulating different market scenarios, evaluating the potential impacts of various subscription models under different conditions.

Vendor Integration Module (VIM) 415 integrates via RTDM 410 with various vendor systems and APIs to collect data on processes, pricing, configurations, rebates, and discounts. It incorporates RTDM 410 as a bridge between System 400 and different vendor platforms, ensuring comprehensive and timely data exchange. In some embodiments, VIM 415 can be configured to perform a vendor process mapping algorithm to map unique processes of each vendor to the standardized processes within System 400. VIM 415 can be configured to identify similarities and differences in vendor workflows and to configure the system accordingly to accommodate vendor-specific requirements.

Configuration and Pricing Engine (CPE) 420 performs standardizing and managing configurations and pricing structures across different vendors. CPE 420 can be configured to implement algorithms to perform additional data normalization processes on data received from various vendors, to ensure consistency and compatibility of disparate ingested data within System 400. In a non-limiting example, CPE 420 may perform a normalization algorithm to standardize data received from different vendors, ensuring uniformity in formats, units, and terminology. CPE 420 harmonizes disparate data structures to generate vendor agnostic data structures to improve processing and analysis. In another non-limiting example, CPE 420 can be configured to perform a dynamic pricing algorithm that dynamically adjusts product prices based on market demand, competition, and other factors driven by insights gleaned via Data Mesh 410 and AI Module 460. CPE 420 can incorporate machine learning models via AI Module 460 to optimize pricing strategies and improve revenue and/or conversion.

Rebate and Discount Management Module (RDM) 425 performs management of rebates and discounts offered by different vendors. RDM 425 employs algorithms to determine the applicability of rebates and discounts based on various factors such as order volume, product mix, and contractual agreements. In a non-limiting example, RDM 425 can be configured to perform a rebate optimization algorithm to analyze historical data and vendor agreements to optimize rebate structures. RDM 425 can identify opportunities gleaned from AI Module 460 to maximize rebate earnings while minimizing costs and ensuring compliance with contractual obligations. RDM 425 can also be configured to implement, via AI Module 460, a discount allocation algorithm to allocate discounts strategically across different products and customers to maximize sales and profitability. The algorithm can consider factors, for example, including customer segmentation, product margins, and promotional objectives to optimize discount distribution.

AI Module 460 can function as a primary component for enhancing algorithm accuracy and adaptability within System 400. In some embodiments, the integration of Data Mesh 410, which aggregates and harmonizes real-time data from various sources ensures that AI Module 460 always has current information for model training, which can facilitate continuous model training. System 400 can include feedback mechanisms in establishing connections between the SPoG UI 405 and AI Module 460, configured to enable System 400 to capture user interactions and outcomes. Such feedback mechanisms can facilitate learning and adaptation based on user feedback. Dynamic model tuning can performed by the integration of AI Module 460 and CPE 420, utilizing real-time insights from Data Mesh 410 to dynamically adjust model parameters and hyperparameters for optimal performance. AI Module 460 can be configured to implement ensemble learning techniques utilizing integration with Vendor Integration Module (VIM) 415 to combine predictions from multiple machine learning models trained on vendor-specific data, thereby improving prediction accuracy and robustness. SPoG UI 405 can integrate Model Explainability methods can be integrated, allowing users to interpret model predictions and understand the rationale behind decision-making processes, enhancing transparency. By leveraging these strategies and the capabilities of System 400's modules and models, Algorithm Accuracy and Adaptability can be significantly enhanced within the Vendor-Agnostic CTO/QTO framework.

System 400 provides a scalable and adaptable system for standardizing processes across various vendors, geographies, and markets while optimizing configurations, pricing, rebates, and discounts. System 400 leverages real-time data processing, AI-driven analytics, and user customization capabilities to provide an efficient, vendor-agnostic platform.

Figure 5:
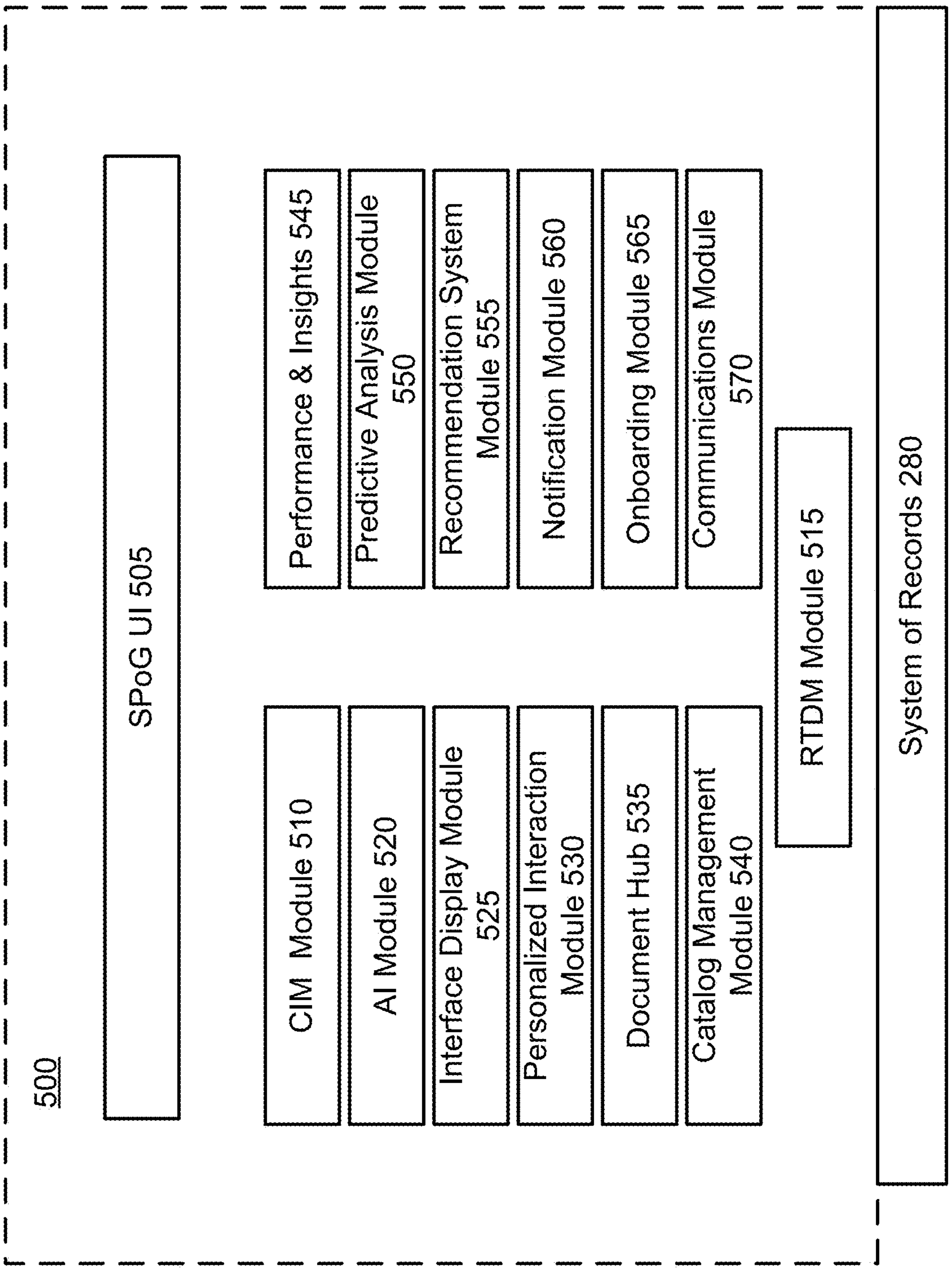
FIG. 5 illustrates an RTDM module, according to an embodiment.

FIG. 5 depicts an embodiment of an advanced distribution platform including System 500 for managing a complex distribution network, which can be an embodiment of System 300, and provides a technology distribution platform for optimizing the management and operation of distribution networks. System 500 includes several interconnected modules, each serving specific functions and contributing to the overall efficiency of supply chain operations. In some embodiments, these modules can include SPoG UI 505, CIM 510, RTDM module 515, AI module 520, Interface Display Module 525, Personalized Interaction Module 530, Document Hub 535, Catalog Management Module 540, Performance and Insight Markers Display 545, Predictive Analytics Module 550, Recommendation System Module 555, Notification Module 560, Self-Onboarding Module 565, and Communication Module 570.

System 500, as an embodiment of System 300, can use a range of technologies and algorithms to enable supply chain and distribution management. These technologies and algorithms facilitate efficient data processing, personalized interactions, real-time analytics, secure communication, and effective management of documents, catalogs, and performance metrics.

The SPoG UI 505, in some embodiments, serves as the central interface within System 500, providing users with a unified view of the entire distribution network. It utilizes frontend technologies such as ReactJS, TypeScript, and Node.js to create interactive and responsive user interfaces. These technologies enable the SPoG UI 505 to deliver a user-friendly experience, allowing users to access relevant information, navigate through different modules, and perform tasks efficiently.

The CIM 510, or Customer Interaction Module, employs algorithms and technologies such as Oracle Eloqua, Adobe Target, and Okta to manage customer relationships within the distribution network. These technologies enable the module to handle customer data securely, personalize customer experiences, and provide access control for users.

The RTDM module 515, or Real-Time Data Mesh module, is a component of System 500 that ensures the smooth flow of data across the distribution ecosystem. It utilizes technologies such as Apache Kafka, Apache Flink, or Apache Pulsar for data ingestion, processing, and stream management. These technologies enable the RTDM module 515 to handle real-time data streams, process large volumes of data, and ensure low-latency data processing. Additionally, the module employs Change Data Capture (CDC) mechanisms to capture real-time data updates from various transactional systems, such as legacy ERP systems and CRM systems. This capability allows users to access current and accurate information for informed decision-making.

The AI module 520 within System 500 can use advanced analytics and machine learning algorithms, including Apache Spark, TensorFlow, and scikit-learn, to extract valuable insights from data. These algorithms enable the module to automate repetitive tasks, predict demand patterns, optimize inventory levels, and improve overall supply chain efficiency. For example, the AI module 520 can utilize predictive models to forecast demand, allowing users to optimize inventory management and minimize stockouts or overstock situations.

The Interface Display Module 525 focuses on presenting data and information in a clear and user-friendly manner. It utilizes technologies such as HTML, CSS, and JavaScript frameworks like ReactJS to create interactive and responsive user interfaces. These technologies allow users to visualize data using various data visualization techniques, such as graphs, charts, and tables, enabling efficient data comprehension, comparison, and trend analysis.

The Personalized Interaction Module 530 utilizes customer data, historical trends, and machine learning algorithms to generate personalized recommendations for products or services. It employs technologies like Adobe Target, Apache Spark, and TensorFlow for data analysis, modeling, and delivering targeted recommendations. For example, the module can analyze customer preferences and purchase history to provide personalized product recommendations, enhancing customer satisfaction and driving sales.

The Document Hub 535 serves as a centralized repository for storing and managing documents within System 500. It utilizes technologies like SeeBurger and Elastic Cloud for efficient document management, storage, and retrieval. For instance, the Document Hub 535 can employ SeeBurger's document management capabilities to categorize and organize documents based on their types, such as contracts, invoices, product specifications, or compliance documents, allowing users to easily access and retrieve relevant documents when needed.

The Catalog Management Module 540 enables the creation, management, and distribution of current product catalogs. It ensures that users have access to the latest product information, including specifications, pricing, availability, and promotions. Technologies like Kentico and Akamai can be employed to facilitate catalog updates, content delivery, and caching. For example, the module can use Akamai's content delivery network (CDN) to deliver catalog information to users quickly and efficiently, regardless of their geographical location.

The Performance and Insight Markers Display 545 collects, analyzes, and visualizes real-time performance metrics and insights related to supply chain operations. It utilizes tools like Splunk and Datadog to enable effective performance monitoring and provide actionable insights. For instance, the module can utilize Splunk's log analysis capabilities to identify performance bottlenecks in the supply chain, enabling users to take proactive measures to optimize operations.

The Predictive Analytics Module 550 employs machine learning algorithms and predictive models to forecast demand patterns, optimize inventory levels, and enhance overall supply chain efficiency. It utilizes technologies such as Apache Spark and TensorFlow for data analysis, modeling, and prediction. For example, the module can utilize TensorFlow's deep learning capabilities to analyze historical sales data and predict future demand, allowing users to optimize inventory levels and minimize costs.

The Recommendation System Module 555 focuses on providing intelligent recommendations to users within the distribution network. It generates personalized recommendations for products or services based on customer data, historical trends, and machine learning algorithms. Technologies like Adobe Target and Apache Spark can be employed for data analysis, modeling, and delivering targeted recommendations. For instance, the module can use Adobe Target's recommendation engine to analyze customer preferences and behavior, and deliver personalized product recommendations across various channels, enhancing customer engagement and driving sales.

The Notification Module 560 enables the distribution of real-time notifications to users regarding important events, updates, or alerts within the supply chain. It utilizes technologies like Apigee X and TIBCO for message queues, event-driven architectures, and notification delivery. For example, the module can utilize TIBCO's messaging infrastructure to send real-time notifications to users' devices, ensuring timely and relevant information dissemination.

The Self-Onboarding Module 565 facilitates the onboarding process for new users entering the distribution network. It provides guided steps, tutorials, or documentation to help users become familiar with the system and its functionalities. Technologies such as Okta and Kentico can be employed to ensure secure user authentication, access control, and self-learning resources. For instance, the module can utilize Okta's identity and access management capabilities to securely onboard new users, providing them with appropriate access permissions and guiding them through the system's functionalities.

The Communication Module 570 enables communication and collaboration within System 500. It provides channels for users to interact, exchange messages, share documents, and collaborate on projects. Technologies like Apigee Edge and Adobe Launch can be employed to facilitate secure and efficient communication, document sharing, and version control. For example, the module can utilize Apigee Edge's API management capabilities to ensure secure and reliable communication between users, enabling them to collaborate effectively.

Thereby, System 500 can incorporate various modules that utilize a diverse range of technologies and algorithms to optimize supply chain and distribution management. These modules, including SPoG UI 505, CIM 510, RTDM module 515, AI module 520, Interface Display Module 525, Personalized Interaction Module 530, Document Hub 535, Catalog Management Module 540, Performance and Insight Markers Display 545, Predictive Analytics Module 550, Recommendation System Module 555, Notification Module 560, Self-Onboarding Module 565, and Communication Module 570, work together to provide end-to-end visibility, data-driven decision-making, personalized interactions, real-time analytics, and streamlined communication within the distribution network. The incorporation of specific technologies and algorithms enables efficient data management, secure communication, personalized experiences, and effective performance monitoring, contributing to enhanced operational efficiency and success in supply chain and distribution management.

Real Time Data Mesh

Figure 6:
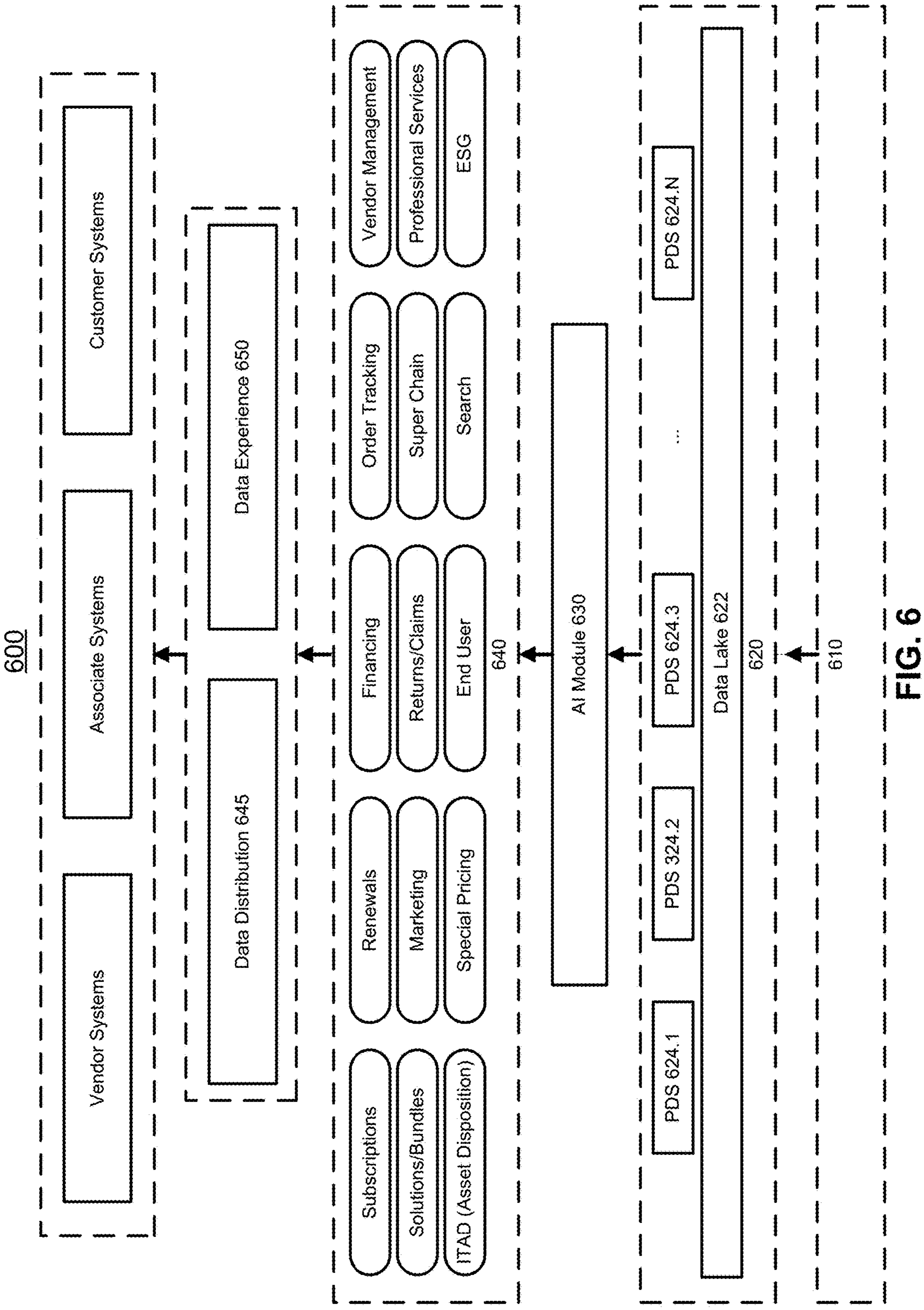
FIG. 6 illustrates a SPoG UI, according to an embodiment.

FIG. 6 illustrates RTDM module 600, according to an embodiment. RTDM module 600, which can be an embodiment of RTDM module 310, can include interconnected components, processes, and sub-systems configured to enable real-time data management and analysis.

The RTDM module 600, as depicted in FIG. 5, represents an effective data mesh and change capture component within the overall system architecture. The module can be configured to provide real-time data management and standardization capabilities, enabling efficient operations within the supply chain and distribution management domain.

RTDM module 600 can include an integration layer 610 (also referred to as a "system of records") that integrates with various enterprise systems. These enterprise systems can include ERPs such as SAP, Impulse, META, and I-SCALA, among others, and other data sources. Integration layer 610 can process data exchange and synchronization between RTDM module 600 and these systems. Data feeds can be established to retrieve relevant information from the system of records, such as sales orders, purchase orders, inventory data, and customer information. These feeds enable real-time data updates and ensure that the RTDM module operates with the most current and accurate data.

RTDM module 600 can include data layer 620 configured to process and translate data for retrieval and analysis. Data layer 620 includes data mesh, a cloud-based infrastructure configured to provide scalable and fault-tolerant data storage capabilities. Within the data mesh, multiple Purposive Datastores (PDS) can be deployed to store specific types of data, such as customer data, product data, or inventory data. Each PDS can be optimized for efficient data retrieval based on specific use cases and requirements. The PDSes can be configured to store specific types of data, such as customer data, product data, finance data, and more. These PDS serve as repositories for canonized and/or standardized data, ensuring data consistency and integrity across the system.

In some embodiments, RTDM module 600 implements a data replication mechanism to capture real-time changes from multiple data sources, including transactional systems like ERPs (e.g., SAP, Impulse, META, I-SCALA). The captured data can then be processed and standardized on-the-fly, transforming it into a standardized format suitable for analysis and integration. This process ensures that the data is readily available and current within the data mesh, facilitating real-time insights and decision-making.

More specifically, data layer 620 within the RTDM module 600 can be configured as a powerful and flexible foundation for managing and processing data within the distribution ecosystem. In some embodiments, data layer 620 can encompasses a highly scalable and robust data lake, which can be referred to as data lake 622, along with a set of purposive datastores (PDSes), which can be denoted as PDSes 624.1 to 624.N. These components integrate to ensure efficient data management, standardization, and real-time availability.

Data layer 620 incudes data lake 622, a state-of-the-art storage and processing infrastructure configured to handle the ever-increasing volume, variety, and velocity of data generated within the supply chain. Built upon a scalable distributed file system, such as Apache Hadoop Distributed File System (HDFS) or Amazon S3, the data lake provides a unified and scalable platform for storing both structured and unstructured data. Leveraging the elasticity and fault-tolerance of cloud-based storage, data lake 622 can accommodate the influx of data from diverse sources.

Associated with data lake 622, a population of purposive datastores, PDSes 624.1 to 624.N, can be employed. Each PDS 624 can function as a purpose-built repository optimized for storing and retrieving specific types of data relevant to the supply chain domain. In some non-limiting examples, PDS 624.1 may be dedicated to customer data, storing information such as customer profiles, preferences, and transaction history. PDS 624.2 may be focused on product data, encompassing details about SKU codes, descriptions, pricing, and inventory levels. These purposive datastores allow for efficient data retrieval, analysis, and processing, catering to the diverse needs of supply chain users.

To ensure real-time data synchronization, data layer 620 can be configured to employ one or more change data capture (CDC) mechanisms. These CDC mechanisms can be integrated with the transactional systems, such as legacy ERPs like SAP, Impulse, META, and I-SCALA, as well as other enterprise-wide systems. CDC constantly monitors these systems for any updates, modifications, or new transactions and captures them in real-time. By capturing these changes, data layer 620 ensures that the data within the data lake 622 and PDSes 624 remains current, providing users with real-time insights into the distribution ecosystem.

In some embodiments, data layer 620 can be implemented to facilitate integration with existing enterprise systems using one or more frameworks, such as .NET or Java, ensuring compatibility with a wide range of existing systems and providing flexibility for customization and extensibility. For example, data layer 620 can utilize the Java technology stack, including frameworks like Spring and Hibernate, to facilitate integration with a system of records having a population of diverse ERP systems and other enterprise-wide solutions. This can facilitate smooth data exchange, process automation, and end-to-end visibility across the supply chain.

In terms of data processing and analytics, data layer 620 can use the capabilities of distributed computing frameworks, such as Apache Spark or Apache Flink in some non-limiting examples. These frameworks can enable parallel processing and distributed computing across large-scale datasets stored in the data lake and PDSes. By leveraging these frameworks, supply chain users can perform complex analytical tasks, apply machine learning algorithms, and derive valuable insights from the data. For instance, data layer 620 can use Apache Spark's machine learning libraries to develop predictive models for demand forecasting, optimize inventory levels, and identify potential supply chain risks.

In some embodiments, data layer 620 can incorporate robust data governance and security measures. Fine-grained access control mechanisms and authentication protocols ensure that only authorized users can access and modify the data within the data lake and PDSes. Data encryption techniques, both at rest and in transit, safeguard the sensitive supply chain information against unauthorized access. Additionally, data layer 620 can implement data lineage and audit trail mechanisms, allowing users to trace the origin and history of data, ensuring data integrity and compliance with regulatory requirements.

In some embodiments, data layer 620 can be deployed in a cloud-native environment, leveraging containerization technologies such as Docker and orchestration frameworks like Kubernetes. This approach ensures scalability, resilience, and efficient resource allocation. For example, data layer 620 can be deployed on cloud infrastructure provided by AWS, Azure, or Google Cloud, utilizing their managed services and scalable storage options. This allows for scaling of resources based on demand, minimizing operational overhead and providing an elastic infrastructure for managing supply chain data.

Data layer 620 of RTDM module 600 can incorporate a highly scalable data lake, data lake 622, along with purpose-built PDSes, PDSes 624.1 to 624.N, and employing CDC mechanisms, data layer 620 ensures efficient data management, standardization, and real-time availability. In a non-limiting example, Data Layer 620 can be implemented utilizing any appropriate technology, such as .NET or Java, and/or distributed computing frameworks like Apache Spark, enables powerful data processing, advanced analytics, and machine learning capabilities. With robust data governance and security measures, data layer 620 ensures data integrity, confidentiality, and compliance. Through its scalable infrastructure and integration with existing systems, data layer 620 enables supply chain users to make data-driven decisions, optimize operations, and drive business success in the dynamic and complex distribution environment.

RTDM module 600 can include an AI module 630 configured to implement one or more algorithms and machine learning models to analyze the stored data in data layer 620 and derive meaningful insights. In some non-limiting examples, AI module 630 can apply predictive analytics, anomaly detection, and optimization algorithms to identify patterns, trends, and potential risks within the supply chain. AI module 630 can continuously learns from new data inputs and adapts its models to provide accurate and current insights. AI module 630 can generate predictions, recommendations, and alerts and publish such insights to dedicated data feeds.

Data engine layer 640 comprises a set of interconnected systems responsible for data ingestion, processing, transformation, and integration. Data engine layer 640 of RTDM module 600 can include a collection of headless engines 640.1 to 640.N that operate autonomously. These engines represent distinct functionalities within the system and can include, for example, one or more recommendation engines, insights engines, and subscription management engines. Engines 640.1 to 640.N can use the standardized data stored in the data mesh to deliver specific business logic and services. Each engine can be configured to be pluggable, allowing for flexibility and future expansion of the module's capabilities. Exemplary engines are shorn in FIG. 5, which are not intended to be limiting. Any additional headless engine can be included in data engine layer 640 or in other exemplary layers of the disclosed system.

These systems can be configured to receive data from multiple sources, such as transactional systems, IoT devices, and external data providers. The data ingestion process involves extracting data from these sources and transforming it into a standardized format. Data processing algorithms can be applied to cleanse, aggregate, and enrich the data, making it ready for further analysis and integration.

Further, to facilitate integration and access to RTDM module 600, a data distribution mechanism can be employed. Data distribution mechanism 645 can be configured to include one or more APIs to facilitate distribution of data from the data mesh and engines to various endpoints, including user interfaces, micro front ends, and external systems.

Experience layer 650 focuses on delivering an intuitive and user-friendly interface for interacting with supply chain data. Experience layer 650 can include data visualization tools, interactive dashboards, and user-centric functionalities. Through this layer, users can retrieve and analyze real-time data related to various supply chain metrics such as inventory levels, sales performance, and customer demand. The user experience layer supports personalized data feeds, allowing users to customize their views and receive relevant updates based on their roles and responsibilities. Users can subscribe to specific data updates, such as inventory changes, pricing updates, or new SKU notifications, tailored to their preferences and roles.

Thereby, in some embodiments, RTDM module 600 for supply chain and distribution management can include an integration with a system of records and include one or more of a data layer with a data mesh and purposive datastores, an AI component, a data engine layer, and a user experience layer. These components work together to provide users with intuitive access to real-time supply chain data, efficient data processing and analysis, and integration with existing enterprise systems. The technical feeds and retrievals within the module ensure that users can retrieve relevant, current information and insights to make informed decisions and optimize supply chain operations. Accordingly, RTDM module 600 facilitates supply chain and distribution management by providing a scalable, real-time data management solution. Its innovative architecture allows for the rich integration of disparate data sources, efficient data standardization, and advanced analytics capabilities. The module's ability to replicate and standardize data from diverse ERPs, while maintaining auditable and repeatable transactions, provides a distinct advantage in enabling a unified view for vendors, resellers, customers, end customers, and other entities in a distribution system, including an IT distribution system.

Vendor-Agnostic CTO/QTO Management

Figure 7:
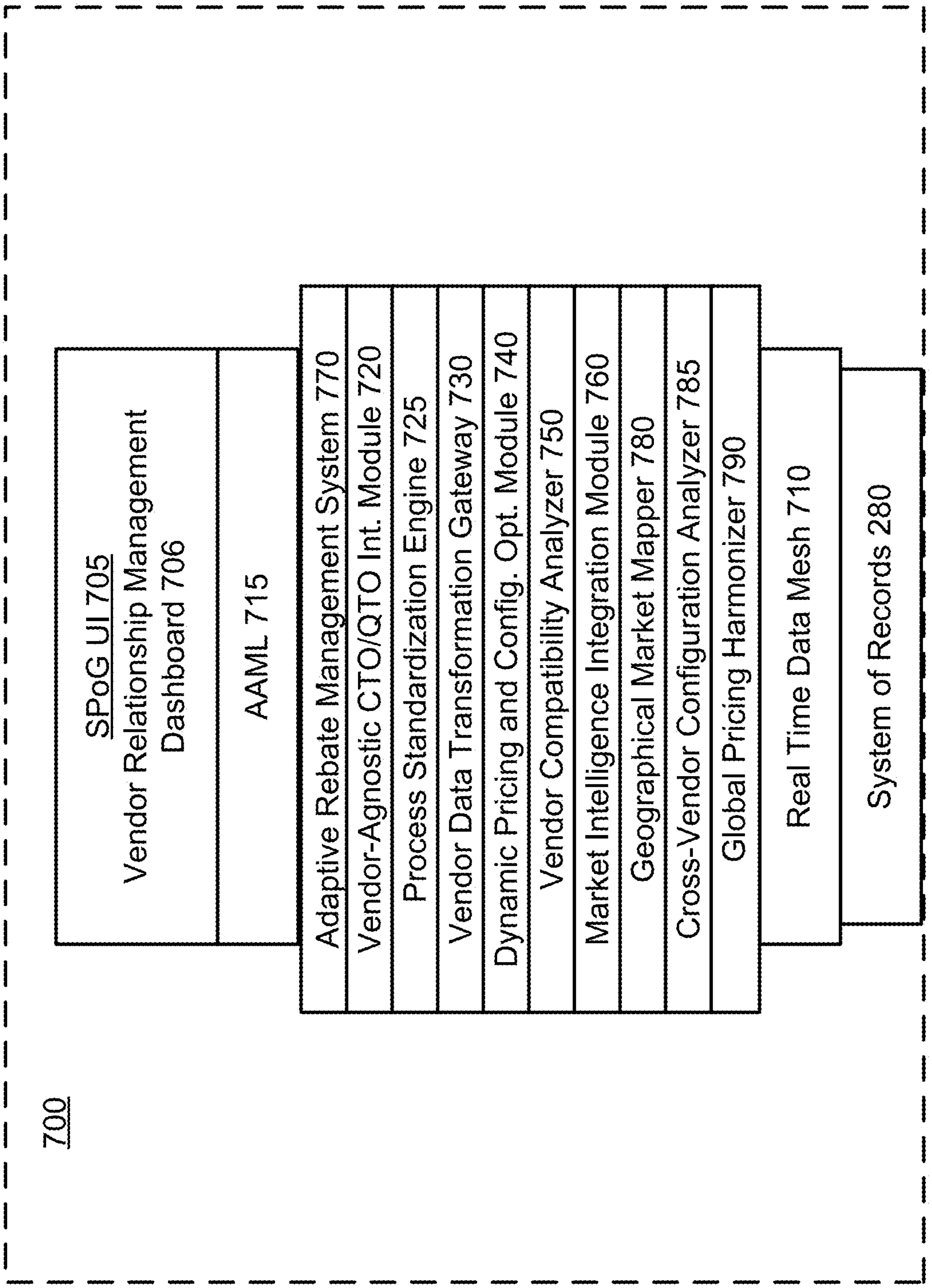
FIG. 7 illustrates a system for vendor relationship management, according to an embodiment.

In an embodiment, FIG. 7 depicts System 700 for managing vendor relationships, standardizing processes, optimizing pricing strategies, and enhancing customer experiences across diverse markets and geographies. System 700 includes the Real-Time Data Mesh 710, Single Pane of Glass User Interface (SPoG UI) 705, Advanced Analytics and Machine-Learning (AAML) Module 715, and Vendor-Agnostic CTO/QTO Integration Module 720.

In some embodiments, SPoG UI 705, which can be an embodiment of SPoG UIs described above, can be enhanced with a one-click conversion feature, allowing users to instantly convert their shopping cart into a subscription-based service model, thereby simplifying processes across multiple vendors, geographies, and markets, ensuring scalability and adaptability.

RTDM 710 aggregates and standardizes real-time data from various sources, crucial for the efficient operation of the Vendor-Agnostic CTO/QTO Integration Module 720.

This includes data on product specifications, subscription usage patterns, and market trends. RTDM 710 establishes a centralized, unified data hub, aggregating and standardizing data from multiple sources such as ERPs, CRM systems, and market intelligence. It utilizes a blend of data warehousing and data lakes to handle both structured and unstructured data efficiently. RTDM 710 employs ETL processes and data normalization techniques to ensure uniformity and accessibility of data. This standardized data is vital for the functioning of Vendor-Agnostic CTO/QTO Integration Module 720, supplying the required inputs for precise and effective conversion of products into subscription-based services. RTDM 710 maintains data integrity and relevance, vital for the automated processes of standardizing processes across multiple vendors, geographies, and markets. In some embodiments, RTDM 710 is configured to interface with asset management systems, supporting the management of asserts across multiple vendors, geographies, and markets, ensuring scalability and adaptability.

AAML Module 715 functions as the central processing unit for the vendor-agnostic process. It contains specialized rules and algorithms designed for key tasks in vendor-agnostic CTO/QTO processes, such as managing vendor relationships, standardizing data and processes, optimizing pricing strategies, and applying dynamic pricing strategies. AAML Module 715 employs analytics tools for big data processing and deep learning capabilities. It conducts sentiment analysis, trend forecasting, and behavioral analytics to understand and anticipate market and user demands. AAML Module 715 integrates and trains machine learning algorithms based on historical data sets to identify usage patterns and make predictive recommendations for subscription models. It adapts its algorithms based on continuous feedback loops, refining its precision over time. This module performs functions critical to automate processes across multiple vendors, geographies, and markets, ensuring scalability and adaptability.

In an embodiment, Vendor-Agnostic CTO/QTO Integration Module (VACIM) 720 is configured to standardize processes across multiple vendors, geographies, and markets, ensuring scalability and adaptability. VACIM 720 implements RTDM as a bridge between the Real-Time Data Mesh (RTDM) and vendor systems, facilitating management of vendor relationships, standardizing processes, optimizing pricing strategies, and enhancing customer experiences across diverse markets and geographies.

VACIM 710 can include Process Standardization Engine 725 for standardizing vendor-specific processes, pricing structures, configuration options, and discount mechanisms. Leveraging advanced algorithms and rules, this engine ensures consistency and uniformity across diverse vendor offerings. It dynamically adjusts to accommodate variations in vendor processes, effectively addressing scalability challenges.

VACIM 710 can additionally include Vendor Data Transformation Gateway 730 for transforming raw vendor data into a standardized format compatible with the RTDM. It employs intelligent data mapping techniques and machine learning algorithms to interpret and translate vendor-specific data schemas into a unified format. This gateway facilitates real-time data ingestion and synchronization from various vendors, enabling timely updates and insights.

Dynamic Pricing and Configuration Optimization Module 740, integrated with AAML Module 715, can implement and extend its functionality to support dynamic pricing strategies and product configuration optimization specific to a Vendor-Agnostic CTO/QTO framework. This module utilizes historical sales data, market trends, and vendor-specific pricing structures to optimize subscription models and configuration options. It employs advanced analytics and machine learning algorithms to predict demand patterns and recommend personalized subscription plans tailored to individual users and market segments.

Vendor Compatibility Analyzer 750 can integrate with AAML Module 715 to assess the compatibility of products from different vendors for service conversion within the Vendor-Agnostic CTO/QTO framework. Vendor Compatibility Analyzer 750 can analyze product specifications, feature sets, and interoperability requirements to determine the feasibility of bundling products into subscription-based services. This analyzer utilizes machine learning algorithms to identify synergies and dependencies among vendor offerings, optimizing service combinations for maximum value and customer satisfaction.

Market Intelligence Integration Module 760 can gather and analyze information via RTDM 710 and AAML Module 715, including information about market trends, competitor strategies, and customer preferences relevant to the Vendor-Agnostic CTO/QTO framework. Market Intelligence Integration Module 760 can aggregate via RTDM 710 external data sources, such as industry reports, social media feeds, and customer feedback platforms, to provide actionable insights for product positioning, pricing decisions, and market segmentation. This module integrates with the AAML Module to enrich the decision-making process and ensure alignment with market dynamics.

VACIM 720 can integrate an Adaptive Rebate Management System 770 to automate management of vendor rebates, incentives, and discounts within the Vendor-Agnostic CTO/QTO framework. Adaptive Rebate Management System 770 can dynamically calculate and applies rebates based on predefined rules, vendor agreements, and real-time sales data. Leveraging machine learning algorithms, this system optimizes rebate structures to incentivize desired behaviors while maximizing profitability and vendor relationships.

Geographical Market Mapper 780 can integrate with RTDM 710 to map geographical regions to specific vendor offerings, pricing tiers, and regulatory requirements within the Vendor-Agnostic CTO/QTO framework. Geographical Market Mapper 780 can provide insights into regional demand patterns, competitive landscapes, and market saturation levels, enabling strategic decision-making and localized product customization. Geographical Market Mapper 780 integrates with the VACIM 720 to ensure alignment between geographical market dynamics and vendor engagement strategies.

Cross-Vendor Configuration Analyzer 785 integrated with AAML Module 715 can be configured to evaluate compatibility and interoperability of product configurations across multiple vendors within the Vendor-Agnostic CTO/QTO framework. It employs machine learning algorithms to analyze configuration data, identify conflicts or dependencies, and recommend harmonized configurations that meet customer requirements while maximizing vendor flexibility. This analyzer enhances the configurability and scalability of subscription-based services across diverse vendor portfolios.

Global Pricing Harmonizer 790 integrated with VACIM 720 can be configured to harmonize pricing structures and discount mechanisms across different geographical markets within the Vendor-Agnostic CTO/QTO framework. It accounts for currency fluctuations, taxation policies, and regional purchasing power parity to ensure pricing parity and affordability across diverse customer segments. Global Pricing Harmonizer 790 can be configured to perform predictive analytics and optimization algorithms to balance global competitiveness with local market dynamics, fostering sustainable growth and customer loyalty.

Vendor Relationship Management Dashboard 706 can be integrated with SPoG UI 705 to provide stakeholders with real-time visibility into vendor performance, engagement metrics, and strategic partnerships within the Vendor-Agnostic CTO/QTO framework. Vendor Relationship Management Dashboard 706 can consolidate vendor-related data, including transactional histories, communication logs, and contract terms, into actionable insights for informed decision-making and collaborative vendor management. This dashboard enhances transparency, accountability, and trust in vendor relationships, driving mutual value creation and innovation.

Thereby, System 700 is configured to integrate data from multiple sources into a unified interface via the SPoG UI 705, automate various tasks in the vendor-agnostic process management via the AAML 715, and maintain a real-time, standardized data repository via the RTDM 710. This architecture enables efficient and accurate processes for managing vendor relationships, standardizing processes, optimizing pricing strategies, and enhancing customer experiences across diverse markets and geographies.

Figure 8:
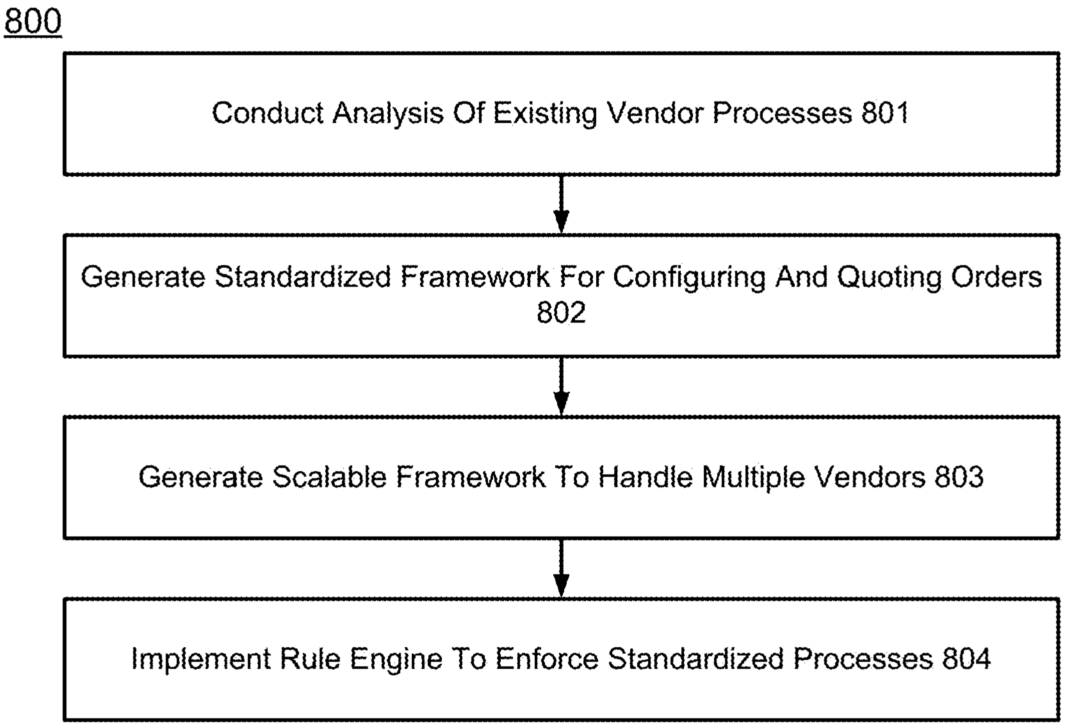
FIG. 8 is a flow diagram of a method for vendor relationship management processes, according to some embodiments of the present disclosure.

FIG. 8 illustrates a flow diagram of method 800 for Process Standardization and Scalability. This flowchart describes operations aimed at analyzing vendor processes, developing a standardized framework, designing scalability, and implementing a rule engine. The method can be implemented in one of the embodiments described herein, such as System 700.

At Operation 801, the process begins with conducting a thorough analysis of existing vendor processes. Real-Time Data Mesh (RTDM) 710 aggregates and standardizes real-time data from various sources, including vendor processes, crucial for understanding the intricacies of each vendor's operations.

Operation 801 can include leveraging Advanced Analytics and Machine-Learning (AAML) Module 715 to analyze vendor processes. Machine learning algorithms are employed to identify commonalities and differences across vendors, extracting valuable insights to inform the standardization process.

At Operation 802, based on the analysis conducted in Operation 801, a standardized framework for configuring and quoting orders is developed. Vendor-Agnostic CTO/QTO Integration Module (VACIM) 720 incorporates a transformation layer that absorbs and standardizes different vendor processes, enabling the development of this framework.

Operation 802 can include utilizing Process Standardization Engine 725 within VACIM 720 to develop standardized processes. This engine employs advanced algorithms and rules to ensure consistency and uniformity across diverse vendor offerings, accommodating variations in vendor processes.

At Operation 803, the framework is designed to be scalable, ensuring that it can handle a plurality of vendors without requiring customization for each one. This scalability design is crucial for the efficient operation of the Vendor-Agnostic CTO/QTO framework across diverse geographies and markets.

Operation 803 can include integrating Scalability Design features within VACIM 720. This involves designing the framework architecture to accommodate dynamic scaling requirements, leveraging cloud-based infrastructure and distributed computing technologies.

At Operation 804, a rule engine is implemented to enforce standardized processes and automate decision-making based on predefined rules. This rule engine plays a pivotal role in ensuring consistency and efficiency within the standardized framework.

Operation 804 can include integrating a Rule Engine within VACIM 720. The Rule Engine utilizes algorithms to enforce standardized processes and automate decision-making, reducing manual intervention and ensuring adherence to predefined rules.

Thereby, method 800 facilitates the standardization and scalability of vendor processes within the Vendor-Agnostic CTO/QTO framework, ensuring efficient handling of orders across diverse vendors, geographies, and markets.

Figure 9:
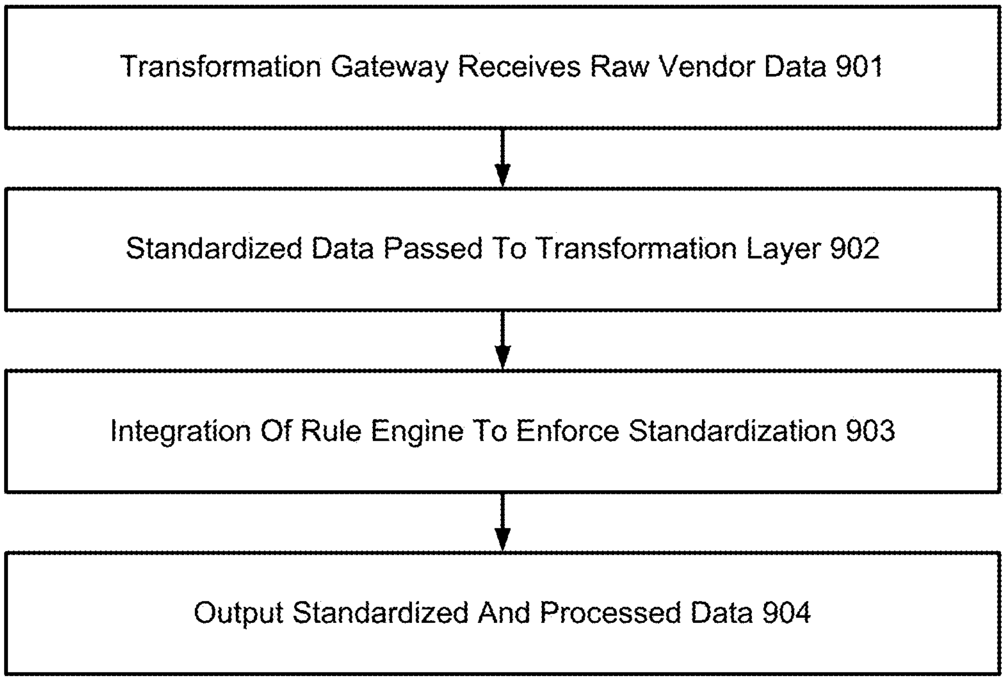
FIG. 9 is a flow diagram for automated services configuration in a vendor relationship management system, according to some embodiments of the present disclosure.

FIG. 9 illustrates a flow diagram of method 900 for integrating rules with the transformation layer and gateway to enforce standardization rules and automate data processing tasks. This flowchart describes operations involved in processing vendor data effectively and enforcing standardization rules within the Vendor-Agnostic CTO/QTO framework as implemented in System 700.

At Operation 901, the method begins with the transformation gateway receiving raw vendor data from various sources, including ERPs, CRM systems, and market intelligence. A Transformation Gateway can be provided for processing vendor data effectively and integrating it with the vendor's systems.

Operation 901 can include the transformation gateway employing data mapping techniques to interpret and translate vendor-specific data schemas into a unified format. This process ensures that data from different vendors are standardized and compatible with downstream systems, facilitating integration.

At Operation 902, the transformation gateway passes the standardized data to the transformation layer. The Transformation Layer can be provided for absorbing and standardizing different vendor processes, transforming them into a unified format.

Operation 902 can include the transformation layer applying predefined standardization rules to the incoming data. These rules enforce consistency and uniformity across diverse vendor offerings, ensuring that all data processed by the system adheres to established standards.

At Operation 903, the transformation layer integrates the rule engine to enforce standardization rules and automate data processing tasks. This operation involves rule engine integration within System 700, ensuring that standardization rules are enforced consistently throughout the data processing pipeline.

Operation 903 can include the rule engine analyzing incoming data and applying predefined rules to identify and correct inconsistencies or deviations from the standard format. This automated process reduces the need for manual intervention, improving efficiency and accuracy in data processing tasks.

At Operation 904, the transformation layer outputs the standardized and processed data for further downstream processing or analysis. This operation finalizes the data processing pipeline within the Vendor-Agnostic CTO/QTO framework, ensuring that vendor data is effectively standardized and usable in configuring and quoting orders.

Thereby, method 900 integrates a transformation layer, transformation gateway, and rule engine to enforce standardization rules and automate data processing tasks, facilitating efficient handling of vendor data across diverse geographies and markets.

Figure 10:
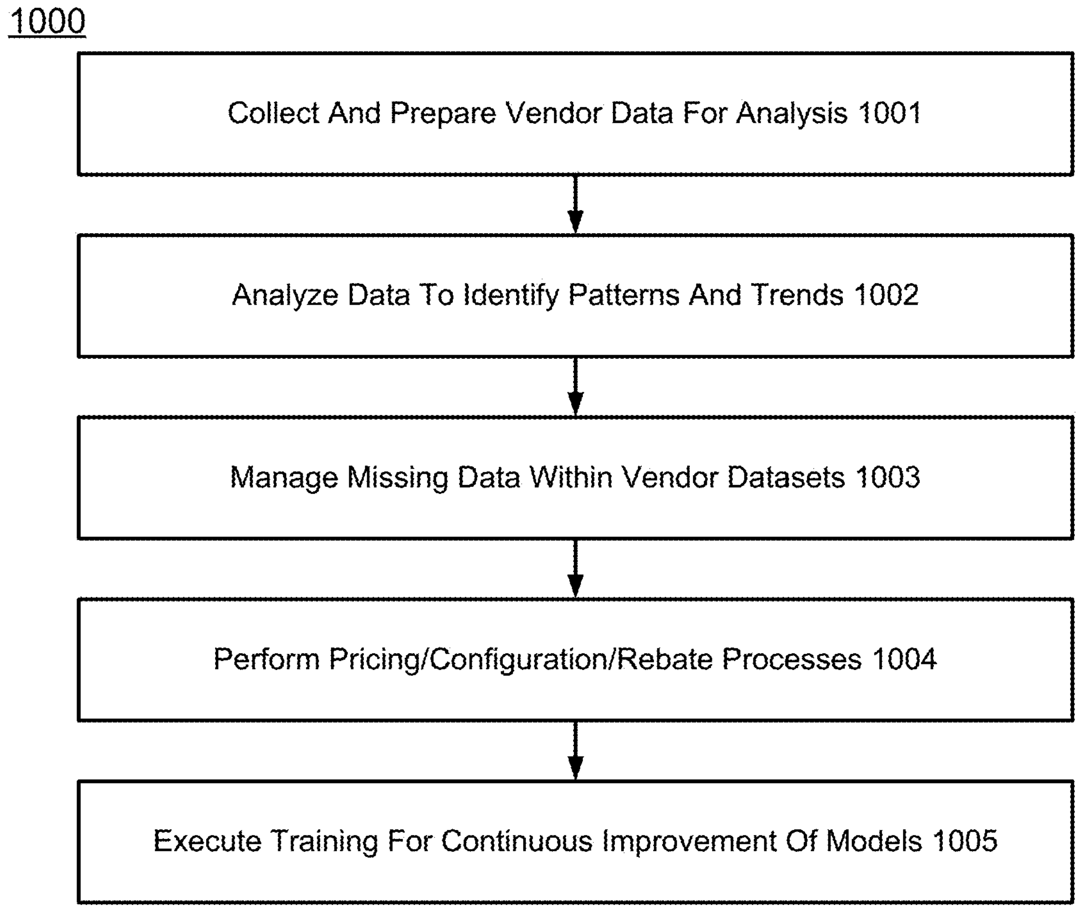
FIG. 10 is a flow diagram for automated data management and analysis processes in a vendor relationship management system, according to some embodiments of the present disclosure.

FIG. 10 illustrates a flow diagram of method 1000 for Machine Learning and Data Processing. This flowchart describes operations aimed at analyzing vendor data, handling missing data, making automated decisions, and ensuring continuous improvement using machine learning algorithms. This method can be implemented in one of the embodiments described herein, such as System 700.

At Operation 1001, vendor data is collected and prepared for analysis. This operation involves extracting data from various sources, such as ERP systems, CRM systems, and external market intelligence sources. The Real-Time Data Mesh (RTDM) 710 aggregates and standardizes this data, ensuring it is ready for analysis.

Operation 1001 can include preprocessing steps such as data cleaning, normalization, and feature engineering to ensure the quality and relevance of the data for analysis. Techniques such as outlier detection and removal algorithms can be utilized to ensure data quality. Normalization methods such as Min-Max scaling or Z-score normalization may be employed to standardize data across different scales. Feature engineering techniques like Principal Component Analysis (PCA) or feature selection algorithms can be used to extract relevant features for analysis.

At Operation 1002, the prepared data undergoes analysis to identify patterns and trends using machine learning algorithms. The Advanced Analytics and Machine-Learning (AAML) Module 715 functions as the central processing unit for this analysis. It employs techniques such as regression analysis, clustering, and classification to uncover insights from the data.

Operation 1002 can include the application of algorithms such as k-means clustering to segment vendors based on their behavior or decision trees to identify factors influencing pricing strategies. Clustering algorithms such as k-means or hierarchical clustering may be employed to segment vendors based on their behavior or characteristics. Classification algorithms like decision trees, support vector machines (SVM), or random forests can be applied to classify vendors into different categories based on predefined criteria.

At Operation 1003, algorithms can be performed to handle missing data within the vendor datasets. A Missing Data Handling component of AAML Module 715 can be structured to utilize techniques such as imputation or predictive modeling to fill gaps in the data, ensuring completeness and accuracy.

Operation 1003 can involve using algorithms like linear regression or random forest to predict missing values based on available data or leveraging techniques like mean imputation or interpolation. Imputation methods such as mean imputation, median imputation, or mode imputation may be implemented to replace missing values with central tendencies. Predictive modeling techniques such as linear regression, decision trees, or K-nearest neighbors (KNN) can be utilized to predict missing values based on other variables in the dataset.

At Operation 1004, machine learning algorithms are implemented to automate decision-making processes based on historical data and predefined rules. This operation leverages the Automated Decision-Making component of the AAML Module 715 to make decisions such as pricing optimization, product configuration, or rebate management.

Operation 1004 can include algorithms like decision trees or reinforcement learning to automate decision-making processes based on predefined rules and historical data. Decision tree algorithms can be integrated to create decision-making models based on predefined rules and historical data. Reinforcement learning techniques may be utilized to enable the system to learn from past decisions and improve decision-making over time.

At Operation 1005, processes are established for continuous improvement of machine learning models based on feedback and changing market dynamics. This operation ensures that the models remain relevant and effective over time, adapting to evolving vendor behavior and market trends. Operation 1005 can involve techniques such as model retraining, A/B testing, or incorporating feedback loops to update algorithms based on new data.

Thereby, method 1000 for Machine Learning and Data Processing enables the efficient analysis of vendor data, handling of missing data, automated decision-making, and continuous improvement using machine learning algorithms within System 700.

Operation 1005 can involve techniques such as model retraining, A/B testing, or incorporating feedback loops to update algorithms based on new data. Online learning algorithms can be implemented to update machine learning models in real-time as new data becomes available. A/B testing methodologies may be utilized to evaluate the performance of updated models against existing ones, and feedback loops can be incorporated to refine algorithms based on user interactions.

Figure 11:
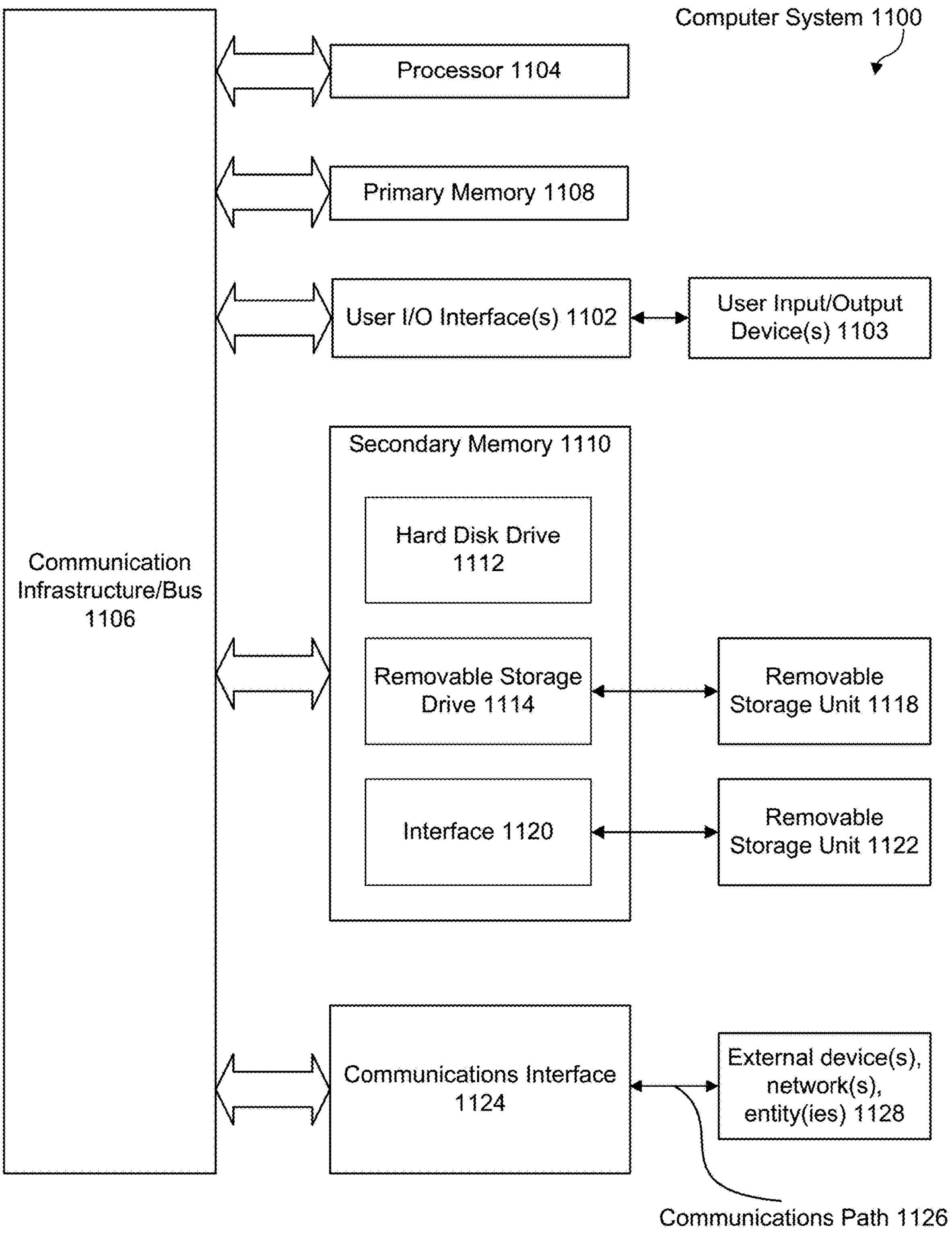
FIG. 11 is a block diagram of example components of device, according to some embodiments of the present disclosure.

FIG. 11 depicts a block diagram of example components of device 1100. One or more computer systems 1100 may be used, for example, to implement any of the embodiments discussed herein, as well as combinations and sub-combinations thereof. Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, keyboards, pointing devices, etc., which may communicate with communication infrastructure 1106 through user input/output interface(s) 1102.

One or more processors 1104 may be a graphics processing unit (GPU). In an embodiment, a GPU may be a processor that can be a specialized electronic circuit configured to process mathematically intensive applications. The GPU may have a parallel structure that can be efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114.

Removable storage drive 1114 may interact with a removable storage unit 1118. Removable storage unit 1118 may include a computer-usable or readable storage device having stored thereon computer software (control logic) and/or data. Removable storage unit 1118 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), may cause such data processing devices to operate as described herein.

Figure 12A:
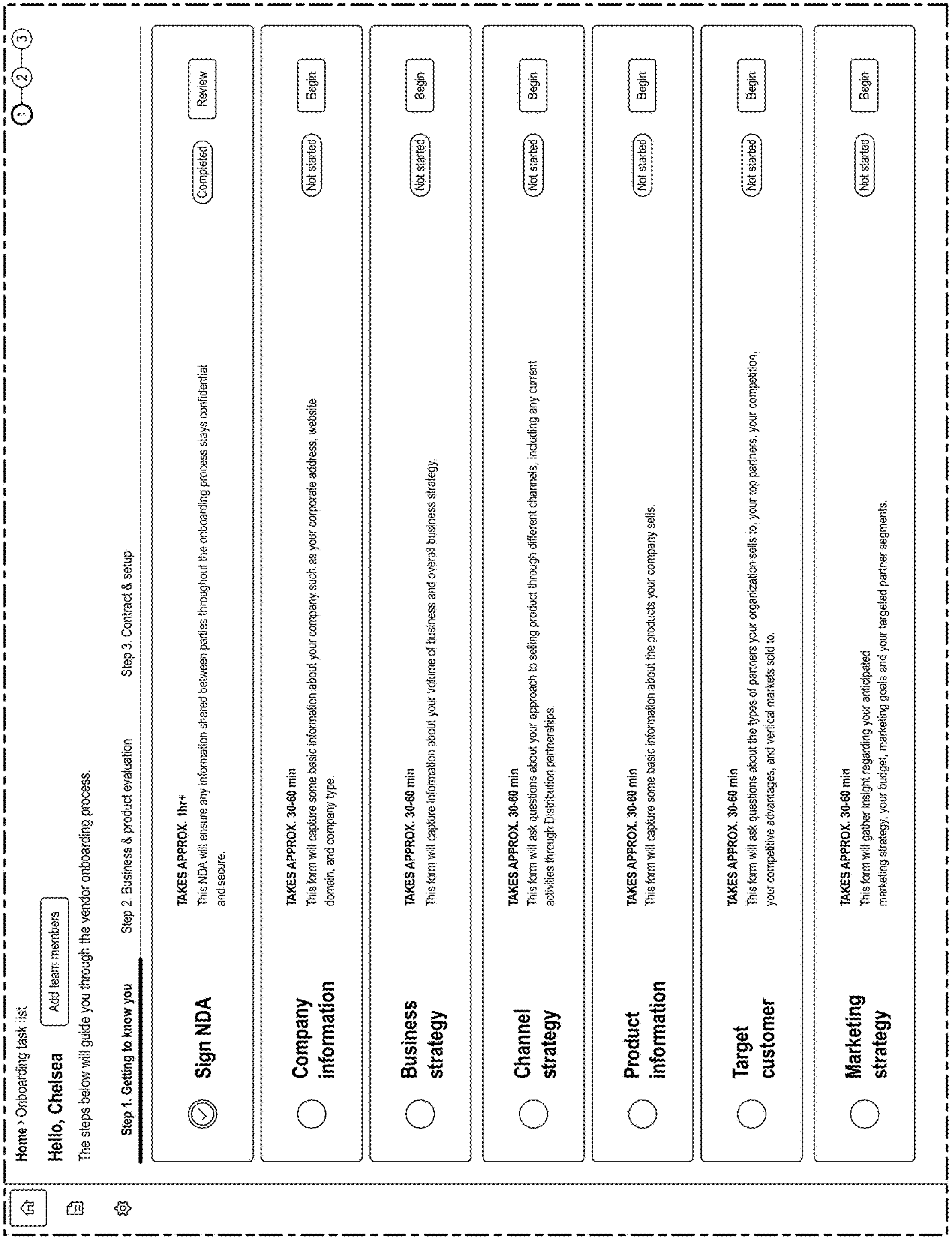
FIGS. 12A to 12Q depict various screens and functionalities of the SPoG UI, according to some embodiments.
Figure 12B:
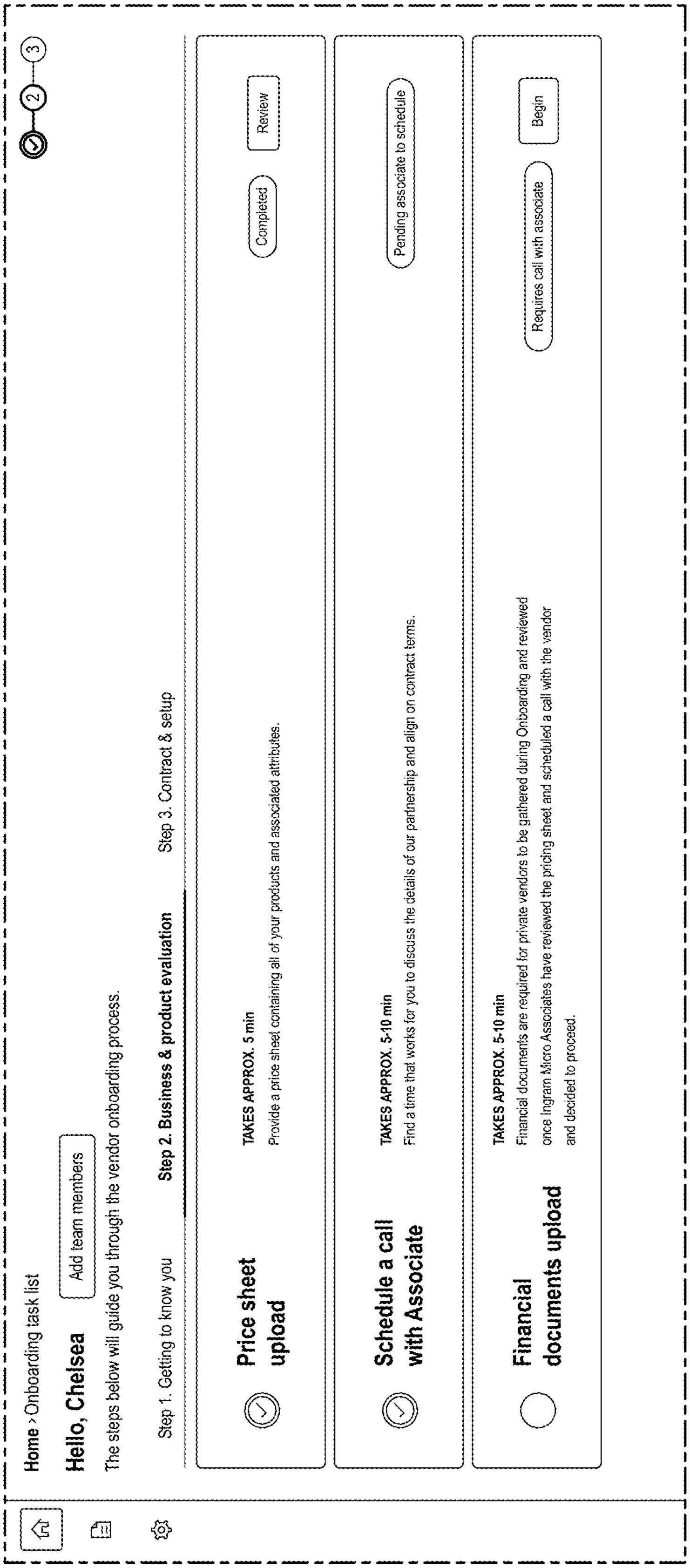
Figure 12C:
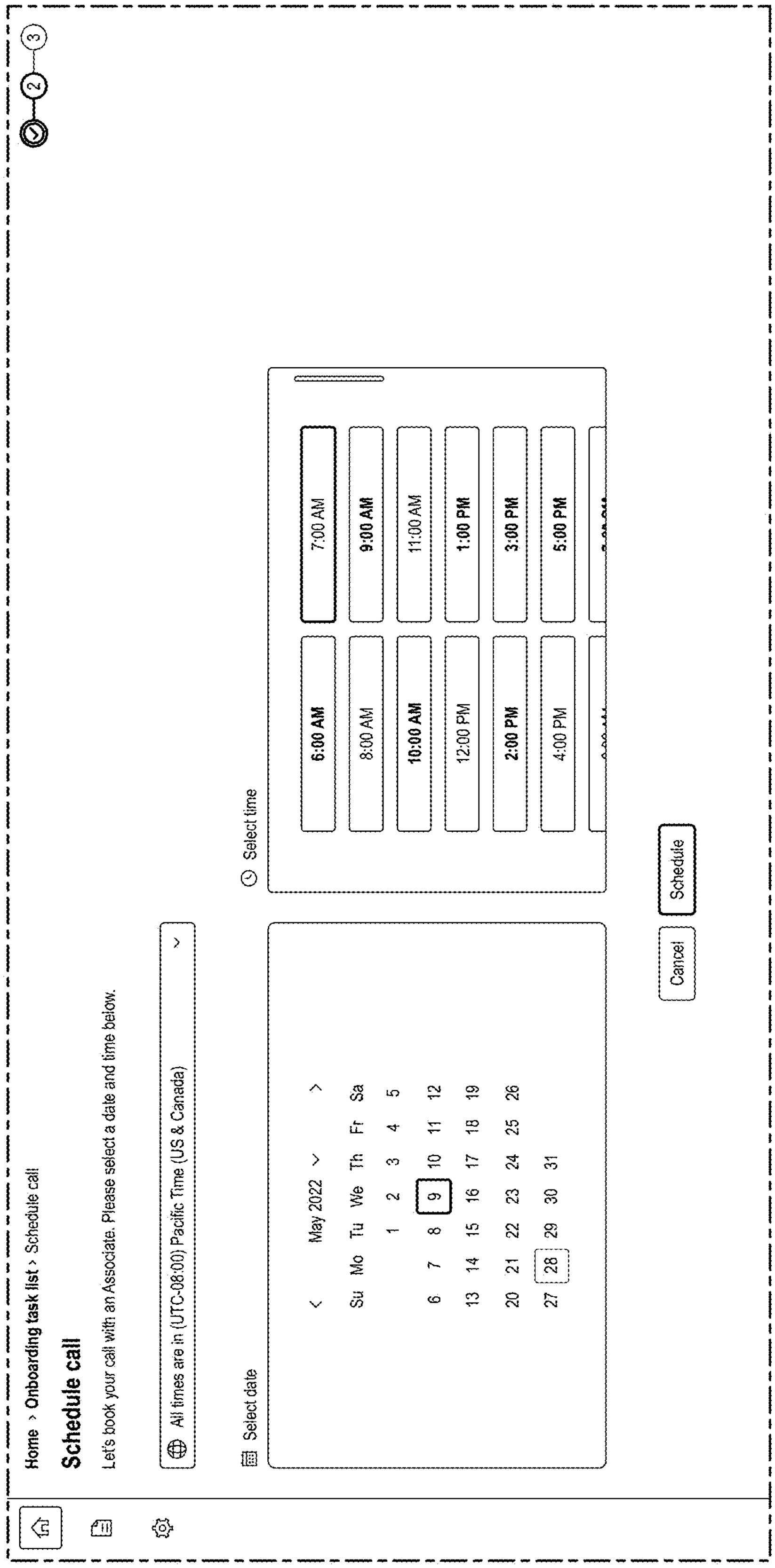
Figure 12D:
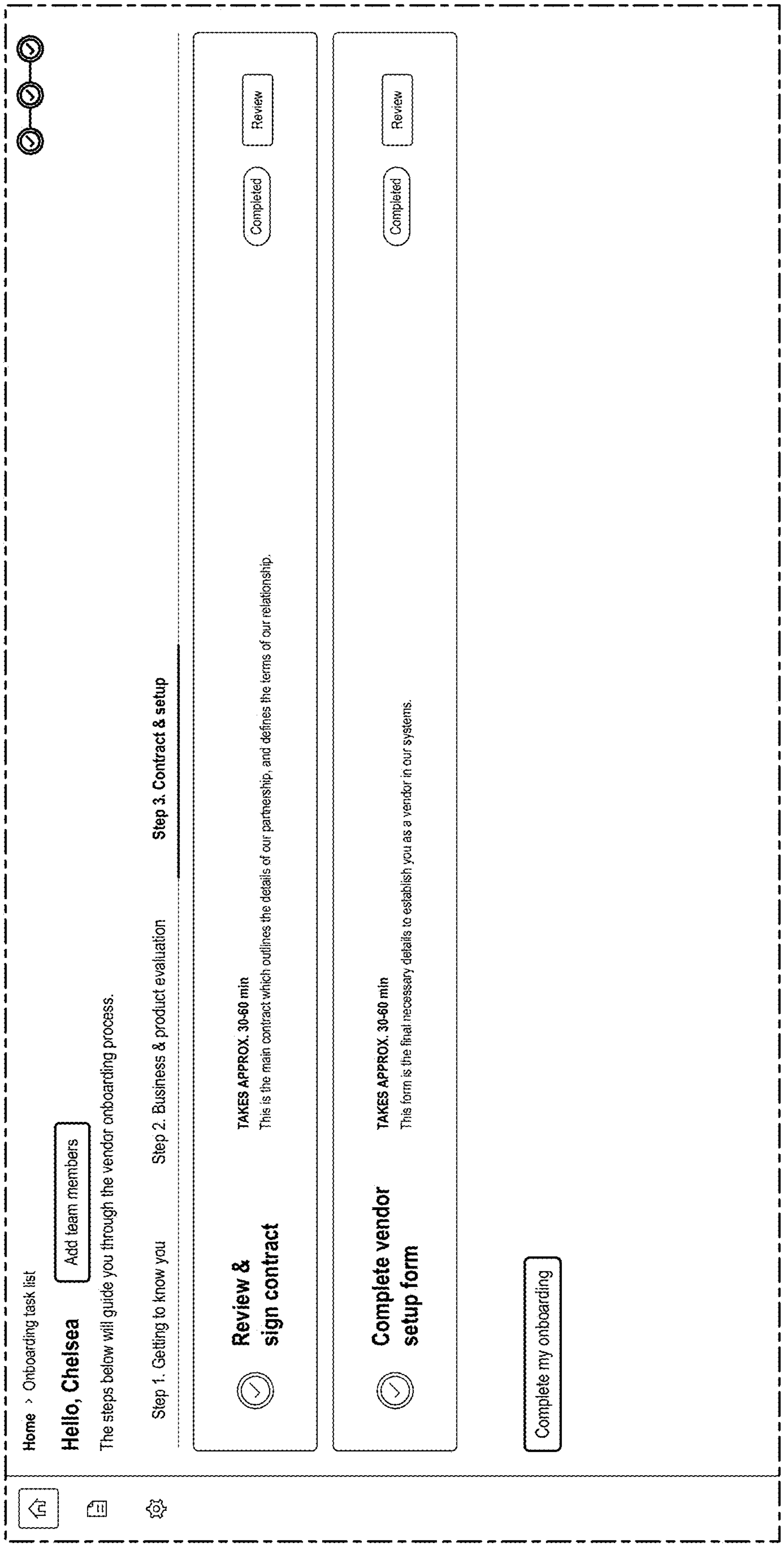
Figure 12E:
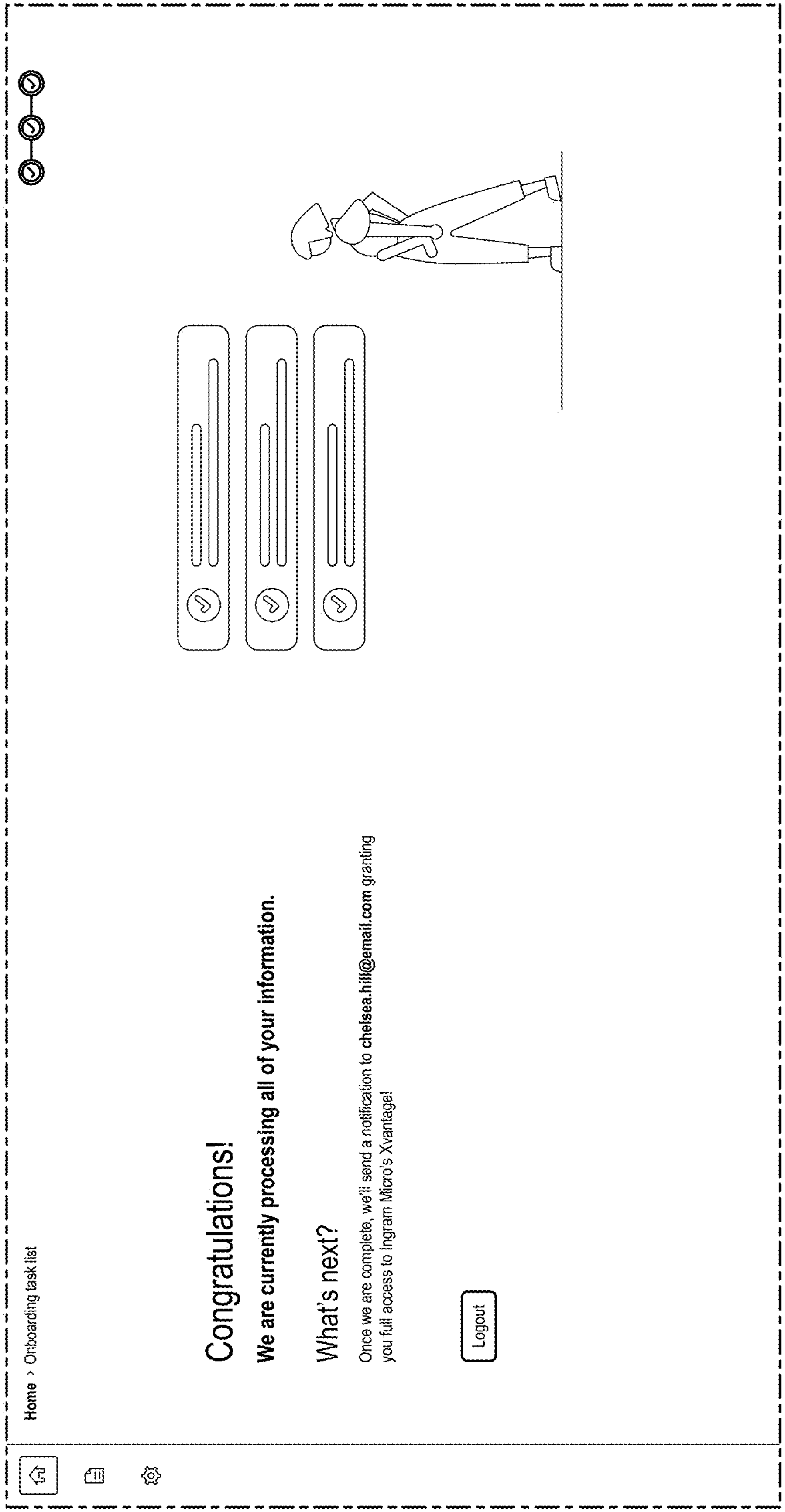
Figure 12F:
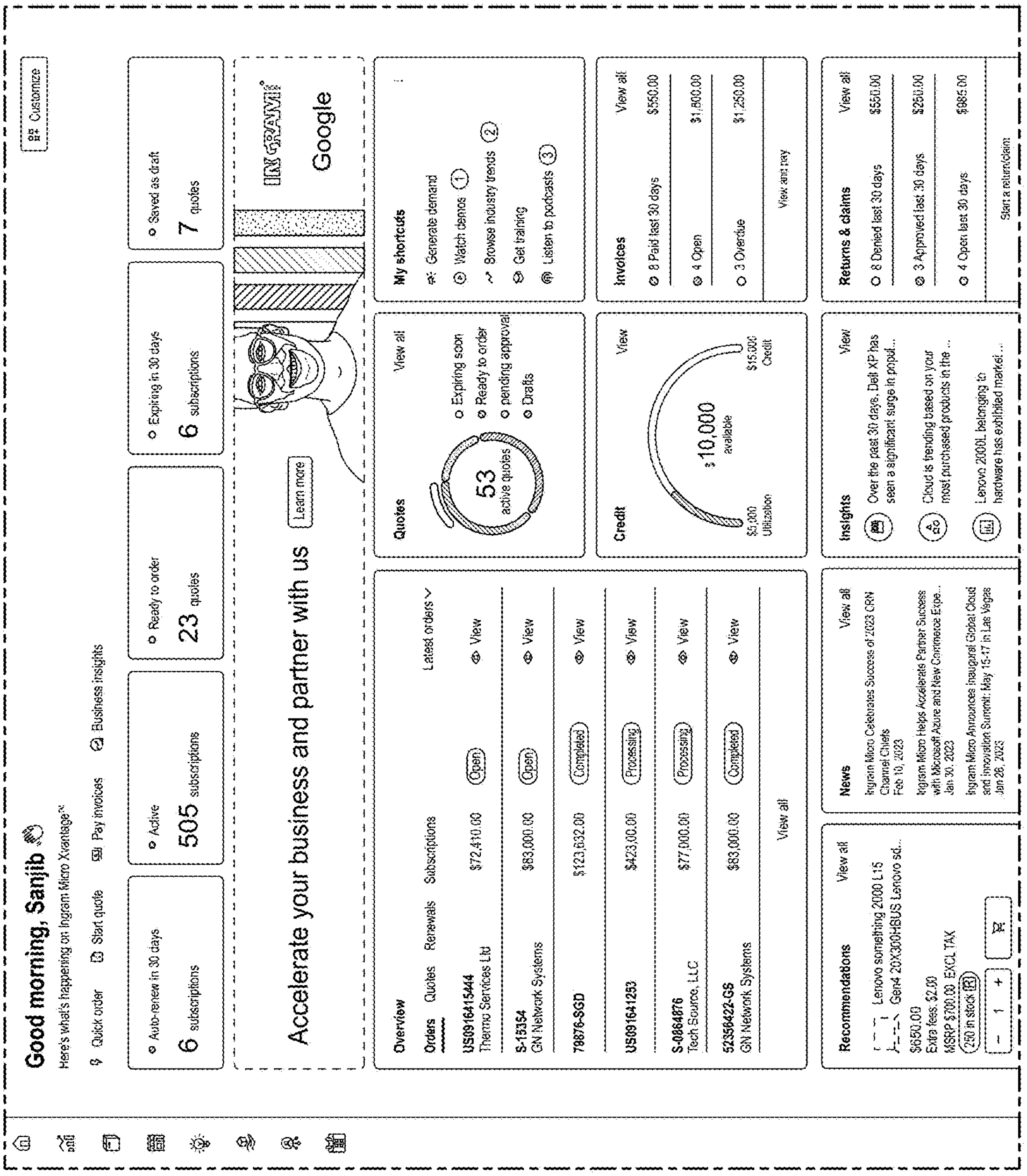
Figure 12G:
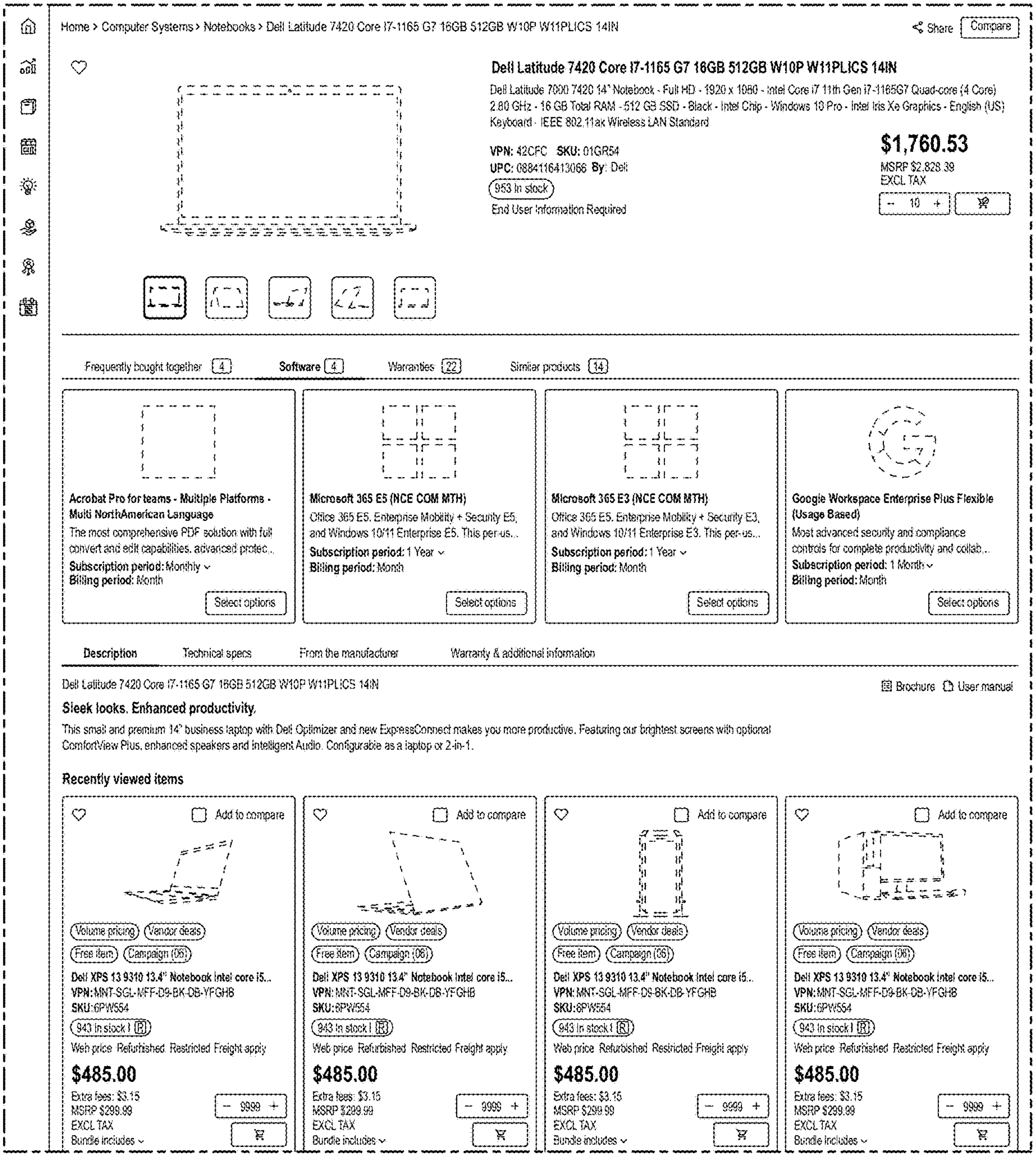
Figure 12H:
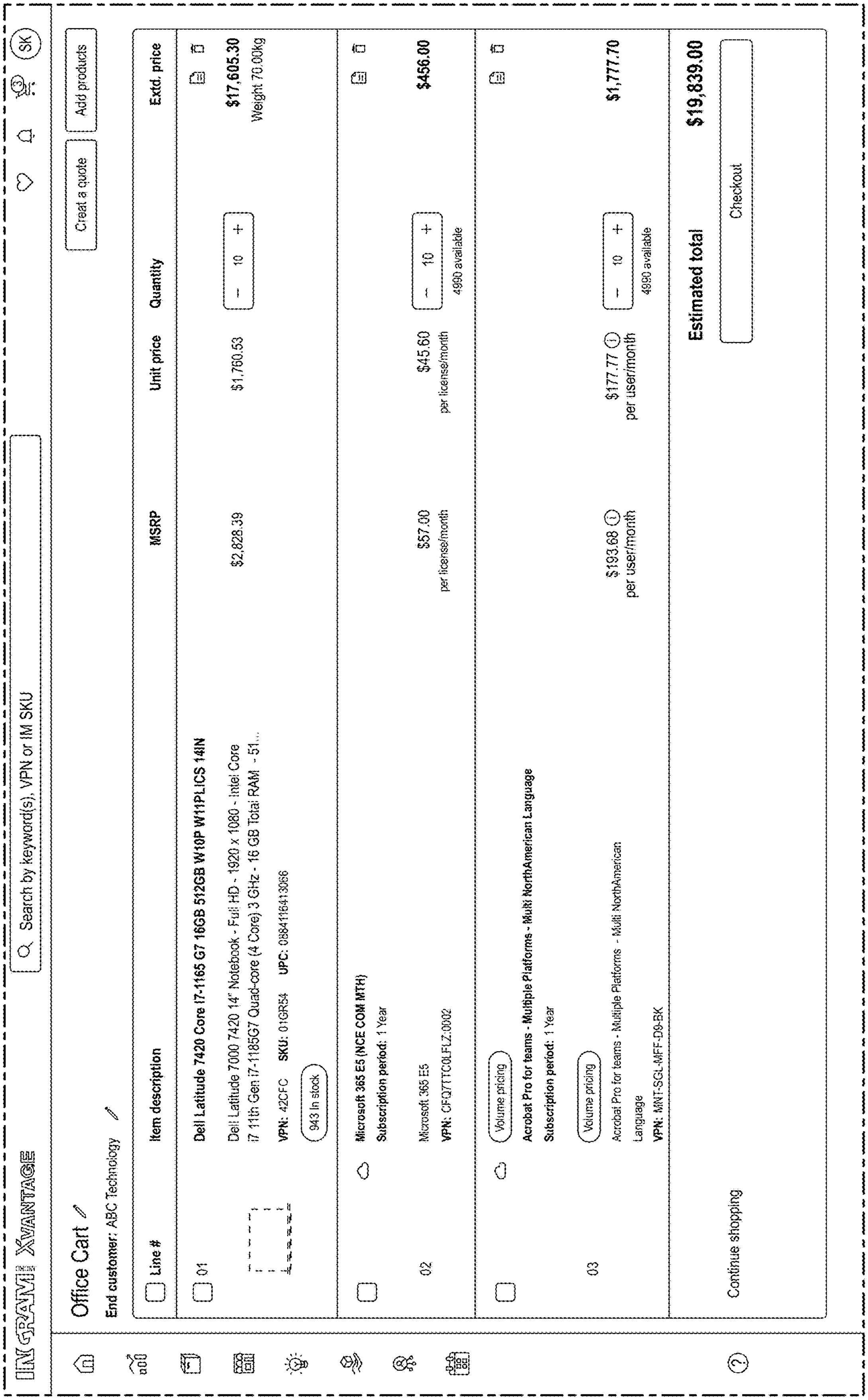
Figure 12I:
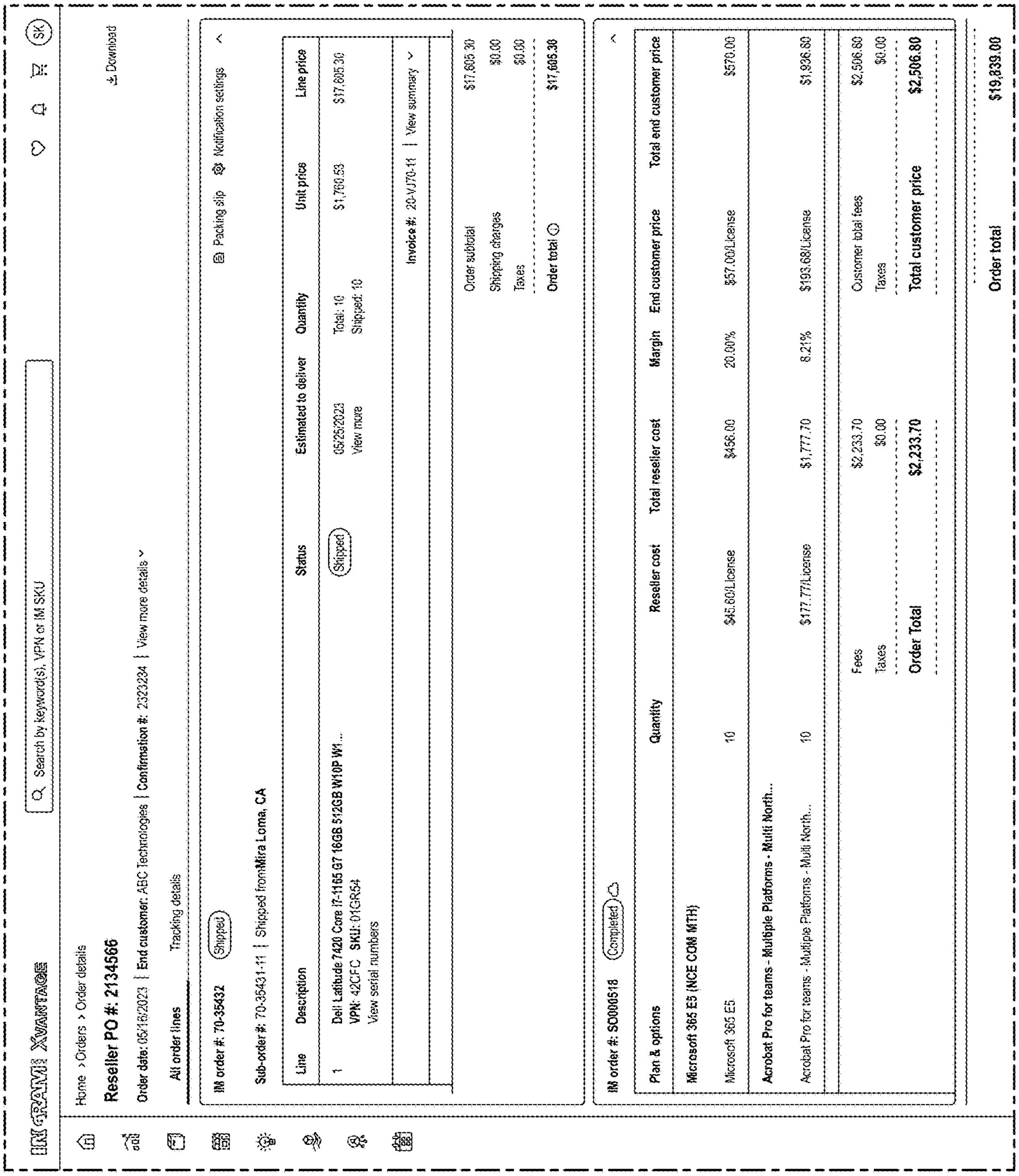
Figure 12J:
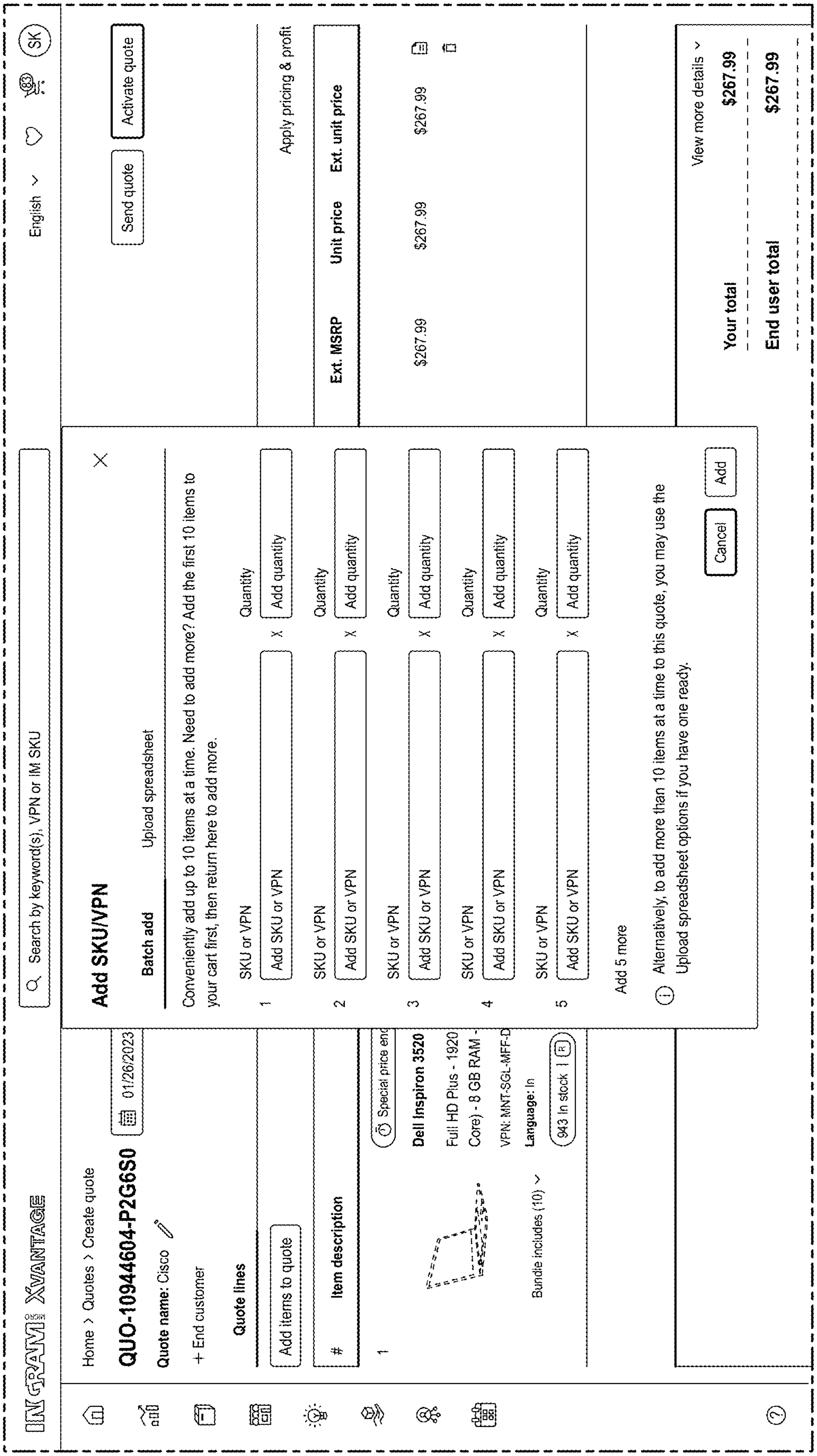
Figure 12K:
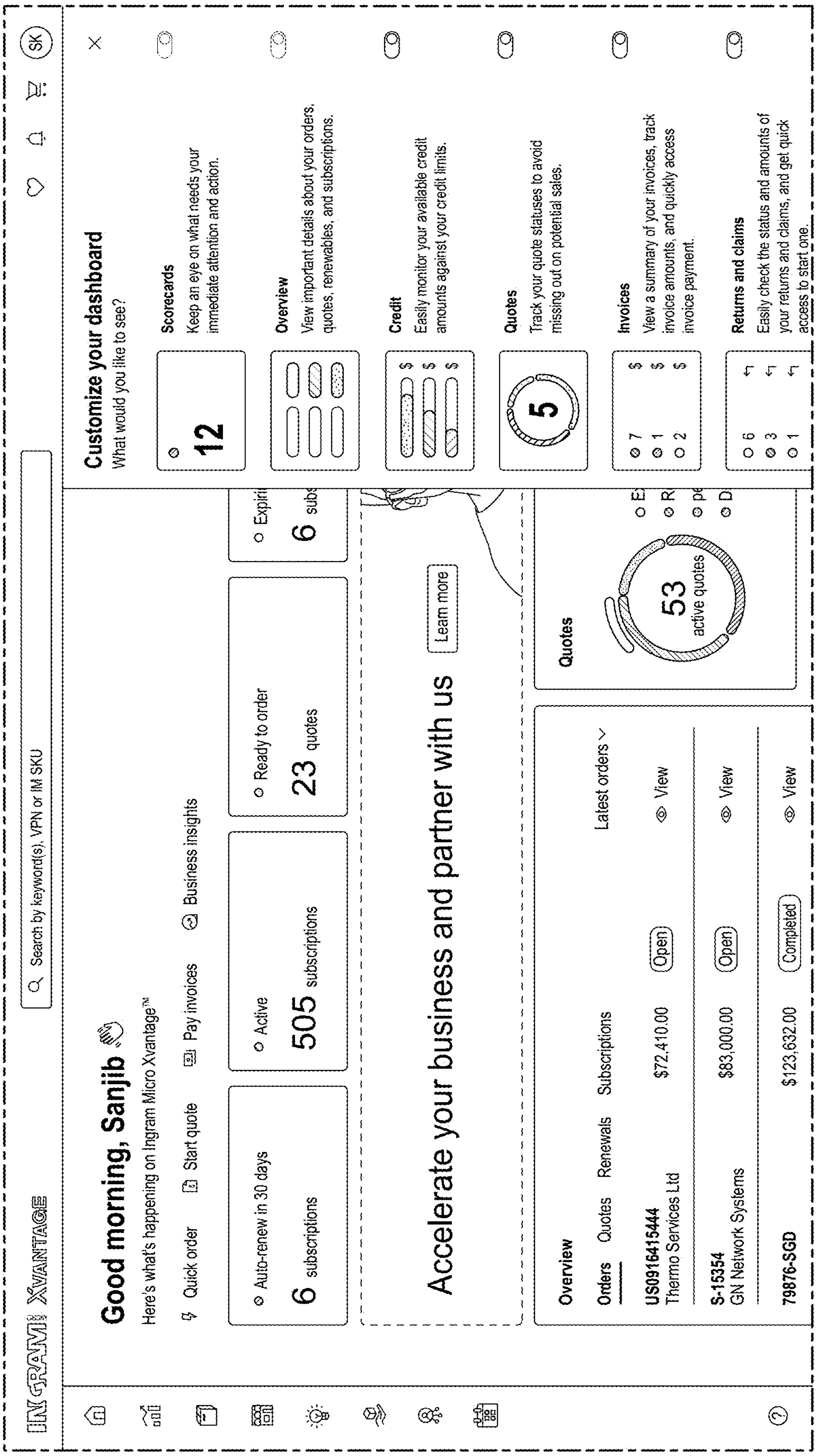
Figure 12L:
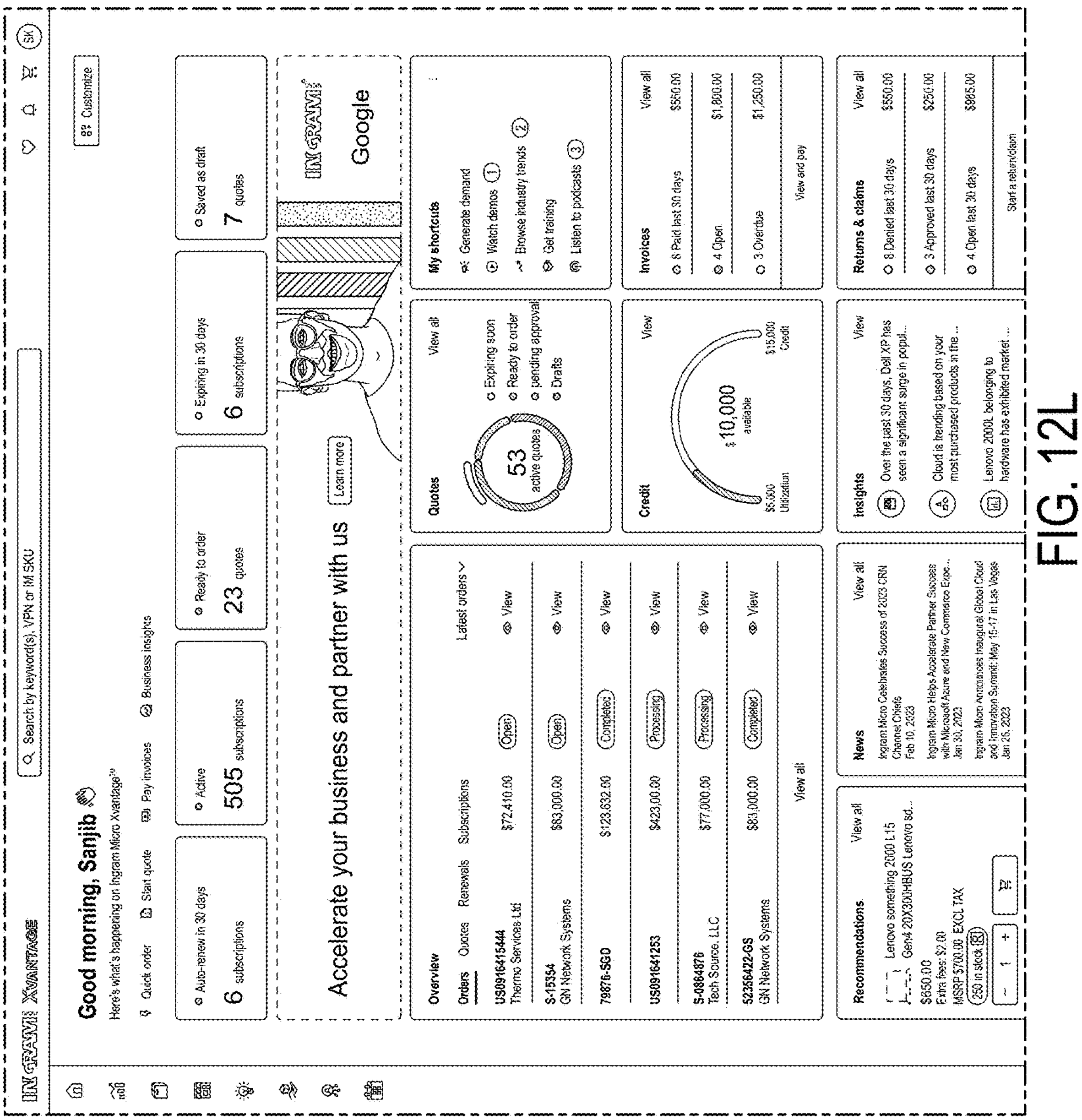
Figure 12M:
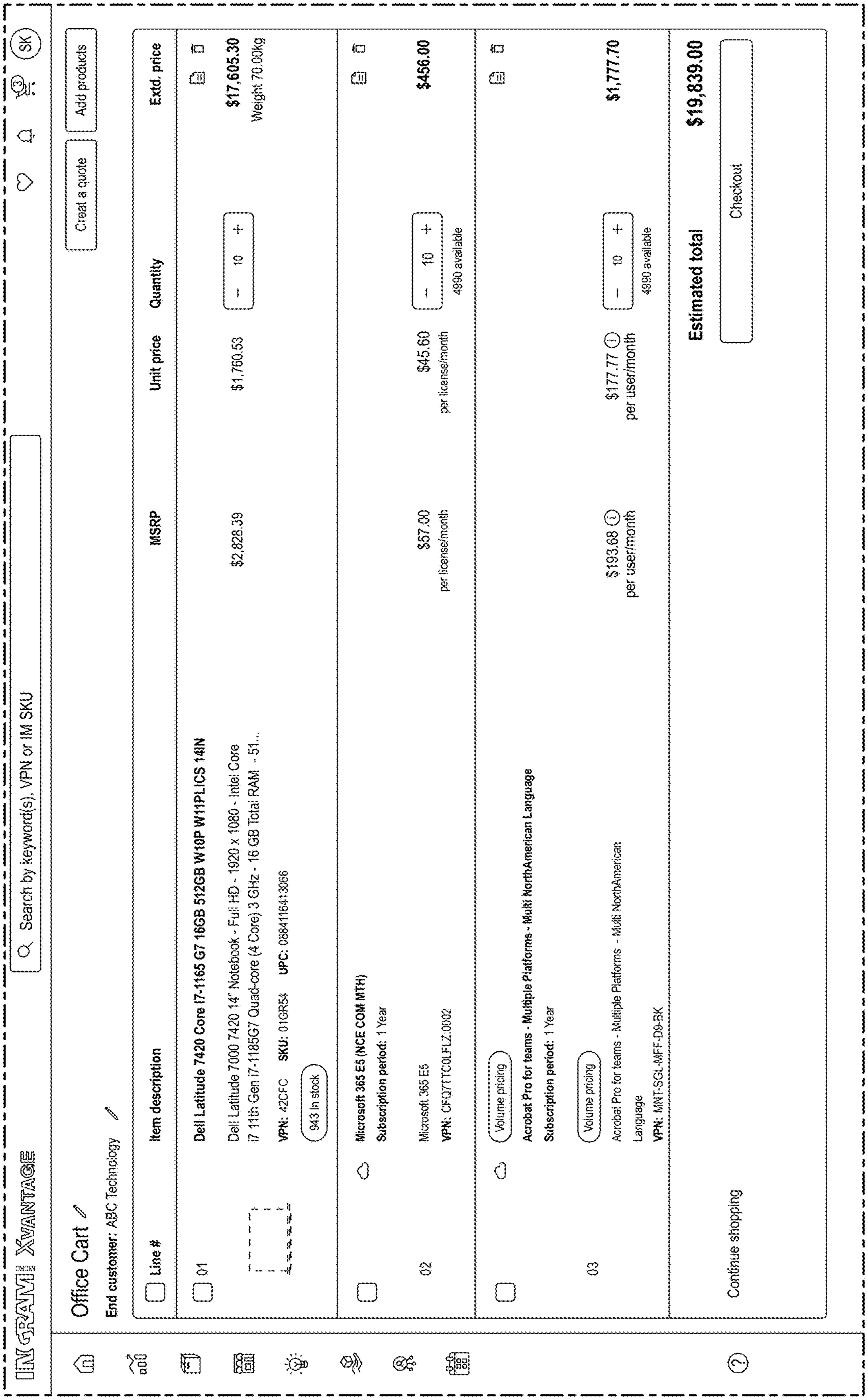
Figure 12N:
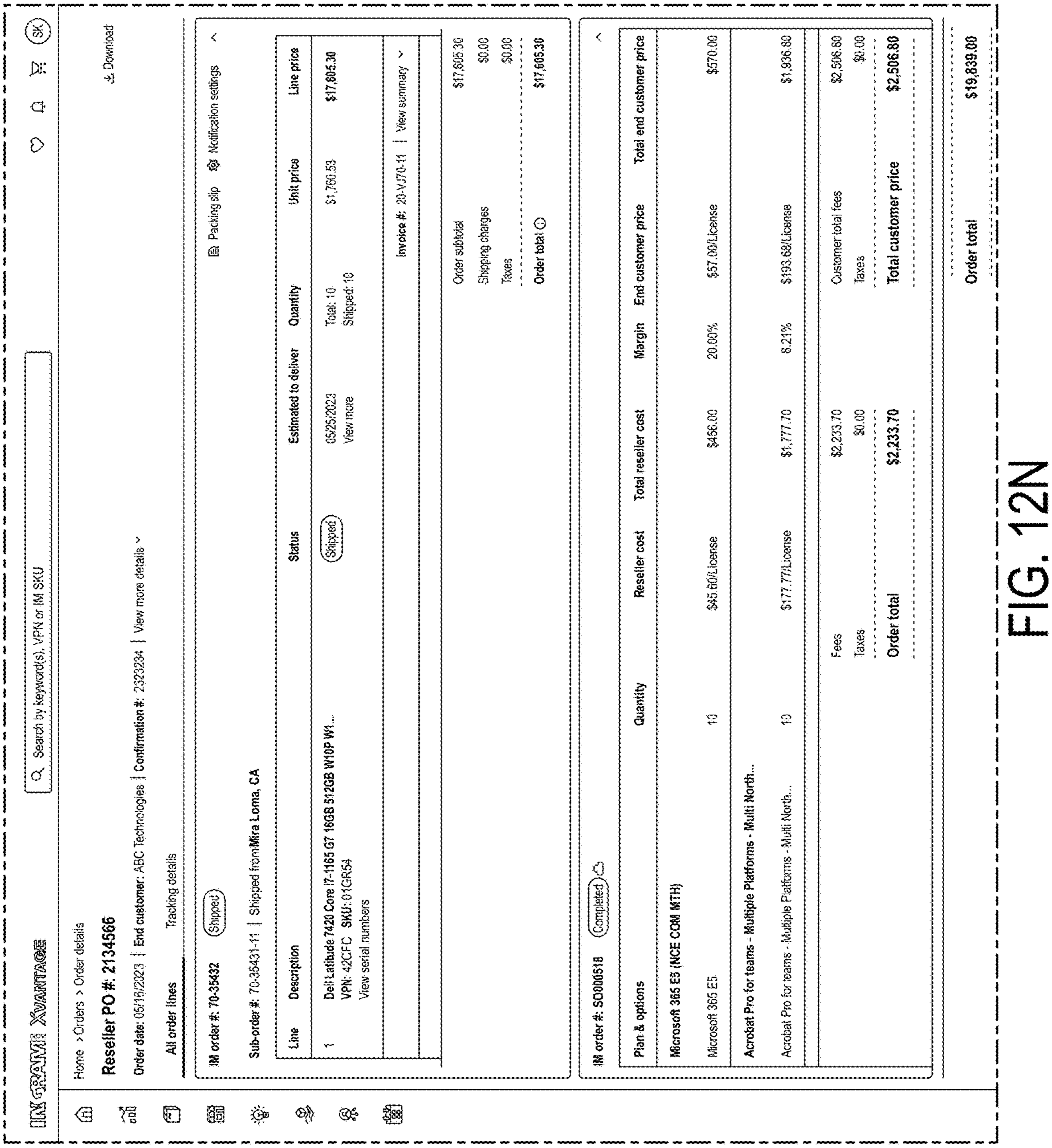
Figure 12O:
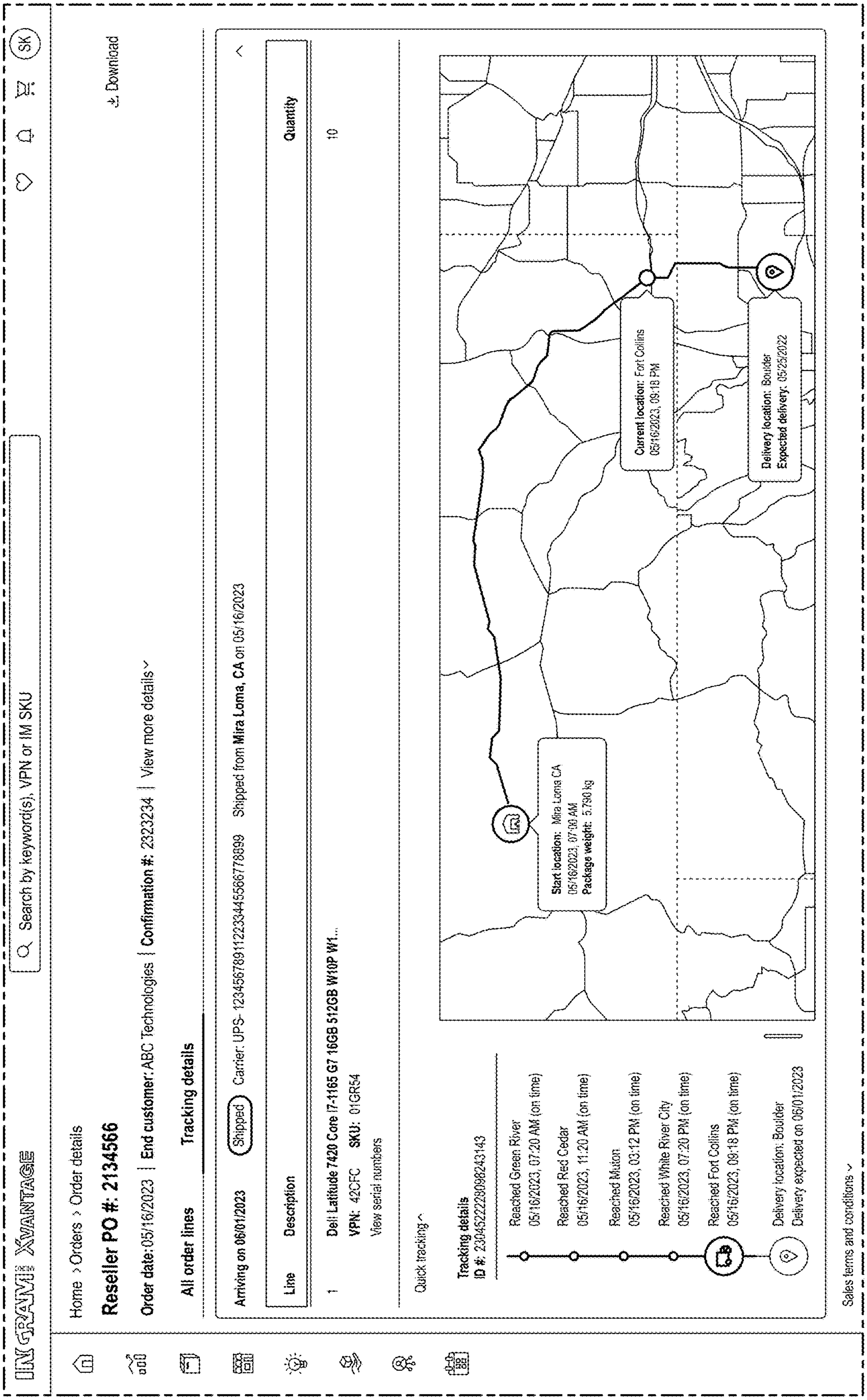
Figure 12P:
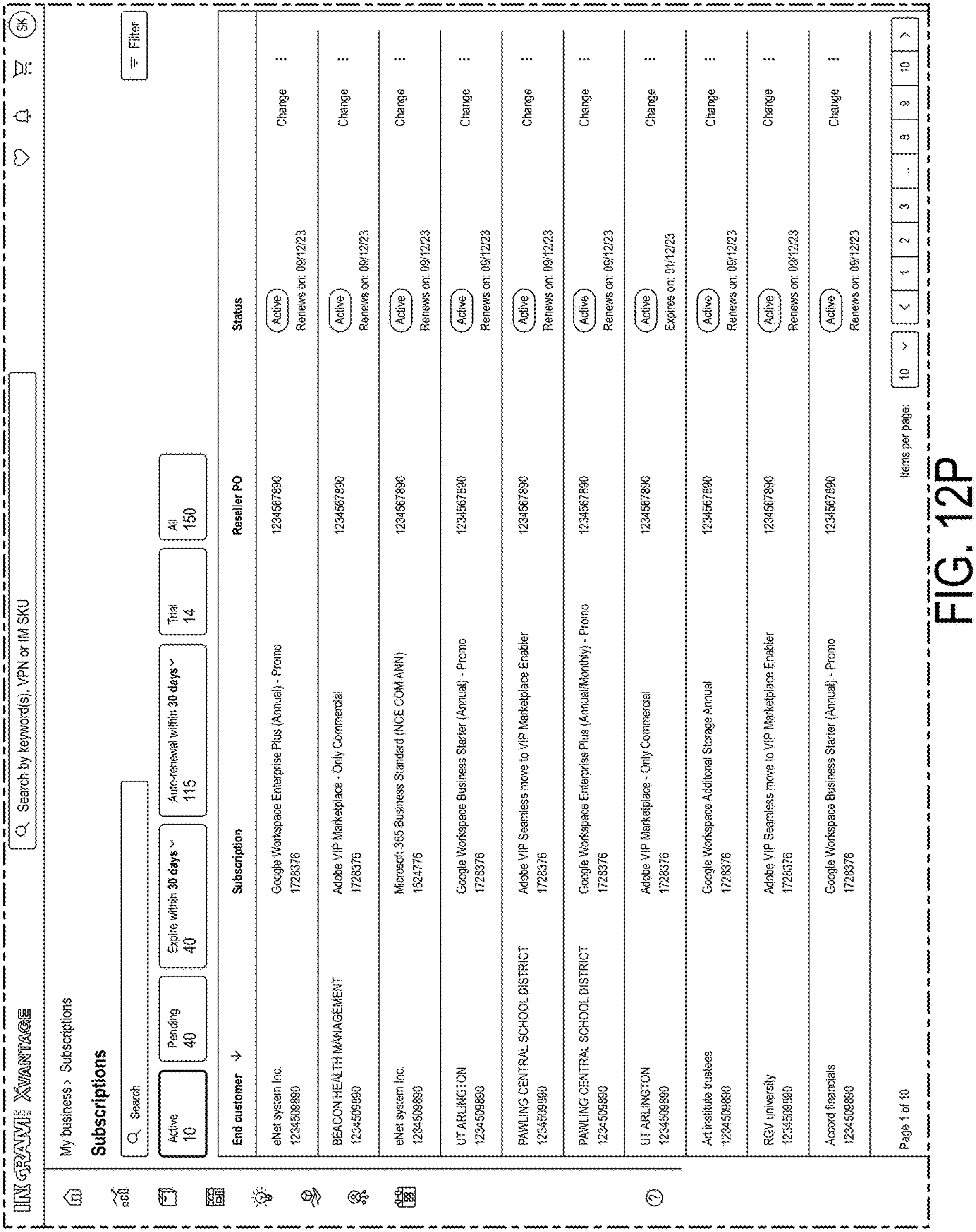
Figure 12Q:
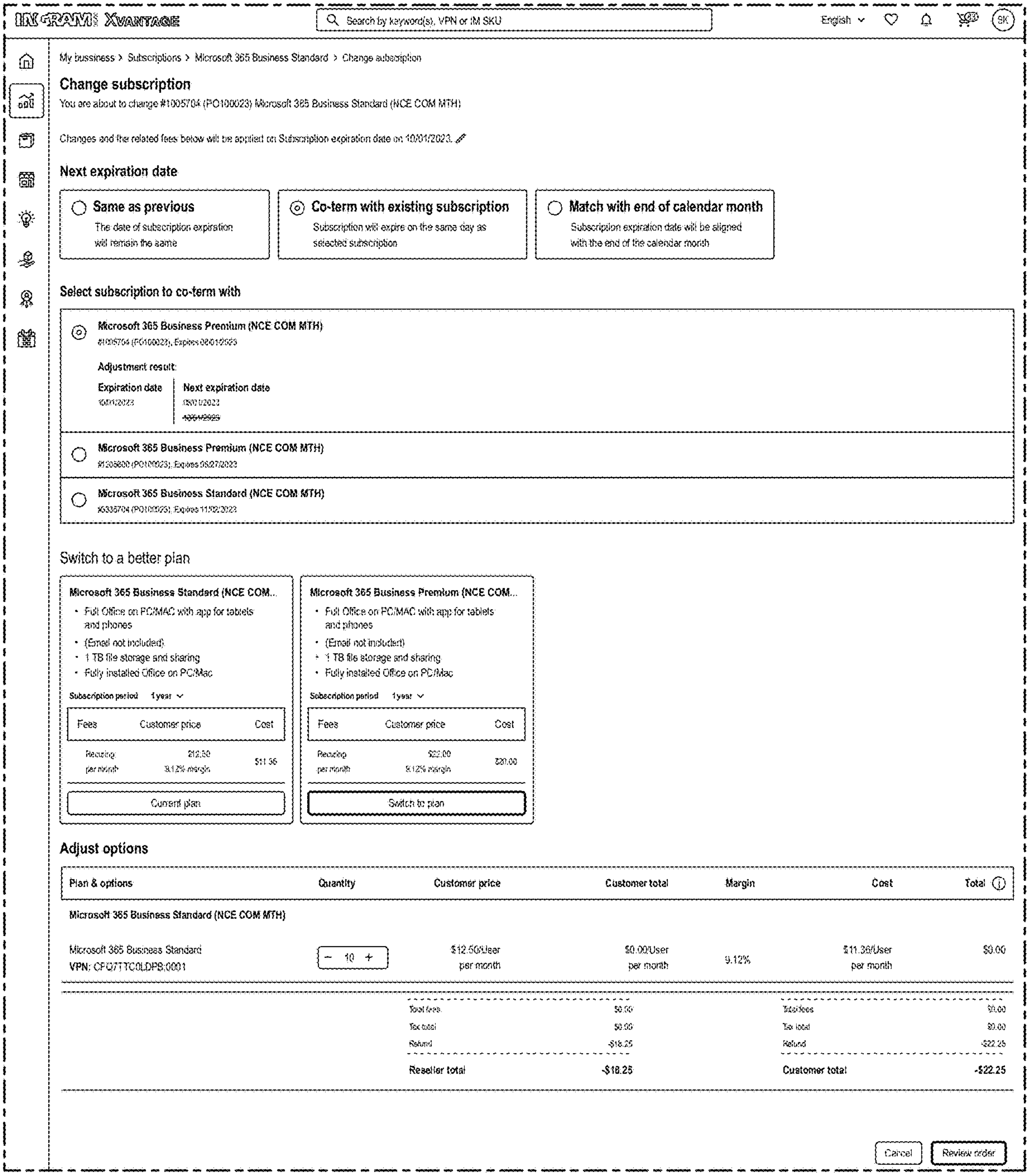

FIGS. 12A to 12Q depict various screens and functionalities of the SPoG UI related to vendor onboarding, partner dashboard, customer carts, order summary, SKU generation, order tracking, shipment tracking, subscription history, and subscription modifications. A detailed description of each figure is provided below:

FIG. 12A depicts a Vendor Onboarding Initiation screen that represents the initial step of the vendor onboarding process. It provides a form or interface where vendors can express their interest in joining the distribution ecosystem. Vendors can enter their basic information, such as company details, contact information, and product catalogs.

FIG. 12B depicts a Vendor Onboarding Guide that displays a step-by-step guide or checklist for vendors to follow during the onboarding process. It outlines the necessary tasks and requirements, ensuring that vendors have a clear understanding of the onboarding process and can progress smoothly.

FIG. 12C depicts a Vendor Onboarding Call Scheduler that facilitates scheduling calls or meetings between vendors and platform associates or representatives responsible for guiding them through the onboarding process. Vendors can select suitable time slots or request a call, ensuring effective communication and assistance throughout the onboarding journey.

FIG. 12D depicts a Vendor Onboarding Task List that presents a comprehensive task list or dashboard that outlines the specific steps and actions required for successful vendor onboarding. It provides an overview of pending tasks, completed tasks, and upcoming deadlines, helping vendors track their progress and ensure timely completion of each onboarding task.

FIG. 12E depicts a Vendor Onboarding Completion Screen that confirms the successful completion of the vendor onboarding process. It may display a congratulatory message or summary of the completed tasks, indicating that the vendor is now officially onboarded into the distribution ecosystem.

FIG. 12F depicts a Partner Dashboard that offers partners or users a centralized view of relevant information and metrics related to their partnership with the distribution ecosystem. It provides an overview of performance indicators, key data points, and actionable insights to facilitate effective collaboration and decision-making.

FIG. 12G depicts a Customer Product Cart that represents the customer's product cart, where they can add items they wish to purchase. It displays a list of selected products, quantities, prices, and other relevant details. Customers can review and modify their cart contents before proceeding to the checkout process.

FIG. 12H depicts a Customer Subscription Cart that allows customers to manage their subscription-based purchases. It displays the selected subscription plans, pricing, and duration. Customers can review and modify their subscription details before finalizing their choices.

FIG. 12I depicts a Customer Order Summary that provides a summary of the customer's order, including details such as the products or subscriptions purchased, quantities, pricing, and any applied discounts or promotions. It allows customers to review their order before confirming the purchase.

FIG. 12J depicts a Vendor SKU Generation screen for generating unique Stock Keeping Unit (SKU) codes for vendor products. It may include fields or options where vendors can specify the product details, attributes, and pricing, and the system automatically generates the corresponding SKU code.

FIGS. 12K and 12L depicts Dashboard Order Summary to display summarized information about orders placed within the distribution ecosystem. They present key order details, such as order number, customer name, product or subscription information, quantity, and order status. The dashboard provides an overview of order activity, enabling users to track and manage orders efficiently.

FIG. 12M depicts a Customer Subscription Cart that permits a customer to add, modify, or remove subscription plans. It can display a list of selected subscriptions, pricing, and renewal dates. Customers can manage their subscriptions and make changes according to their preferences and requirements.

FIG. 12N depicts a Customer Order Tracking screen that enables customers to track the status and progress of their orders within the supply chain. It displays real-time updates on order fulfillment, including processing, packaging, and shipping. Customers can monitor the movement of their orders and anticipate delivery times.

FIG. 12O depicts a Customer Shipment Tracking that provides customers with real-time tracking information about their shipments. It may include details such as the carrier, tracking number, current location, and estimated delivery date. Customers can stay informed about the whereabouts of their shipments.

FIG. 12P depicts a Customer Subscription History, that presents a historical record of the customer's subscription activities. It displays a list of previous subscriptions, including the subscription plan, duration, and status. Customers can review their subscription history, track past payments, and refer to previous subscription details.

FIG. 12Q depicts a Customer Subscription Modifications dialog, that allows customers to modify their existing subscriptions. It offers options to upgrade or downgrade subscription plans, change billing details, or adjust other subscription-related preferences. Customers can manage their subscriptions according to their evolving needs or preferences.

The depicted UI screens are not limiting. In some embodiments the UI screens of FIGS. 12A to 12Q collectively represent the diverse functionalities and features offered by the SPoG UI, providing users with a comprehensive and user-friendly interface for vendor onboarding, partnership management, customer interaction, order management, subscription management, and tracking within the distribution ecosystem.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system for managing vendor-agnostic configure to order (CTO) and quote to order (QTO) processes, comprising:

a Real-Time Data Mesh (RTDM) configured to aggregate, standardize, and normalize real-time data from diverse sources, including ERPs, CRM systems, and market intelligence, for structured and unstructured data processing, the RTDM implementing a data lake and comprising a plurality of purposive data stores, each purposive data store configured to persist standardized data aligned to particular analytical or operational requirements, the purposive data stores including at least a compliance data store, a pricing data store, and a market intelligence data store;

a Single Pane of Glass User Interface (SPOG UI) configured to facilitate user interaction with features for instant conversion of shopping carts into subscription-based models, dynamic pricing tools, and real-time visibility into vendor performance and strategic partnerships;

an Advanced Analytics and Machine-Learning (AAML) Module for analyzing product compatibility, optimizing subscription models, dynamic pricing strategies, sentiment analysis, trend forecasting, and behavioral analytics based on deep learning capabilities and machine learning algorithms;

a Vendor-Agnostic CTO/QTO Integration Module (VACIM) comprising:

a Process Standardization Engine configured to identify variations in vendor-specific quoting processes and uniformly implement processes across vendors to enforce uniform quoting logic using a rule engine based on predefined rule sets;

a Vendor Data Transformation Gateway configured to convert raw vendor data into a standardized format; and an Adaptive Rebate Management System configured to perform dynamic rebate calculations.

2. The system of claim 1, wherein the RTDM is configured to perform an ETL process for data integration and normalization to ensure uniformity and accessibility.

3. The system of claim 1, further comprising a Geographical Market Mapper to align product offerings with regional demand patterns and compliance requirements.

4. The system of claim 1, wherein the SPOG UI integrates a one-click conversion feature to streamline the transition to subscription-based models.

5. The system of claim 1, wherein the AAML Module integrates with the Vendor Compatibility Analyzer for assessing product interoperability across vendors.

6. The system of claim 1, further comprising a Global Pricing Harmonizer to ensure pricing parity across different markets, considering currency fluctuations and purchasing power parity.

7. The system of claim 1, wherein the VACIM dynamically adjusts processes and pricing strategies based on machine learning-informed insights into market trends and vendor performance.

* * * * *